US012459982B2

(12) United States Patent
Hershkovitz et al.

(10) Patent No.: US 12,459,982 B2
(45) Date of Patent: Nov. 4, 2025

(54) METHODS OF PRODUCING LONG ACTING CTP-MODIFIED GROWTH HORMONE POLYPEPTIDES

(71) Applicant: OPKO BIOLOGICS LTD., Kiryat Gat (IL)

(72) Inventors: Oren Hershkovitz, Shikmim (IL); Laura Moschcovich, Givat Shmuel (IL)

(73) Assignee: OPKO BIOLOGISTICS LTD., Kiryat Gat (IL)

( * ) Notice: Subject to any disclaimer, the term of this patent is extended or adjusted under 35 U.S.C. 154(b) by 761 days.

(21) Appl. No.: 15/533,910

(22) PCT Filed: Dec. 10, 2015

(86) PCT No.: PCT/IL2015/051196
§ 371 (c)(1),
(2) Date: Jun. 7, 2017

(87) PCT Pub. No.: WO2016/092549
PCT Pub. Date: Jun. 16, 2016

(65) Prior Publication Data
US 2018/0111974 A1   Apr. 26, 2018

Related U.S. Application Data

(60) Provisional application No. 62/090,104, filed on Dec. 10, 2014, provisional application No. 62/090,116, filed on Dec. 10, 2014, provisional application No. 62/090,124, filed on Dec. 10, 2014.

(51) Int. Cl.
| | | |
|---|---|---|
| A61K 38/27 | (2006.01) | |
| B01D 15/00 | (2006.01) | |
| C07K 14/505 | (2006.01) | |
| C07K 14/555 | (2006.01) | |
| C07K 14/575 | (2006.01) | |
| C07K 14/59 | (2006.01) | |
| C07K 14/61 | (2006.01) | |
| C07K 19/00 | (2006.01) | |
| C12N 5/00 | (2006.01) | |
| C12N 9/64 | (2006.01) | |
| C12N 15/09 | (2006.01) | |
| C12N 15/85 | (2006.01) | |
| G06Q 10/0633 | (2023.01) | |
| G06Q 10/0637 | (2023.01) | |
| G06Q 10/0639 | (2023.01) | |
| G06Q 30/0201 | (2023.01) | |
| A61K 38/00 | (2006.01) | |
| C12M 1/00 | (2006.01) | |

(52) U.S. Cl.
CPC ............ *C07K 14/59* (2013.01); *C07K 14/505* (2013.01); *C07K 14/555* (2013.01); *C07K 14/575* (2013.01); *C07K 14/61* (2013.01); *C12N 9/6437* (2013.01); *C12N 9/644* (2013.01); *C12N 15/85* (2013.01); *G06Q 10/0633* (2013.01); *G06Q 10/0637* (2013.01); *G06Q 10/06393* (2013.01); *G06Q 30/0201* (2013.01); *A61K 38/00* (2013.01); *C07K 2319/00* (2013.01); *C07K 2319/31* (2013.01); *C12M 21/00* (2013.01); *C12Y 304/21021* (2013.01); *C12Y 304/21022* (2013.01)

(58) Field of Classification Search
None
See application file for complete search history.

(56) References Cited

U.S. PATENT DOCUMENTS

| | | |
|---|---|---|
| 3,791,932 A | 2/1974 | Schuurs et al. |
| 3,839,153 A | 10/1974 | Schuurs et al. |
| 3,850,578 A | 11/1974 | Macconnel |
| 3,850,752 A | 11/1974 | Schuurs et al. |
| 3,853,987 A | 12/1974 | Dreyer |
| 3,867,517 A | 2/1975 | Ling |
| 3,879,262 A | 4/1975 | Schuurs et al. |
| 3,901,654 A | 8/1975 | Gross |
| 3,935,074 A | 1/1976 | Rubenstein et al. |
| 3,984,533 A | 10/1976 | Uzgiris |
| 3,996,345 A | 12/1976 | Ullman et al. |
| 4,034,074 A | 7/1977 | Miles |
| 4,098,876 A | 7/1978 | Piasio et al. |
| 4,400,316 A | 8/1983 | Katsuragi et al. |
| 4,666,828 A | 5/1987 | Gusella |
| 4,683,202 A | 7/1987 | Mullis |

(Continued)

FOREIGN PATENT DOCUMENTS

| | | |
|---|---|---|
| CN | 1528787 A | 9/2004 |
| CN | 1528894 A | 9/2004 |

(Continued)

OTHER PUBLICATIONS

Garica-Campayo et al. Unmasking a new recognition signal for O-linked glycosylation in the chorionic gonadotropin beta subunit Molecular and Cellular Endocrinology 194:63-70; (2002) . (Year: 2002).*
Birken and Canfield Isolation and amino acid sequence of COOH-terminal fragments from the B subunit of Human choriogonadotropin. J. Biol. Chem. 252/15: 5386-5392; (1977). (Year: 1977).*
Alberts et al. "Molecular biology of the cell", 5th ed. (Garland Science, 2008). 2002, p. 367.
Ameredes et al. "Growth Hormone Improves Body Mass Recovery with Refeeding after Chronic Undernutrition-Induced Muscle Atrophy in Aging Male Rats" Journal of Nutrition. 129:2264-2270 (1999).

(Continued)

*Primary Examiner* — Elizabeth C. Kemmerer
*Assistant Examiner* — Regina M DeBerry
(74) *Attorney, Agent, or Firm* — Arnold & Porter Kaye Scholer LLP

(57) ABSTRACT

Disclosed herein is a method for manufacturing a recombinant human growth hormone (h GH) modified by a CTP extension in a mammalian cells culture system.

31 Claims, 23 Drawing Sheets

Specification includes a Sequence Listing.

(56) References Cited

U.S. PATENT DOCUMENTS

| | | |
|---|---|---|
| 4,801,531 A | 1/1989 | Frossard |
| 4,853,332 A | 8/1989 | Mark et al. |
| 4,873,316 A | 10/1989 | Meade et al. |
| 4,879,219 A | 11/1989 | Wands et al. |
| 4,880,634 A | 11/1989 | Speiser |
| 4,911,691 A | 3/1990 | Aniuk et al. |
| 5,011,771 A | 4/1991 | Bellet et al. |
| 5,118,666 A | 6/1992 | Habener |
| 5,122,458 A | 6/1992 | Post et al. |
| 5,177,193 A | 1/1993 | Boime et al. |
| 5,192,659 A | 3/1993 | Simons |
| 5,272,057 A | 12/1993 | Smulson et al. |
| 5,281,521 A | 1/1994 | Trojanowski et al. |
| 5,338,835 A | 8/1994 | Boime |
| 5,405,945 A | 4/1995 | Boime et al. |
| 5,464,764 A | 11/1995 | Capecchi et al. |
| 5,487,992 A | 1/1996 | Capecchi et al. |
| 5,585,345 A | 12/1996 | Boime |
| 5,597,797 A | 1/1997 | Clark |
| 5,643,575 A | 7/1997 | Martinez et al. |
| 5,681,567 A | 10/1997 | Martinez et al. |
| 5,705,478 A | 1/1998 | Boime |
| 5,712,122 A | 1/1998 | Boime et al. |
| 5,759,818 A | 6/1998 | Boime |
| 5,792,460 A | 8/1998 | Boime |
| 5,824,642 A | 10/1998 | Attie et al. |
| 5,898,030 A * | 4/1999 | Samaritani ............... A61P 3/00 514/11.3 |
| 5,919,455 A | 7/1999 | Greenwald et al. |
| 5,929,028 A | 7/1999 | Skrabanja et al. |
| 5,932,447 A | 8/1999 | Siegall |
| 5,935,924 A | 8/1999 | Bunting et al. |
| 5,958,737 A | 9/1999 | Boime et al. |
| 6,028,177 A | 2/2000 | Boime |
| 6,083,725 A | 7/2000 | Selden et al. |
| 6,103,501 A | 8/2000 | Boime et al. |
| 6,113,906 A | 9/2000 | Greenwald et al. |
| 6,225,449 B1 | 5/2001 | Boime |
| 6,238,890 B1 | 5/2001 | Boime |
| 6,242,580 B1 | 6/2001 | Boime et al. |
| 6,306,654 B1 | 10/2001 | Boime et al. |
| 6,310,183 B1 | 10/2001 | Johannessen et al. |
| 6,340,742 B1 | 1/2002 | Burg et al. |
| 6,514,729 B1 | 2/2003 | Bentzien |
| 6,897,039 B2 | 5/2005 | Graversen et al. |
| 7,081,446 B2 | 7/2006 | Lustbader |
| 7,091,326 B2 | 8/2006 | Lee et al. |
| 7,094,566 B2 | 8/2006 | Medlock et al. |
| 7,141,547 B2 | 11/2006 | Rosen et al. |
| 7,202,215 B2 | 4/2007 | Lustbader |
| 7,217,689 B1 | 5/2007 | Elliot et al. |
| 7,371,372 B2 | 5/2008 | Chaturvedi et al. |
| 7,371,373 B2 | 5/2008 | Shirley et al. |
| 7,425,539 B2 | 9/2008 | Donovan et al. |
| 7,442,684 B2 | 10/2008 | Lustbader et al. |
| 7,459,429 B2 | 12/2008 | Klima et al. |
| 7,459,435 B2 | 12/2008 | Lehmann et al. |
| 7,459,436 B2 | 12/2008 | Lehmann et al. |
| 7,553,940 B2 | 6/2009 | Fares et al. |
| 7,553,941 B2 | 6/2009 | Fares et al. |
| 7,563,612 B2 | 7/2009 | Saxena et al. |
| 7,585,837 B2 | 9/2009 | Shechter et al. |
| 7,649,084 B2 | 1/2010 | Ferguson |
| 7,666,835 B2 | 2/2010 | Bloom et al. |
| 7,795,210 B2 | 9/2010 | Defrees et al. |
| 8,008,454 B2 | 8/2011 | Lee et al. |
| 8,048,846 B2 | 11/2011 | Chahal et al. |
| 8,048,848 B2 | 11/2011 | Fares et al. |
| 8,048,849 B2 | 11/2011 | Fares et al. |
| 8,063,015 B2 | 11/2011 | Defrees et al. |
| 8,097,435 B2 | 1/2012 | Fares et al. |
| 8,110,376 B2 | 2/2012 | Fares et al. |
| 8,114,836 B2 | 2/2012 | Fares et al. |
| 8,129,330 B2 | 3/2012 | Martinez et al. |
| 8,304,386 B2 | 11/2012 | Fares et al. |
| 8,426,166 B2 | 4/2013 | Fares et al. |
| 8,450,269 B2 | 5/2013 | Fares et al. |
| 8,465,958 B2 | 6/2013 | Lopez De Leon et al. |
| 8,476,234 B2 | 7/2013 | Fima et al. |
| 8,759,292 B2 | 6/2014 | Fima et al. |
| 8,946,155 B2 | 2/2015 | Fares et al. |
| 9,061,072 B2 | 6/2015 | Hong et al. |
| 9,249,407 B2 | 2/2016 | Fima et al. |
| 9,458,444 B2 | 10/2016 | Fima et al. |
| 9,828,417 B2 | 11/2017 | Fima et al. |
| 9,884,901 B2 | 2/2018 | Fares et al. |
| 10,119,132 B2 | 11/2018 | Fima et al. |
| 2001/0007757 A1 | 7/2001 | Boime et al. |
| 2001/0008895 A1 | 7/2001 | Silva Guisasola et al. |
| 2002/0127652 A1 | 9/2002 | Schambye et al. |
| 2002/0160944 A1 | 10/2002 | Boime et al. |
| 2003/0113871 A1 | 6/2003 | Lee et al. |
| 2003/0143694 A1 | 7/2003 | Lustbader |
| 2003/0216313 A1 | 11/2003 | Lustbader et al. |
| 2004/0009902 A1 | 1/2004 | Boime et al. |
| 2004/0018240 A1 | 1/2004 | Ohmachi et al. |
| 2004/0053370 A1 | 3/2004 | Glaesner et al. |
| 2004/0057996 A1 | 3/2004 | Takada et al. |
| 2004/0115774 A1 | 6/2004 | Kochendoerfer |
| 2004/0138227 A1 | 7/2004 | Nishiyama et al. |
| 2004/0209804 A1 | 10/2004 | Govardhan et al. |
| 2005/0234221 A1 | 10/2005 | Medlock et al. |
| 2006/0073571 A1 | 4/2006 | Saxena et al. |
| 2006/0088595 A1 | 4/2006 | Asakawa et al. |
| 2006/0160177 A1 | 7/2006 | Okkels et al. |
| 2006/0171920 A1 | 8/2006 | Shechter et al. |
| 2007/0184530 A1 | 8/2007 | Fares et al. |
| 2007/0190610 A1 | 8/2007 | Fares et al. |
| 2007/0190611 A1 | 8/2007 | Fares et al. |
| 2007/0298041 A1 | 12/2007 | Tomlinson |
| 2008/0064856 A1 | 3/2008 | Warne et al. |
| 2008/0206270 A1 | 8/2008 | Minev |
| 2009/0053185 A1 | 2/2009 | Schulte et al. |
| 2009/0087411 A1 | 4/2009 | Fares et al. |
| 2009/0130060 A1 | 5/2009 | Weimer et al. |
| 2009/0221037 A1 | 9/2009 | Lee et al. |
| 2009/0221485 A1 | 9/2009 | James |
| 2009/0270489 A1 | 10/2009 | Fares et al. |
| 2009/0275084 A1 | 11/2009 | Fares et al. |
| 2009/0286733 A1 | 11/2009 | Fares et al. |
| 2009/0312254 A1 | 12/2009 | Fares et al. |
| 2010/0081614 A1 | 4/2010 | Fares et al. |
| 2010/0144617 A1 | 6/2010 | Sinha Roy et al. |
| 2010/0310546 A1 | 12/2010 | Schuster et al. |
| 2010/0317585 A1 | 12/2010 | Fima et al. |
| 2011/0004172 A1 | 1/2011 | Eckstein et al. |
| 2011/0034374 A1 | 2/2011 | Bloom et al. |
| 2011/0065660 A1 | 3/2011 | Baron et al. |
| 2011/0152181 A1 | 6/2011 | Alsina-Fernandez et al. |
| 2011/0152182 A1 | 6/2011 | Alsina-Fernandez et al. |
| 2011/0166063 A1 | 7/2011 | Bossard et al. |
| 2011/0223151 A1 | 9/2011 | Behrens et al. |
| 2011/0286967 A1 | 11/2011 | Fares et al. |
| 2012/0004286 A1 | 1/2012 | Fares et al. |
| 2012/0015437 A1 | 1/2012 | Fares et al. |
| 2012/0035101 A1 | 2/2012 | Fares et al. |
| 2012/0048878 A1 | 3/2012 | Burger et al. |
| 2012/0114651 A1 | 5/2012 | De Wildt et al. |
| 2012/0208759 A1 | 8/2012 | Fima et al. |
| 2013/0184207 A1 | 7/2013 | Fares et al. |
| 2013/0243747 A1 | 9/2013 | Fima et al. |
| 2013/0295072 A1 | 11/2013 | Fima et al. |
| 2014/0113860 A1 | 4/2014 | Fima et al. |
| 2014/0170728 A1 | 6/2014 | Defrees et al. |
| 2014/0316112 A1 | 10/2014 | Hershkovitz et al. |
| 2014/0371144 A1 | 12/2014 | Fares et al. |
| 2015/0038413 A1 | 2/2015 | Fares et al. |
| 2015/0072924 A1 | 3/2015 | Fima et al. |
| 2015/0079063 A1 | 3/2015 | Fima et al. |
| 2015/0133636 A1 | 5/2015 | Xenopoulos et al. |
| 2015/0158926 A1 | 6/2015 | Fares et al. |

(56) References Cited

U.S. PATENT DOCUMENTS

| | | |
|---|---|---|
| 2015/0203558 A1 | 7/2015 | Fares et al. |
| 2016/0058879 A1* | 3/2016 | Nielsen .................. A61K 38/27 514/11.3 |
| 2016/0168588 A1 | 6/2016 | Hershkovitz et al. |

FOREIGN PATENT DOCUMENTS

| | | |
|---|---|---|
| CN | 1847265 | 10/2006 |
| CN | 102639144 | 8/2012 |
| CN | 104010650 | 8/2014 |
| EP | 0264166 | 4/1988 |
| EP | 0374257 A1 | 6/1990 |
| EP | 0 167 825 A2 | 8/1990 |
| EP | 2 420 251 A2 | 2/2012 |
| EP | 2532674 | 12/2012 |
| EP | 2420251 | 3/2013 |
| JP | 2002226365 A | 8/2002 |
| JP | 2002255857 A | 9/2002 |
| JP | 2004269516 A | 9/2004 |
| JP | 2015/163650 A | 9/2015 |
| KR | 20030037598 A | 5/2003 |
| KR | 2005-0021502 A | 3/2005 |
| RU | 2013106276 | 8/2014 |
| WO | WO 1989/010756 | 11/1989 |
| WO | WO 1993/006844 | 4/1993 |
| WO | WO 1994/024148 A1 | 10/1994 |
| WO | WO 1997/015664 | 5/1997 |
| WO | WO 2000/023472 A2 | 4/2000 |
| WO | WO 2002/036169 A2 | 5/2002 |
| WO | WO 2002/048194 A1 | 6/2002 |
| WO | WO 2002/085311 A2 | 10/2002 |
| WO | WO 2003/038100 A1 | 5/2003 |
| WO | WO 2003/046013 A1 | 6/2003 |
| WO | WO 2003/048210 A1 | 6/2003 |
| WO | WO 2004/006756 | 1/2004 |
| WO | WO 2004/089280 | 10/2004 |
| WO | WO 2004/111242 | 12/2004 |
| WO | WO 2005/035761 | 4/2005 |
| WO | WO 2005/080544 | 9/2005 |
| WO | WO 2006/051288 A2 | 5/2006 |
| WO | WO 2006/134340 | 12/2006 |
| WO | WO 2007/092252 A2 | 8/2007 |
| WO | WO 2007/094985 | 8/2007 |
| WO | WO 2007/149406 A2 | 12/2007 |
| WO | WO 2010/007622 | 1/2010 |
| WO | WO 2010/097077 | 9/2010 |
| WO | WO 2011/004361 | 1/2011 |
| WO | WO 2011/087672 | 7/2011 |
| WO | WO 2012/008779 | 1/2012 |
| WO | WO 2012/011752 A2 | 1/2012 |
| WO | WO 2012/011752 | 5/2012 |
| WO | WO 2012/167251 | 12/2012 |
| WO | WO 2012/173422 | 12/2012 |
| WO | WO 2013/018098 | 2/2013 |
| WO | WO 2013/096386 | 6/2013 |
| WO | WO 2013/121416 | 8/2013 |
| WO | WO 2013/157002 | 10/2013 |
| WO | WO 2013/183052 | 12/2013 |
| WO | WO 2014/080401 | 5/2014 |
| WO | WO 2016/092550 | 6/2016 |
| WO | WO 2016/203482 | 12/2016 |

OTHER PUBLICATIONS

Amirizahdeh et al. "Expression of biologically active recombinant B-domain-deleted human VIII in mammalian cells" Journal of Science, Islamic Republic of Iran. Abstract. 16(2):103-112, (2005).

Anonymous "Prolor Biotech Announces Positive Results of its Obesity/Diabetes Drug Candidate in Preclinical Weight Loss Study", Apr. 17, 2012, pp. 1-2; Retrieved from the Internet: URL;http://web.archive.org/web/20120526154526/http://www.prolor-biotech.com/_Uploads/dbsAttachedFiles/NewsPROLORAnnouncesObesityDiabetesStudyResults.pdf.

Anonymous "Prolor Biotech Receives New U.S. Patent Allowance Covering Broad Applications of its CTP Platform for Long Acting Therapeutic Proteins", Jul. 11, 2011, pp. 1-2; Retrieved from the Internet: URL;http://web.archive.org/web/20110725053527/http://www.prolor-biotech.com/_Uploads/dbsAttachedFiles/NewsPROLORAnnouncesAllowanceOfNewCTPPlatformPatentByUSPatentOffice.pdf.

Anonymous "Corporate Presentation—Lazard Capital Markets Healthcare Conference", Nov. 15, 2011, pp. 1-19; Retrieved from the Internet: URL:http://web.archive.org/web/20110628023057/http://www.prolor-biotech.com/_Uploads/dbsAttachedFiles/prolorInvestorsNov2011.pdf.

Anonymous "Corporate Presentation", Jun. 1, 2011, pp. 1-35; Retrieved from the Internet: URL;http://web.archive.org/web/20110628023057/http://www.prolor-biotech.com/_Uploads/dbsAttachedFiles/prolorPresentationJune2011Investors.pdf.

Anonymous "PROLOR and Yeda enter definitive license agreement for Reversible PEGylation technology", Jan. 18, 2011, pp. 1-3; Retrieved from the Internet: URL;http://web.archive.org/web/20110123063420/http://www.news-medical.net/news/20110118/PROLOR-and-Yeda-enter-definitive-license-agreement-for-Reversible-PEGylation-technology.aspx.

Anson et al. "The gene structure of human anti-haemophilic factor IX", The EMBO Journal (1984) 3(5):1053-1060.

Askoy et al., "A study of the intracellular and secreted forms of the MUC2 mucin from the PC/AA intestinal cell line." Glycobiology 9.7: 739-746 (1999).

Banerji et al. "A lymphocyte-specific cellular enhancer is located downstream of the joining region in immunoglobulin heavy chain genes" Cell 33:729-740 (1983).

Barker et al. "An immunomagnetic-base method for the purification of ovarian cancer cells from patient-derived ascites"(Gynecologic Oncology 82, 57-63, 2001).

Bengtsson et al. "Treatment of adults with growth hormone (GH) deficiency with recombinant human GH" J Clin Endocrinol Metab. Feb. 1993;76(2):309-17.

Berntorp et al. "The pharmacokinetics of clotting factor therapy"; Haemophilia (2003) 9:353-359.

Biller et al. "Effects of once-weekly sustained-release growth hormone: a double-blind, placebo-controlled study in adult growth hormone deficiency", J Clin Endocrinol Metab. Jun. 2011;96(6):1718-26.

Bitter et al. "Expression and secretion vectors for yeast" (1987) Methods in Enzymol. 153:516-544.

Bjorkman et al. Pharmacokinetics of Coagulation Factors Clinical Relevance for Patients with Haemophilia. Clin Pharmacokinet vol. 40 (11): 815-832 (2001).

Bohl et al. "Improvement of erythropoiesis in b-thalassemic mice by continuous erythropoietin delivery from muscle" Blood 95:2793-2798 (2000).

Boissel et al. "Erythropoietin structure-function relationships" The Journal of Biological Chemistry 268(21):15983-15993 (1993).

Booth et al. "The use of a 'universal' yeast expression vector to produce an antigenic protein of *Mycobacterium leprae*" Immunol. Lett. 19:65-70 (1988).

Bouloux et al. "First human exposure to FSH-CTP in hypogonadotrophic hypogonadal males." Human Reproduction 16.8 (2001): 1592-1597.

Brisson et al. "Expression of a bacterial gene in plants by using a viral vector" Nature, 310:511-514 (1984).

Broglie et al. "Light-Regulated Expression of a Pea Ribulose-1,5-Bisphosphat Carboxylase Small Subunit Gene in Transformed Plant Cells" Science 224:838-843 (1984).

Brunetti-Pierri et al. "Bioengineered factor IX molecules with increased catalytic activity improve the therapeutic index of gene therapy vectors for hemophilia B." Human Gene Therapy 20.5: 479-485 (2009).

Buchwald et al. "Long-term, continuous intravenous heparin administration by animplantable infusion pump in ambulatory patients with recurrent venous thrombosis" Surgery 88:507-516 (1980).

Butler et al., "The beta-subunit of human chorionic gonadotrophin exists as a homodimer." Journal of Molecular Endocrinology 22.2: 185-192 (1999).

(56) References Cited

OTHER PUBLICATIONS

Byrne et al. "Multiplex gene regulation: A two-tiered approach to transgene regulation in transgenic mice" Proc. Natl. Acad. Sci USA 86:5473-5477 (1989).
Calame et al. "Transcriptional Controlling Elements in the Immunoglobulin and T Cell Receptor Loci" Adv. Immunol 43:235-275 (1988).
Carles-Bonnet et al. "H-Lys-Arg-Asn-Lys-Asn-Asn-OH is the minimal active structure of oxyntomodulin." Peptides 17.3 (1996): 557-561.
Cawley et al. "Developing long-acting growth hormone formulations", Clinical Endocrinology (2013) 79, 305-309.
Chan et al. "Plasma Insulin-Like Growth Factor-I and Prostate Cancer Risk: A Prospective Study", Science vol. 279:563-566, Jan. 1998.
Chen et al. "Recombinant carbohydrate variant of human choriogonadotropin beta-subunit (hCG beta) descarboxyl terminus (115-145). Expression and characterization of carboxyl-terminal deletion mutant of hCG beta in the baculovirus system." Journal of Biological Chemistry 266.10: 6246-6251 (1991).
Chen et al., "Glycoengineering Approach to Half-Life Extension of Recombinant Biotherapeutics." Bioconjugate Chemistry 23.8: 1524-1533 (2012).
Chen et al., "Modulating antibody pharmacokinetics using hydrophilic polymers." Expert Opinion on Drug Delivery 8.9: 1221-1236 (2011).
Chihara et al. "Clinical aspect of growth hormone deficiency in adults", Nihon Naika Gakkai Zasshi. Sep. 10, 2000;89(9):2010-8; with English Abstract.
Claxton et al., "A systematic review of the associations between dose regimens and medication compliance." Clinical Therapeutics 23.8: 1296-1310 (2001).
Cohen et al. "Oxyntomodulin suppresses appetite and reduces food intake in humans", J Clin Endocrinol Metab. Oct. 2003;88(10):4696-701.
Coleman et al., "Dosing frequency and medication adherence in chronic disease." Journal of managed care pharmacy: JMCP 18.7: 527-539 (2012).
Coruzzi et al. "Tissue-specific and light-regulated expression of a pea nuclear gene encoding the small subunit of ribulose-1,5-bisphosphate carboxylase" The EMBO Journal 3:1671-1680 (1984).
Cutfield et al., "Non-compliance with growth hormone treatment in children is common and impairs linear growth." PLoS One 6.1: e16223, p. 1-3 (2011).
Dalton et al. "Over-expression of secreted proteins from mammalian cell lines", Protein Sci. May 2014;23(5):517-25.
Database Geneseq [Online] Apr. 7, 2005, "Human interferon beta (without signal peptide)." XP002664024 retrieved from EBI accession No. GSP: ADW02285, Database accession No. ADW02285.
Database Geneseq [Online] 18 Mar. 24, 2005; "Epogen signal peptide", XP002685292, retrieved from EBI accession No. GSP:ADS64918, Database accession No. ADW649.
Davis CG et al. "Deletion of clustered O-linked carbohydrates does not impair function of low density lipoprotein receptor in transfected fibroblasts" J Biol Chem. 261(6):2828-38, Feb. 25, 1986.
Diao et al. "The molecular design and drug development of recombinant long-acting follicle stimulating hormone" Acta pharmaceutica Sinica. Apr. 2012;47(4):421-6; Abstract.
Diederichs et al., "Liposome in kosmetika und arzneimitteln." Pharmazeutische Industrie 56.3: 267-275 (1994); German with Abstract/resume.
Diness, et al. Lund-Hansen, and U. Hedner. "Effect of recombinant human FVIIA on warfarin-induced bleeding in rats." Thrombosis research 59.6 (1990): 921-929.
Dong et al. "The prolonged half-lives of new erythropoietin derivatives via peptide addition" Biochemical Research Communications, 339(1):380-385 (Jan. 6, 2006).
Drake et al. "Optimizing GH therapy in adults and children" Endocr Rev. Aug. 2001;22(4):425-50. Review.

Edlund et al. "Cell-Specific Expression of the Rat Insulin Gene: Evidence for Role of Two Distinct 5' Flanking Elements" Science 230:912-916 (1985).
Edmunds et al. "Plasma erythropoietin levels and acquired cystic disease of the kidney in patients receiving regular haemodialysis treatment" Br J Haematol. Jun. 1991;78(2):275-7.
Eldem et al. "Optimization of spray-dried and congelated lipid micropellets and characterization of their surface morphology by scanning electron microscopy," Pharmaceutical Research, vol. 8, issue 1 pp. 47-54, 1991.
Eschbach et al. "Correction of the Anemia of End-Stage Rental Disease with Recombinant Human Erythropoietin", The New England Journal of Medicine Jan. 8, 1987, vol. 316 No. 2, pp. 73-78.
Fares "The role of O-linked and N-linked oligosaccharides on the structure-function of glycoprotein hormones: Development of agonists and antagonists", Biochimica et Biophysica Acta (BBA)—General Subjects 1760.4: 560-567 (2006).
Fares et al. "Design of a long-acting follitropin agonist by fusing the C-terminal sequence of the chorionic gonadotropin beta subunit to the follitropin beta subunit" Proc Natl Acad Sci U S A., 89(10): 4304-4308, May 15, 1992.
Fares et al. "Designing a long-acting human growth hormone (hGH) by fusing the carboxy-terminal peptide of human chorionic gonadotropin B-subunit to the coding sequence of hGH" Endocrinology 151(9):4410-4417 (2010).
Fares et al. "Growth hormone (GH) retardation of muscle damage due toimmobilization in old rats. Possible intervention with a new long-acting recombinant GH" Ann N Y Acad Sci. 786:430-43 (Jun. 15, 1996).
Fares et al. "Designing a Long Acting Erythropoietin by Fusing Three Carboxyl-Terminal Peptides of Human Chorionic Gondotropin [beta] Subunit to the N-Terminal and C-Terminal Coding Sequence", International Journal of Cell Biology, vol. 9, No. 11, Jan. 1, 2011, pp. 2021-2027.
Fares et al., "Development of a long-acting erythropoietin by fusing the carboxyl-terminal peptide of human chorionic gonadotropin β-subunit to the coding sequence of human erythropoietin." Endocrinology 148.10: 5081-5087 (2007).
Fayad et al. "Update of the M. D. Anderson Cancer Center experience with hyper-CVAD and rituximab for the treatment of mantle cell and Burkitt-type lymphomas" Clin Lymphoma Myeloma. Dec. 2007;8 Suppl 2:S57-62.
Fingl et al., "General Principles." The Pharmacological Basis of Therapeutics (ed. Goodman, LS & Gilman, A,): 1-46 (1975).
Fogarty, Patrick F. "Biological rationale for new drugs in the bleeding disorders pipeline." ASH Education Program Book 2011.1 (2011): 397-404.
Freshney "Culture of animal cells: A manual of basic technique" (Culture of Animal Cells, A Manual of Basic Technique, Alan R. Liss, Inc., 1983, New York, pp. 1-4).
Fuentes-Prior et al. "Structural basis for the anticoagulant activity of the thrombin-thrombomodulin complex" Nature. Mar. 30, 2000; 404 (6777):518-25.
Furuhashi et al. "Fusing the carboxy-terminal peptide of the chorionic gonadotropin (CG)-subunit to the common alpha-submit:: Retention of O-linked glycosylation and enhanced in vivo bioactivity of chimeric human CG" Molecular Endocrinology 9(1):54-63 (1995).
Furuhashi et al. "Processing of O-linked glycosylation in the chimera consisting of alpha-subunit and carboxyl-terminal peptide of the human chorionic gonadotropin beta- subunit is affected by dimer formation with follicle-stimulating hormone beta-subunit" Endocrine Journal 51(1):53-59 (2004).
Gao et al., "Erythropoietin gene therapy leads to autoimmune anemia in macaques" Blood 103(9):3300-3302 (2004).
Garcia-Campayo et al. "Unmasking a new recognition signal for< i> O</i>-linked|glycosylation in the chorionic gonadotropin β subunit" Molecular and Cellular Endocrinology 194.1: 63-70 (2002).
Gardella et al. "Expression of Human Parathyroid Hormone-( I-84) in *Escherichia coli* as a Factor X-cleavable Fusion Protein" J. Biol. Chem. 265:15854-15859 (1990).
Gellerfors et al. "Characterisation of a secreted form of recombinant derived human growth hormone, expressed in *Escherichia coli* cells", J Pharm Biomed Anal 7(2):173-83 (1989).

(56) References Cited

OTHER PUBLICATIONS

Genbank Accession No. NP 002045 (version 1), Sep. 6, 2014.
Ghosh et al., "Activity and regulation of factor VIIa analogs with increased potency at the endothelial cell surface." Journal of Thrombosis and Haemostasis 5.2: 336-346 (2007).
Gilboa et al., "Transfer And Expression of Cloned Genes Using Retroviral Vectors", Biotechniques, vol. 4:504-512, (1986).
Goodson, Ch. 6 'Dental Applications' in "Medical applications of controlled release." vol. 2: 115-138 (1984).
Gossen et al. Inducible gene expression systems for higher eukaryotic cells. Current opinion in biotechnology. Oct. 1, 1994;5(5):516-20.
Gurley et al. "Upstream Sequences Required for Efficient Expression of a Soybean Heat Shock Gene" Mol.Cell.Biol 6:559-565 (1986).
Hacke et al. "Intravenous thrombolysis with recombinant tissue plasminogen activator for acute hemispheric stroke. The European Cooperative Acute Stroke Study (ECASS)" JAMA. 1995;274(13):1017-1025.
Hammerling et al. "In vitro bioassay for human erythropoietin based on proliferative stimulation of an erythroid cell line and analysis of carbohydrate-dependent microheterogeneity" Journal of Pharm. Biomed. Analysis 14(11):1455-1469 (1996).
Havron et al. "OR2, 8 Phase I PK&PD profile of long acting bio-better CTP modified hGH (MOD-4023) in healthy volunteers"Growth Hormone & IGF Research. Jan. 1, 2010;20:S4-5.
Heffernan et al., "Effects of oral administration of a synthetic fragment of human growth hormone on lipid metabolism." American Journal of Physiology-Endocrinology and Metabolism 279.3: E501-E507 (2000).
Houdebine, L., "The methods to generate transgenic animals and to control transgene expression" Journal of Biotechnology 98:145-160 (2002).
Huston et al. "Protein engineering of antibody binding sites: Recovery of specific activity in an anti-digoxin single-chain Fv analogue produced in *Escherichia coli*" Proc. Natl. Acad. Sci. USA vol. 85, pp. 5879-5883, Biochemistry, Aug. 1988.
International Search Report and Written Opinion for PCT Application No. PCT/IL2015/051196 dated Apr. 15, 2016.
International Search Report and Written Opinion for PCT Application No. PCT/IL2015/051197 dated May 19, 2016.
Isgaard et al. "Effects of local administration of GH and IGF-1 on longitudinal bone growth in rats" Am J Physiol. Apr. 1986;250(4 Pt 1):E367-72.
Jarrousse et al. "Oxyntomodulin (glucagon-37) and its C-terminal octapeptide inhibit gastric acid secretion", FEBS Lett. Aug. 19, 1985; 188(1): 81-4.
Joshi et al. "Recombinant thyrotropin containing a beta-subunit chimera with the human chorionic gonadotropin-beta carboxyterminus is biologically active, with a prolonged plasma half-life: role of carbohydrate in bioactivity and metabolic clearance" Endocrinology. Sep. 1995;136(9):3839-48.
Kanda et al. "Genetic Fusion of an a-subunit Gene to the Follicle-Stimulating Hormone and Chorionic Gonadotropin-b Subunit Genes: Production of a Bifunctional Protein", Molecular Endocrinolog, vol. 13, No. 11, p. 1873-1881, Nov. 1999.
Kelly et al. "Outcomes of patients with Burkitt lymphoma older than age 40 treated withintensive chemotherapeutic regimens." Clin Lymphoma Myeloma. Aug. 2009;9(4):307-10.
Kessler et al. "Structure and location of the O-glycosidic carbohydrate units of human chorionic gonadotropin" J Biol Chem. 25;254(16):7909-14 , Aug. 1979.
Kessler et al., "Structures of N-Glycosidic Carbohydrate Units of Human Chorionic Gonadotropin" J Biol Chem. Aug. 25, 1979;254(16):7901-8.
Kicman et al., "Human chorionic gonadotrophin and sport." British Journal of Sports Medicine 25.2 : 73-80 (1991).
Kieffer et al. "Distribution of glucagon receptors on hormone-specific endocrine cells of rat pancreatic islets" Endocrinology. Nov. 1996;137(11):5119-25.

Knudsen et al. "Small-molecule agonists for the glucagon-like peptide 1 receptor", PNAS, Jan. 16, 2007, vol. 104, No. 3, 937-942.
Kontermann, "Half-Life Modulating Strategies—An Introduction." Therapeutic Proteins: Strategies to Modulate Their Plasma Half-Lives : 1-21 (2012).
Kontermann, "Strategies for extended serum half-life of protein therapeutics." Current opinion in Biotechnology 22.6: 868-876 (2011).
Kotler et al., "Effects of growth hormone on abnormal visceral adipose tissue accumulation and dyslipidemia in HIV-infected patients." JAIDS Journal of Acquired Immune Deficiency Syndromes 35.3: 239-252 (2004).
Krantz et al. "Specific binding of erythropoietin to spleen cells infected with the anemia strain of Friend virus" Proc Natl Acad Sci U S A. Dec. 1984;81(23):7574-8.
Langer Robert "New Methods of Drug Delivery" Science 249:1527-1533 (1990).
Larsen et al., "Accumulation of magnetic iron oxide nanoparticles coated with variably sized polyethylene glycol in murine tumors." Nanoscale 4.7: 2352-2361 (2012).
Le et al., "Improved Vancomycin Dosing in Children Using Area Under the Curve Exposure." Pediatr Infect Dis J vol. 32, pp. e155-e163 (2013).
Lentz et al., "Posttranslational modification of the carboxy-terminal region of the. beta. subunit of human chorionic gonadotropin." Biochemistry 23.22: 5330-5337 (1984).
Li et al. "Bioassay of hGH .I. Weight gain of hypophysectomized rats". Abstract, Yaowu Fenxi Zazhi 15(2), 3-7 (1995).
Lippin et al. "Human erythropoietin gene therapy for patients with chronic renal failure" Blood 106(7):2280-2286 (2005).
Littlewood, T.J. "Erythropoietin for the treatment of anemia associated with hematological malignancy" Hematol Oncol. Mar. 2001;19(1):19-30.
Lo et al. "The effects of recombinant human growth hormone on body compositionandglucose metabolism in HIV-infected patients with fat accumulation" J Clin Endocrinol Metab. Aug. 2001;86(8):3480-7. PubMed PMID: 11502767.
Lopez-Berenstein, Liposomes in the Therapy of Infectious Disease and Cancer, Lopez- Berestein and Fidler (eds.), Liss, New York, pp. 317-327 (1989).
Lopez-Berestein et al. "Treatment of systemic fungal infections with liposomal amphotericin B." Arch Intern Med. Nov. 1989;149(11):2533-6.
Maheshwari et al., "Manipulation of Electrostatic and Saccharide Linker Interactions in the Design of Efficient Glycopolypeptide-Based Cholera Toxin Inhibitors." Macromolecular bioscience 10.1: 68-81 (2010).
Maston et al., "Chorionic gonadotropin beta subunit [*Homo sapiens*]" NCBI Accession No. AAL69705.1 (Apr. 3, 2002).
Matsumoto et al. The measurement of low levels of factor VIII or factor IX inhemophilia A and hemophilia B plasma by clot waveform analysis and thrombin generation assay. Journal of Thrombosis and Haemostasis vol. 4:377-384 (2006).
Matsuo et al. "Thrombolysis by human tissue plasminogen activator and urokinase in rabbits with experimental pulmonary embolus" Nature. Jun. 18, 1981;291(5816):590-1.
Maun et al., "Disulfide locked variants of factor VIIa with a restricted β-strandconformation have enhanced enzymatic activity." Protein Science 14.5: 1171-1180 (2005).
McAlister et al. "NMR analysis of the N-terminal SRCR domain of human CD5: engineering of a glycoprotein for superior characteristics in NMR experiments." Protein Engineering 11.10: 847-853 (1998).
Meulien et al., "Increased biological activity of a recombinant factor IX variant carrying alanine at position+ 1." Protein Engineering 3.7: 629-633 (1990).
Milton et al. The Delineation of a Decapeptide Gonadotropin-releasing Sequence in the Carboxyl-terminal Extension of the Human Gonadotropin releasing Hormone Precursor. The Journal of Biological Chemistry, vol. 261/36:16990-16997 (Dec. 1986).
Morgan et al. "The amino acid sequence of human chorionic gonadotropin. The alpha subunit and beta subunit", J Biol Chem. Jul. 10, 1975;250(13):5247-58.

(56) References Cited

OTHER PUBLICATIONS

Muleo et al. Small doses of recombinant factor VIIa in acquired deficiencies of vitamin K dependent factors. Blood Coagulation & Fibrinolysis Abstract, 10(8), 521-522 (1999).
Murray et al. "Dose titration and patient selection increases the efficacy of GH replacement in severely GH deficient adults", Clinical Endocrinology (1999) 50, pp. 749-757.
Musto "The role of recombinant erythropoietin for the treatment of anemia in multiple myeloma" Leuk Lymphoma. Apr. 1998;29(3-4):283-91.
Mutter et al. "A New Base-Labile Anchoring Group for Polymer-Supported Peptide Synthesis." Helvetica chimica acta 67.7 (1984): 2009-2016.
Mutter et al. "Evolution versus design: template-directed self-assembly of peptides to artificial proteins (TASP)." Chimia International Journal for Chemistry 54.10 (2000): 552-557.
Nezu et al. "Treatment of idiopathic pituitary dwarfism with human growth hormone", ournal of Nara Medical Association 1989, vol. 40, No. 1, p. 16-22; with English Abstract.
Ngo et al. "Computational Complexity, Protein Structure Protein Prediction and the Levinthal Paradox" in Birkhauser The Protein Folding Problem And Tertiary Structure Prediction, pp. 433-440 and 492-495 (1994).
Office Action for Japanese Application No. 2014-523441 dated May 24, 2016.
Ogle et al. "Renal effects of growth hormone. I. Renal function and kidney growth", Pediatr. Nephrol. vol. 6:394-398, 1992.
Oosterhof et al. Regulation of whole body energy homeostasis with growth hormonereplacement therapy and endurance exercise Physiol Genomics. Jun. 28, 2011;43(12):739-48. doi: 10.1152/physiolgenomics. 00034.2010. Epub Mar. 29, 2011.
Pedrosa et al., "Selective neoglycosylation increases the structural stability of vicilin, the 7S storage globulin from pea seeds." Archives of Biochemistry and Biophysics 382.2: 203-210 (2000).
Persson et al., "Rational design of coagulation factor VIIa variants with substantially increased intrinsic activity." Proceedings of the National Academy of Sciences 98.24: 13583-13588 (2001).
Persson et al. "Recombinant coagulation factor VIIa—from molecular to clinical aspects of a versatile haemostatic agent", Thrombosis Research (2010) 125: 483-489.
Philips A. "The challenge of gene therapy and DNA delivery" J Pharm. Pharmacology 53:1169-1174 (2001).
Pierce et al. "Glycoprotein hormones: structure and function." Annual review of biochemistry 50.1: 465-495 (1981).
Pinkert et al. "An albumin enhancer located 10 kb upstream functions along with itspromoter to direct liver-specific expression in transgenic mice" Genes Dev. 1:268-277 (1987).
Pocai et al. "Glucagon-Like Peptide 1/Glucagon Receptor Dual Agonism Reverses Obesity in Mice", Diabetes, vol. 58, Oct. 2009, pp. 2258-2266.
Polizzotti et al. "Effects of saccharide spacing and chain extension on toxin inhibition by glycopolypeptides of well-defined architecture", Macromolecules 40.20: 7103-7110 (2007).
Poreddy et al., "Exogenous fluorescent tracer agents based on pegylated pyrazinedyes for real-time point-of-care measurement of glomerular filtration rate." Bioorganic & Medicinal Chemistry 20.8: 2490-2497 (2012).
Puett et al. Structure-Function relationships of the luteinizing hormone receptor Ann. NY Acad. Sci. 1061: 41-54, 2005.
Ramsey et al. "Surface treatments and cell attachment" In Vitro Cellular & Developmental Biology—Plant. Oct. 1, 1984;20(10):802-8.
Rebois et al., "Hydrodynamic properties of the gonadotropin receptor from a murine Leydig tumor cell line are altered by desensitization." Biochemistry 26.20: 6422-6428 (1987).
Reichel "Sarcosyl-Page: a new electrophoretic method for the separation and immunological detection of PEGylated proteins." Protein Electrophoresis. Humana Press 65-79 (2012).
Reiter et al. "A multicenter study of the efficacy and safety of sustained release GH inthe treatment of naive pediatric patients with GH deficiency" J Clin Endocrinol Metab. 86(10):4700-6 (Oct. 2001).
Ronzi et al. Optimisation of a freeze-drying process of high purity Factor VIII and Factor IX concentrates. Chemical Engineering and Processing. vol. 42:751-757 (2003).
Rudman et al. "Effects of human growth hormone in men over 60 years old" N Engl J Med. Jul. 5, 1990;323(1):1-6.
Runge et al. "Different domains of the glucagon and glucagon-like peptide-1 receptors provide the critical determinants of ligand selectivity", British Journal of Pharmacology (2003) 138, 787-794.
Russell et al. "Local injections of human or rat growth hormone or of purified human somatomedin-C stimulate unilateral tibial epiphyseal growth in hypophysectomized rats" Endocrinology. Jun. 1985;116(6):2563-7.
Sambrook, Joseph et al. "Molecular cloning: a laboratory manual." Cold Spring Harbor Laboratory Press, Cold Spring Harbor, New York 2 (2001), Index Only.
Saudek et al. "A preliminary trial of the programmable implantable medication system for insulin delivery" N Engl J Med. 321:574 (1989).
Schein, Catherine H. "The shape of the messenger: Using protein structure information to design novel cytokine-based therapeutics" Abstract; Current Pharmaceutical Design 8(24):2113-2129 (2002).
Scheuttrumpf et al., "Factor IX variants improve gene therapy efficacy for hemophilia B." Blood 105.6: 2316-2323 (2005).
Schneider KH "GMP Requirements for master and working cell bank" Pharmazeutische Industrie. Jan. 1, 2005;67(11):1366-9.
Schulte "Half-life extension through albumin fusion technologies", Thrombosis Research (2009) 124 Suppl. 2;S6-S8.
Sefton, "Implantable pumps." Critical Reviews in Biomedical Engineering 14.3: 201-240 (1987).
Shechter et al. "Reversible PEGylation of peptide YY3-36 prolongs its inhibition of food intake in mice", FEBS Lett. Apr. 25, 2005;579(11):2439-44.
Sheffield et al. "Effects of genetic fusion of factor IX to albumin on in vivo clearance in mice and rabbits", Blackwell Publishing Ltd, British Journal of Haematology (2004) 126:565-573.
Silverman et al. "A long-acting human growth hormone (Nutropin Depot): Efficacy and safety following two years of treatment in children with growth hormone deficiency" J Pediatr Endocrinol Metab. 15 Suppl 2:715-22. (May 2002).
Smeland et al. "Treatment of Burkitt's/Burkitt-like lymphoma in adolescents and adults: a 20-year experience from the Norwegian Radium Hospital with the use of three successive regimens." Ann Oncol. Jul. 2004;15(7):1072-8.
Speiser et al. "Optimization of spray-dried and -congealed lipid micropellets and characterization of their surface morphology." Pharm. Res. 8:47-54 (1991).
Srour et al. "Regulation of human factor IX expression using doxycycline-inducible gene expression system." Thromb Haemost 90.3 (2003): 398-405.
Stuart et al. "Polycythemia vera" Am Fam Physician. May 1, 2004;69(9):2139-44.
Studier F.W. et al "Use of T7 RNA Polymerase to Direct Expression of Cloned Genes" Methods in Enzymol. 185:60-89 (1990).
Su et al. "Curcumin Inhibits Human Lung Cell Carcinoma Cancer Tumour Growth in a Murine Xenograft Model" (Phytother. Res. 24:189-191, 2010).
Sugahara et al. "Characterization of the O-glycosylation sites in the chorionic gonadotropin β subunit in vivo using site-directed mutagenesis and gene transfer." Journal of Biological Chemistry 271.34: 20797-20804 (1996).
Takamatsu et al. "Expression of bacterial chloramphenicol acetyltransferase gene in tobacco plants mediated by TMV-RNA" EMBO J 6:307-311 (1987).
Takeya et al. "Bovine factor VII. Its purification and complete amino acid sequence". Journal of Biological Chemistry. Oct. 15, 1988;263(29):14868-77.
Tape et al. "Apolipoprotein A-I and apolipoprotein SAA half-lives during acute inflammation and amyloidogenesis", Biochimica et Biophysica Acta (lipid and lipid metabolism) 1043: 295-300, 1990.

(56) References Cited

OTHER PUBLICATIONS

Tharakan et al. "Emerging therapies in the treatment of 'diabesity': beyond GLP-1" Trends Pharmacol Sci. Jan. 2011;32(1):8-15.
Treat, J, Greenspan, AR, and Rahman, A. Liposome Encapsulated Doxorubicin—Preliminary Results of Phase I and Phase II Trials. in: G Lopez-Berestein, IJ Fidler (Eds.) Liposomes in the Therapy of Infectious Diseases and Cancer. Alan R. Liss, New York; 1989: 353-365.
Uenalp et al. "Factor VII deficiency associated with valproate treatment" Pediatrics International 50(3):403-405 (2008).
Venn et al. "Biosynthesis and metabolism in vivo of intervertebral-disc proteoglycans in the mouse." Biochem. J 215: 217-225 (1983).
Verhoef et al. "Recombinant human erythropoietin for the treatment of anemia in the myelodysplastic syndromes: a clinical and erythrokinetic assessment" Ann Hematol. Jan. 1992;64(1):16-21.
Weiss et al. "Noncompliance in Neurologic Patients" Current Treatment Options in Neurology 7:419-425 (2005).
Weissbach and Weissbach, "Methods for Plant Molecular Biology." Selected Methods in Enzymology (USA) Section VIII: 421-463 (1988).
Wells, J.A, "Additivity of Mutational Effects in Proteins" Biochemistry 29:8509-8517 (1990).
White et al. "Mammalian Recombinant Coagulation Proteins: Structure and Function", Transfus. Sci. (1998) 19(2):177-189.
Wildt et al., "The humanization of N-glycosylation pathways in yeast." Nature Reviews Microbiology 3.2: 119-128 (2005).
Wilken et al. "A novel four-amino acid determinant defines conformational freedom within chorionic gonadotropin β-subunits." Biochemistry 46.14: 4417-4424 (2007).
Winoto et al. "A novel, inducible and T cell-specific enhancer located at the 3' end of the T cell receptor alpha locus" EMBO J. 8:729-733 (1989).
Wynne et al. "Subcutaneous oxyntomodulin reduces body weight in overweight and obese subjects a double-blind, randomized, controlled trial." Diabetes 54.8 (2005): 2390-2395.
Yefenof & McConnell "Interferon amplifies complement activation by Burkitt's lymphoma cells" Nature. Feb. 21-27, 1985;313(6004):68.
Yin et al. "Recombinant human growth hormone replacement therapy in HIV-associated wasting and visceral adiposity". Exper. Rev. Anti-Infect. Ther. 3(5):727-736 (2005).
Zheng et al., "The impact of glycosylation on monoclonal antibody conformation and stability." MAbs. vol. 3. No. 6. Landes Bioscience (Nov.-Dec. 2011), pp. 568-576.
Zhong et al. "The N-terminal epidermal growth factor-like domain in factor IX and factor X represents an important recognition motif for binding to tissue factor" J. Biol. Chem. (2002) 277(5):3622-31.
Aleman et al. "Some Methods for Contamination Testing of a Master Cell Bank", vol. 13, Iss. 6, Jun. 2000, pp. 48-52.
Extended European Search Report from European Application No. EP18198355 dated Mar. 21, 2019.
McNeil, "No Rest for Fatigue Researcher". JNCI Oxford Journals, vol. 100, Issue 16, Aug. 20, 2008, pp. 1129-1131.
Morel, "Mouse Models of Human Autoimmune Diseases: Essential Tools That Require the Proper Controls". PLoS Biology, vol. 2, Issue 8, e224, e241; Aug. 2004, pp. 1061-1064.
Riddick et al., "A stepwise increase in recombinant human growth hormone dosing during puberty achieves improved pubertal growth: A national cooperative study report". Journal of Pediatric Endocrinology & Metabolism, 22, 623-628 (2009).
Rosario, "Normal Values of Serum IGF-1 in Adults: Results from a Brazilian Population"., Arq Bras Endocrinol Metab. 2010:54/5, pp. 477-481.
Supplementary European Search Report for Application No. 16811146 mailed on Jan. 8, 2019.
Wilson et al., "Assessing Annotation Transfer for Genomics: Quantifying the Relations between Protein Sequence, Structure and Function through Traditional and Probabilistic Scores". Academic Press 2000. J. Mol. Biol. (2000) 297, pp. 233-249.
Yong et al., Abstract of "The molecular design and drug development of recombinant long-acting follicle stimulating hormone". Institute of Molecular Medicine, Huaqiao University, Quanzhou 362021, China; Centre for Reproduction and Genomics, AgResearch, Invermay, Mosgiel 9053, New Zealand), Acta Pharmaceutica Sinica 2012, 47 (4): 421-426.
Calo Doron, et al. "Enhancing the longevity and in vivo potency of therapeutic proteins: the power of CTP." Precision Medicine 1 (2015), pp. 1-8.
Chinese Search Report from Chinese Application No. 2015800735547 dated May 25, 2020.
Dalton, Annamarie, et al., "Over-expression of Secreted Proteins from Mammalian Cell Lines", Protein Society, vol. 23, Feb. 9, 2014, pp. 517-525.
International Search Report and Written Opinion for PCT Application No. PCT/IL2020/050769 dated Sep. 22, 2020.
Naguib, et al. "Development and validation of an IGF-1-modified Child-Pugh score to risk-stratify hepatocellular carcinoma patients." Egyptian Journal of Obesity, Diabetes and Endocrinology 1.1 (2015), pp. 14-20.
Sola, Ricardo J., and Kai Griebenow. "Glycosylation of therapeutic proteins." Bio Drugs 24.1 (2010): pp. 9-21.
Beeley, Laboratory Techniques in Biochemistry and Molecular Biology, vol. 16, Amsterdam, Elsevier Science Publishing Company, pp. 69-72 (1985).
European Search Report dated Dec. 10, 2020 from European Application No. EP 20172836.
Dati et al., "Guidelines for Clinical Application of Protein Laboratory Testing Programs," Sections 10.6.3 and 10.6.4, in *Proteins: Laboratory Testing and Clinical Use*, Shanghai Science & Technology Publishers, Shanghai, China (2008), pp. 102-103.
Hershkovitz et al., "Analytical and Bioanalytical Characterization of MOD-4023, a Long-Acting Growth Hormone," *Hormone Research in Paediatrics*, 80(Suppl.1):62, FC16-215 (2013).
Hershkovitz et al., "Highly Producing Fed-Batch Manufacturing Process of Long Acting Human Growth Hormone (MOD-4023) in CH Cells," *Endocrine Reviews*, 34(3):SAT-647 (2013).
Nguyen et al., "Stability and Characterization of Recombinant Human Relaxin," in: *Formulation, Characterization, and Stability of Protein Drugs*, Pearlman et al. (eds.), Plenum Press, New York (1996), pp. 247-274.
Varki et al., "Biological Roles of Glycans," in *Essentials of Glycobiology* (2d ed.), Varki er al. (eds.), Cold Spring Harbor (NY), Cold Spring Harbor Laboratory Press, Chapter 6 (11 pages) (2009).
Wang et al., "Section 3: Glycan's Biological Messages and Functions" in *Biochemistry and Molecular Biology*, Second Military Medical University Press, pp. 406-407 (2012).
Extended European Search Report from European Application EP 23164376.8, dated Nov. 8, 2023, 8 pages.
Search Report issued in Russian Federation Application No. 2021103436, dated Aug. 8, 2024; 4 pages with English translation.

\* cited by examiner

| Sample Name | Content O-Glycan mean values [mol O-glycan/mol Protein]* |
|---|---|
| DS Batch#1 | 12.1 |
| DP Batch | 12.3 |
| DS Batch#2 | 11.5 |
| DS Batch#3 | 11.5 |
| DS Batch#4 | 11.9 |
| Mean | 11.9 |
| SD | 0.4 |
| %CV | 3.4 |

Figure 7

| Column/Operation | Log10 Reduction of Model Virus | | | |
|---|---|---|---|---|
| | MuLV | PRV | Reo-3 | MVM |
| Inactivation with Triton X-100 | ≥ 4.74 | ≥ 5.16 | N/A | N/A |
| DEAE- Sepharose | > 4.02 | > 3.01 | N/A | 1.22 |
| CHT | 2.59 | 4.11 | N/A | 1.32 |
| SP Sepharose | ≥ 4.95 | 5.72 | 2.07 | 3.87 |
| Nano filtration | ≥ 6.88 | ≥ 7.76 | ≥ 7.46 | 7.20 |
| Overall reduction | ≥ 23.18 | ≥ 25.76 | ≥ 9.53 | 13.61 |
| Theoretical maximal viral load per dose | < 6.9 | N/A | N/A | N/A |
| Safety margin | ≥ 16.28 | N/A | N/A | N/A |

Figure 14

O-link Glycan Profile of MOD-4023

| Structure | Glycan Units | % Peak Area | |
|---|---|---|---|
| | | MOD-4023 sample#1 | MOD-4023 sample#2 |
| Galb1,3-GalN | 1.76 | 5.4 | 6.4 |
| SAa2,3-Gal (peeling) | 2.25 | 11.2 | 14.2 |
| Unknown | 2.97 | 5.6 | 6.1 |
| SAa2,3-Galb 1,2-GalN | 3.02 | 71.0 | 69.8 |
| SAa2,3-Galb 1,3-(SAa2,6)-GalN | 4.72 | 6.8 | 3.5 |

♦ GalNAc; ◇ Gal; ★ SA; ■ GlcNAc; -------- α-linkage; ———— β-linkage

*Linkage position*

Sialic Acid Type in MOD-4023 Samples

| Sialic Acid Type | MOD-4023 sample#1 % abundance (average) | MOD-4023 sample#2 % abundance (average) |
|---|---|---|
| Neu5Gc[1] | n.d | 0.45 |
| Neu5Ac[2] | 98.65 | 95.95 |
| Unknown | n.d. | 0.45 |
| Neu5,9Ac2[3] | 1.35 | 3.1 |

[1] Neu5Gc-NGNA
[2] Neu5Ac- NANA
[3] Neu5,9Ac2 -di acetylated NANA
n.d –not detected

Figure 15B

| m/z observed | z | M observed | | Possible assignment | Calculated expected mass | Detected at tR [min] | | |
|---|---|---|---|---|---|---|---|---|
| | | | | | | 648-01-10-0114A | 648-01-10-0194A | 648-01-11-003A |
| 1384.4 | 4 | 5533.6 | 1-36 | SSSSKAPPPSLPSPSRLPGPSDTPPILPQFPTI PLSR [+ 5 HexNAc-Hex] (SEQ ID NO: 15) | 5533.7 | 35.4 | 35.4 | 35.4 |
| 1475.8 | 4 | 5899.2 | 1-36 | SSSSKAPPPSLPSPSRLPGPSDTPPILPQFPTI PLSR [+ 6 HexNAc-Hex] (SEQ ID NO: 15) | 5898.8 | 34.5 | 34.5 | 34.6 |
| 1174.1 | 4 | 4692.4 | 6-36 | APPPSLPSPSRLPGPSDTPPILPQFPTIPLSR [+ 4 HexNAc-Hex] (SEQ ID NO: 11) | 4692.3 | 35.6 | 35.6 | 35.6 |
| 837.8 | 3 | 2510.4 | 17-36 | LPGPSDTPPILPQFPTIPLSR [+ 1 HexNAc-Hex] (SEQ ID NO: 10) | 2510.3 | 38.1 | 38.1 | 38.1 |
| 1025.4 | 2 | 2048.8 | 212-224 | SVECSCGFSSSSK [+ 2 HexNAc-Hex] (SEQ ID NO: 13) | 2048.8 | 22.4 | 22.6 | 22.4 |
| 1337.7 | 6 | 8020.2 | 225-275 | APPPSLPSPSRLPGPSDTPPILPQSSSSKAPPP SLPSPSRLPGPSDTPPILPQ [+ 8 HexNAc-Hex] (SEQ ID NO: 14) | 8019.8 | 31.2 | 31.2 | 31.3 |
| 1798.8 (averaged) | 6 | 10787 | 212-275 | SVECSCGFSSSSKAPPPSLPSPSRLPGPSDTP PILPQSSSSKAPPPSLPSPSRLPGPSDTPPILPQ [+ 12 HexNAc-Hex] (SEQ ID NO: 17) | 10787 (average) | 30.5 | 30.3 | 30.4 |
| 1139.6 | 3 | 3415.8 | 253-275 | APPPSLPSPSRLPGPSDTPPILPQ [+ 3 HexNAc-Hex] (SEQ ID NO: 16) | 3415.6 | 31.4 | 31.4 | 31.5 |
| 800.4 | 2 | 1598.8 | 264-275 | LPGPSDTPPILPQ [+ 1 HexNAc-Hex] (SEQ ID NO: 12) | 1598.8 | 31.1 | 31.1 | 31.1 |

Figure 17

1 SSSSKAPPPSLPSPSRLPGPSDTPILPQFP 30

Figure 18

211 RSVEGSCGFSSSKAPPPSLPSPSRLPGPS 240
241 DTPILPQSSSKAPPPSLPSPSRLPGPSDT 270
271 PILPQ

Figure 19

| Purity by RP-HPLC | RP-HPLC Method | DS GMP1 1008137 | DS GMP2 1009976 | DS GMP3 1016455 | DS GMP4 1016456 | DS GMP5 1019182 | DS GMP6 1025279 | DS GMP7 1025281 | DS GMP8 1025282 | Range |
|---|---|---|---|---|---|---|---|---|---|---|
| main peak | RP-HPLC separates molecules according to their polarity. A mobile phase gradient from a more polar to a less polar solvent is used to elute molecules with a strong polarity earlier than less polar molecules. RP-HPLC separates MOD-4023 Drug Substance into a main peak and minor peaks, representing product-related variants. The related forms are separated from the native protein using UV detection at 220 nm | 97.3% Area | 97.5% Area | 97.7% Area | 97.9% Area | 97.8% Area | 97.4% Area | 97.4% Area | 97.6% Area | ≥ 94.0% Area |

Figure 21

| Purity by SEC-HPLC | SEC-HPLC Method | DS GMP1 1008137 | DS GMP2 1009976 | DS GMP3 1016455 | DS GMP4 1016456 | DS GMP5 1019182 | DS GMP6 1025279 | DS GMP7 1025281 | DS GMP8 1025282 | Range |
|---|---|---|---|---|---|---|---|---|---|---|
| | Size Exclusion HPLC is a chromatographic technique that separates molecules according to size. Within the fractionation range chosen, larger molecules elute earlier than smaller molecules. The separation mechanism is non-adsorptive and molecules are eluted under isocratic conditions. SE-HPLC enables monomers to be separated from higher molecular weight forms (such as dimers and polymers) of the target molecule. | | | | | | | | | |
| SEC-HPLC Monomer | | > 99.1% Area | > 99.2% Area | 98.2% Area | 97.8% Area | 98.2% Area | 96.5% Area | 97.1% Area | 97.5% Area | ≥ 92.0% Area |

Figure 22

| Potency | Method | DS GMP1 1008137 | DS GMP2 1009976 | DS GMP3 1016455 | DS GMP4 1016456 | DS GMP5 1019182 | DS GMP6 1025279 | DS GMP7 1025281 | DS GMP8 1025282 | Range |
|---|---|---|---|---|---|---|---|---|---|---|
| Bioidentity Test | Weight Gain Assay (USP) is performed according to the Bioidentity Test, described in USP edition 35 somatropin monograph. Hypophysectomized rats from which the pituitary gland has been removed lose their ability to gain weight. Injections of MOD-4023 to these rats result in weight gain. Based on the measured weight gain after a defined period of time and the amount of MOD-4023 injected, the specific activity of MOD-4023 is determined. | 6 USP Somatropin units per mg | 4.77 USP Somatropin units per mg | 4.5 USP Somatropin units per mg | 3.5 USP Somatropin units per mg | 3.2 USP Somatropin units per mg | 2.3 USP Somatropin units per mg | 3.4 USP Somatropin units per mg | 3.0 USP Somatropin units per mg | Not Less than 2 USP Somatropin units per mg |
| Cell based assay | Pro-B cell line Baf/BO3 was used for the assessment of hGH potency, demonstrating an hGH dose-dependent proliferative response, as measured by the stimulation of cellular division. MOD-4023, can also induce a dose-dependent cell proliferation response by binding to the human growth hormone receptor (hGHR) on the Baf/HGHR/B2B2 surface. | 1.8 | 0.9 | 1.1 | 1.1 | 0.9 | 1.2 | 1.4 | 1.1 | The relative potency of the sample versus the Reference Standard should be within 0.7-1.4. |

Figure 23

| Impurity | Method | DS GMP1 1028137 | DS GMP2 1009976 | DS GMP3 1016455 | DS GMP4 1016456 | DS GMP5 1019182 | DS GMP6 1025179 | DS GMP7 1025281 | DS GMP8 1025282 | Range |
|---|---|---|---|---|---|---|---|---|---|---|
| HCP | CHO host cell proteins (HCP) in MDD-4023 is determined using a validated ELISA kit F550 from Cygnus Technologies, which is a complete kit for the quantitative determination of Chinese Hamster Ovary (CHO) host cell proteins. | 23 ng/mg (ppm) | 14 ng/mg (ppm) | 12 ng/mg (ppm) | <12 ng/mg (ppm) | 7 ng/mg (ppm) | 13 ng/mg (ppm) | 5 ng/mg (ppm) | 5 ng/mg (ppm) | ≤100 ng/mg (ppm) |
| DNA | Residual DNA content is determined using quantitative real-time PCR (qPCR). | <1 µg/mg (ppb) | <1 µg/mg (ppb) | <1 µg/mg (ppb) | <1 µg/mg (ppb) | <1 µg/mg (ppb) | <1 µg/mg (ppb) | <1 µg/mg (ppb) | <1 µg/mg (ppb) | ≤10 pg/mg (ppb) |
| MTX | Quantitation of residual methotrexate in bulk Drug Substance is performed using a liquid chromatography-tandem mass spectrometry limit test | <50 ng/mL | <50 ng/mL | <50 ng/mL | <50 ng/mL | <50 ng/mL | <50 ng/mL | <50 ng/mL | <50 ng/mL | ≤50 ng/mL |
| PG | Determination of residual propylene glycol in DS is performed by a headspace gas chromatographic method using an RTX-35 30 meter megabore column and FID detector | <60 µg/mL | <60 µg/mL | ≤60 µg/mL | <60 µg/mL | ≤60 µg/mL | ≤60 µg/mL | ≤60 µg/mL | ≤60 µg/mL | ≤60 µg/mL |
| Triton | Triton is detected using a validated RP-HPLC method with UV detection at 230nm. | ≤2.5 µg/mL | ≤2.5 µg/mL | ≤2.5 µg/mL | ≤2.5 µg/mL | ≤2.5 µg/mL | ≤2.5 µg/mL | ≤2.5 µg/mL | ≤2.5 µg/mL | ≤2.5 µg/mL |
| Insulin | Quantitation of residual insulin in bulk Drug Substance is performed using a commercial ELISA kit (Mercodia). | <115 pg/mL | <115 pg/mL | <115 pg/mL | <115 pg/mL | <115 pg/mL | <115 pg/mL | <115 pg/mL | <115 pg/mL | ≤115 pg/mL |
| DMSO | Quantitation of DMSO is performed using a gas chromatography method employing a DB-624 30 meter Megabore column. | <250 µg/mL | <250 µg/mL | <250 µg/mL | <250 µg/mL | <250 µg/mL | <250 µg/mL | <250 µg/mL | <250 µg/mL | <250 µg/mL |
| Bioburden | Bioburden testis based on USP <61> and EP 2.6.12 | 0 cfu /10 mL | 0 cfu /10 mL | 0 cfu /10 mL | 0 cfu /10 mL | 0 cfu /10 mL | 0 cfu /10 mL | 0 cfu /10 mL | 0 cfu /10 mL | ≤10 cfu/10 mL |

Figure 24

METHODS OF PRODUCING LONG ACTING CTP-MODIFIED GROWTH HORMONE POLYPEPTIDES

CROSS REFERENCE TO RELATED APPLICATIONS

This application is a National Phase Application of International Application No. PCT/IL2015/051196, filed on Dec. 10, 2015, which claims priority to the following: U.S. Provisional Patent Application No. 62/090,104, filed Dec. 10, 2014, U.S. Provisional Patent Application No. 62/090,116, filed Dec. 10, 2014, and U.S. Provisional Patent Application No. 62/090,124, filed Dec. 10, 2014, all of which are incorporated by reference herein in their entirety.

FIELD OF INTEREST

The present invention provides a method for manufacturing a recombinant human growth hormone (hGH) modified by a CTP extensions in a mammalian cells culture system.

BACKGROUND OF THE INVENTION

Growth hormone (Somatotropin) has been in clinical use for more than 50 years mainly for treating growth hormone deficiency in children, which results in dwarfism. In 1985, human growth hormone (hGH) from recombinant DNA origin replaced the cadaveric pituitary hGH, which was the only source of the material available until then. hGH replacement therapy has been the standard of care for tens of thousands of patients and has proven to be safe and effective. The need to maintain hGH blood levels within an effective therapeutic window requires daily or every other day subcutaneous or intramuscular injections. The majority of commercial hGH is produced in bacterial systems.

Growth hormone (GH) is a 191-amino-acid pituitary protein that stimulates the hepatic production and release of insulin-like growth factor-1 (IGF-1) into the systemic circulation. The majority of the GH preparations currently available require daily administration; hence, compliance can be a problem, especially in adolescents. In adult GH deficiency (GHD), daily administration and concomitant side effects (e.g., injection site discomfort, transient edema and arthralgia) limit the therapeutic utility of existing formulations. A long-acting form of GH has the potential to reduce discomfort by requiring fewer injections and possibly by minimizing the adverse events associated with peaks and troughs in plasma concentration that occur with daily injection.

The methods disclosed herein comprise production of a long-acting hGH (MOD-4023; FIG. 1), which obviates the need for the numerous injections now required for the treatment of GHD. This technology is based on the use of a natural peptide, the C-terminal peptide (CTP) of the beta chain of human chorionic gonadotropin (hCG), which provides hCG with the required longevity to maintain pregnancy (initial $T_{1/2}$~10 h, terminal $T_{1/2}$~37 h). CTP has 28 amino acids and four to six O-linked sugar chains, which are all linked to a serine residue. The beta chain of luteinizing hormone (LH), a fertility hormone that triggers ovulation, is almost identical to hCG but does not include the CTP. As a result, LH has a significantly shorter half-life in blood (initial $T_{1/2}$~1 h, terminal $T_{1/2}$~10 h).

MOD-4023 is an hGH molecule fused to 3 copies of CTP; one at the N-terminus and two at the C-terminus (CTP-hGH-CTP-CTP as set forth in SEQ ID NO: 7) (FIG. 1). MOD-4023 is a single chain protein of 275 amino acids with 12-18 O-linked carbohydrates. As demonstrated in animal models (weight gain of hypophysectomized rats), MOD-4023 may have the potential to be injected once per week to once every two weeks, with similar clinical efficacy to daily injections of hGH.

SUMMARY OF THE INVENTION

In one aspect, disclosed herein is a method of manufacturing a human chorionic gonadotropin carboxy terminal peptide (CTP)-modified human growth hormone (hGH) polypeptide, the method comprising the steps of: (a) stably transfecting a predetermined number of cells with an expression vector comprising a coding portion encoding said CTP-modified human growth hormone, wherein said transfected cell expresses and secretes said CTP-modified hGH; (b) obtaining cell clones that overexpress said CTP-modified hGH; (c) expanding said clones in solution to a predetermined scale; (d) harvesting said solution containing said clones; (e) filtering said solution containing said clones to obtain a clarified harvest solution; and, (f) purifying said clarified harvest solution to obtain a purified protein solution having a desired concentration of a CTP-modified hGH, thereby manufacturing a human chorionic gonadotropin peptide (CTP)-modified human growth hormone (hGH) polypeptide, wherein the amino acid sequence of said CTP-modified hGH is set forth in SEQ ID NO: 7. In a related aspect, said manufactured CTP-modified hGH is highly glycosylated. In a related aspect, said manufactured CTP-modified hGH is highly sialylated. In another related aspect, the glycosylation pattern of said manufactured CTP-modified hGH comprises glycosylation of at least 4 O-linked sites per CTP.

In one aspect, disclosed herein is a human chorionic gonadotropin carboxy terminal peptide (CTP)-modified human growth hormone (hGH) polypeptide manufactured by methods disclosed herein. In a related aspect, glycosylation of the CTP-modified hGH comprises more than 4 O-linked glycans per CTP. In a related aspect, glycosylation comprises at least 4-6 O-glycans per CTP unit.

Other features and advantages will become apparent from the following detailed description examples and figures. It should be understood, however, that the detailed description and the specific examples while indicating embodiments of the manufacturing method and resultant product thereof, are given by way of illustration only, since various changes and modifications within the spirit and scope of the methods and products disclosed herein will become apparent to those skilled in the art from this detailed description.

BRIEF DESCRIPTION OF THE DRAWINGS

The subject matter regarded as the recombinant long-acting human chorionic gonadotropin carboxy-terminal peptide (CTP)-modified human growth hormone (hGH) polypeptide (CTP-modified hGH) and methods of manufacturing the same are particularly pointed out and distinctly claimed in the concluding portion of the specification. The CTP-modified hGH and manufacturing methods thereof, however, both as to organization and method of operation, together with objects, features, and advantages thereof, may best be understood by reference to the following detailed description when read with the accompanying drawings in which:

FIG. 7. Presents data showing robust O-glycan content of MOD-4023 from different batches. The O-glycan molar content per mole of MOD-4023 was determined for different batches of MOD-4023 drug substance (DS) and drug product (DP).

FIG. 14. Presents individual process step and overall process clearance factors derived from viral safety evaluation studies with Abelson Murine Leukemia Virus (A-MuLV), Minute Virus of Mice (MVM), Reovirus type 3 (Reo-3) and Pseudorabies Virus (PrV). Theoretical virus loads per dose were calculated on a maximum dose of 15 mg/dose.

FIGS. 15A and 15B. Show the O-linked glycans structures and their abundance in two MOD-4023 product as measured by 2AB labeling of removed glycans separated on HPLC using normal phase (NP) column. (FIG. 15A) as well the abundance of the Sialic Acid Type in two MOD-423 product samples as measured by 1,2-diamino-4,5-methylenedioxybenzene·2HCl (DMB) labeling of removed sialic acid separated on ultra-performance liquid chromatography (UPLC) and identified against commercial standards (FIG. 15B)

FIG. 17. Shows evaluation of signals obtained from on-line LC/ES-MS analysis of a tryptic digest of de-sialylated, reduced and carboxymethylated MOD-4023 protein batches (as shown in FIG. 16 and discussed in Example 2) with a focus on signal modified by at least one HexNAc-Hex residue.

FIG. 18. Shows amino acid sequence 1-30 of MOD-4023 SEQ ID NO: 7, wherein O-glycosylation takes place on serine (S) residues at positions 10, 13, 15, and 21 (shown in red). Those serines (S) all follow proline (P) residues in the sequence. At least two of the S residues in positions one to four (1-4) are occupied by O-glycosylation sites (shown in purple).

FIG. 19. Shows amino acid sequences 211-275 of MOD-4023 SEQ ID NO: 7, wherein O-glycosylation takes place on serine (S) residues shown in red. Those serines (S) all follow proline (P) residues in the sequence. Additionally, in the region of serine repeats at least two of the S residues are occupied by O-glycosylation sites (shown in purple).

FIG. 21. Shows the MOD-4023 (DS) purity, as assessed using Reverse Phase (RP)-HPLC.

FIG. 22. Shows the MOD-4023 (DS) purity, as assessed using Size Exclusion Chromatograph (SEC)-HPLC.

FIG. 23. Shows potency results.

FIG. 24. Shows the results of impurity analyses for host cell proteins (HCP); DNA, Methotrexate (MTX); Propylene glycol (PG); Triton; Insulin; DMSO; and Bioburden.

Figure 1:
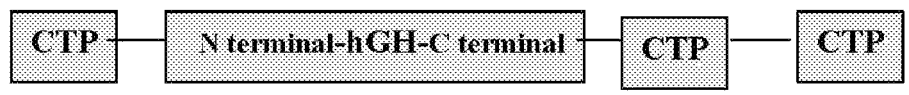
FIG. 1. Presents a schematic diagram illustrating the MOD-4023 (CTP-hGH-CTP-CTP).

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the recombinant long-acting human chorionic gonadotropin carboxy-terminal peptide (CTP)-modified human growth hormone (hGH) polypeptide (CTP-modified hGH; MOD-4023; SEQ ID NO: 7) and methods of manufacturing the same. In other instances, well-known methods, procedures, and components have not been described in detail so as not to obscure the CTP-modified hGH polypeptide and methods of manufacturing the same.

In one embodiment, a long-acting CTP-modified hGH polypeptide disclosed herein comprises carboxy terminal peptide (CTP) of human Chorionic Gonadotropin (hCG). In another embodiment, CTP acts as a protectant against degradation of proteins or peptides derived therefrom. In another embodiment, CTP extends circulatory half-lives of proteins or peptides derived therefrom. In some embodiments, CTP enhances the potency of proteins or peptides derived therefrom.

A skilled artisan would appreciate that the terms "CTP peptide", "carboxy terminal peptide" and "CTP sequence" may be used interchangeably herein. In one embodiment, the carboxy terminal peptide is a full-length CTP. In another embodiment, the carboxy terminal peptide is a truncated CTP.

A skilled artisan would appreciate that the terms "signal sequence" and "signal peptide" may be used interchangeably. In addition, the skilled artisan would appreciate that the term "sequence" when in reference to a polynucleotide may encompass a coding portion of the polynucleotide sequence.

A skilled artisan would appreciate that the terms "polypeptide", "peptide", "peptide of interest", "polypeptide of interest" and "polypeptide sequence of interest" may be used interchangeably. In one embodiment, the peptide of interest is a full-length protein. In another embodiment, the peptide of interest is a growth hormone. In another embodiment, the peptide of interest is a human growth hormone. In another embodiment, the peptide of interest is a protein fragment of a human growth hormone.

In another embodiment, disclosed herein is a polypeptide consisting of a growth hormone, a single human chorionic gonadotropin carboxy terminal peptide (CTP) attached to the amino terminus of the human growth hormone (hGH), and two human chorionic gonadotropin carboxy terminal peptides (CTPs) attached to the carboxy terminus of the GH, wherein said polypeptide lacks a signal peptide, and said CTP-modified hGH polypeptide comprising the amino acid sequence as set forth in SEQ ID NO: 7. In another embodiment, disclosed herein is a CTP-modified hGH polypeptide consisting of a GH, a single CTP attached to the amino terminus of the GH, two CTPs attached to the carboxy terminus of the GH, and a signal peptide attached to the amino terminus of the amino terminal CTP, said polypeptide comprising the amino acid sequence as set forth in SEQ ID NO: 4. A skilled artisan would appreciate that a mature secreted polypeptide lacks a signal peptide.

In one embodiment, disclosed herein is a method of manufacturing a human chorionic gonadotropin carboxy-terminal peptide (CTP)-modified human growth hormone (hGH) polypeptide (CTP-modified hGH), the method comprising the steps of: (a) stably transfecting a predetermined number of cells with an expression vector comprising a coding portion encoding said CTP-modified hGH, wherein said transfected cell expresses and secretes said CTP-modified hGH; (b) obtaining cell clones that overexpress said CTP-modified hGH; (c) expanding said clones in solution to a predetermined scale; (d) harvesting said solution containing said clones; (e) filtering said solution containing said clones to obtain a clarified harvest solution; and, (f) purifying said clarified harvest solution to obtain a purified protein solution having a desired concentration of a CTP-modified hGH, thereby manufacturing a human chorionic gonadotropin carboxy-terminal peptide (CTP)-modified human growth hormone (hGH) polypeptide, wherein the amino acid sequence of the CTP-modified hGH polypeptide is set forth in SEQ ID NO: 7.

In another embodiment, a method of manufacturing comprises clones the express and secrete a CTP-modified hGH having an amino acid sequence set forth in SEQ ID NO: 7. In another embodiment, disclosed herein is a method of manufacturing a CTP-modified hGH polypeptide disclosed herein having increased glycosylation content. In another embodiment, a CTP-modified hGH polypeptide disclosed herein manufactured by the methods disclosed herein has an increased number of O-linked glycosylation sites glycosylated. A skilled artisan would appreciate that the phrase "increased number of 0-linked glycosylation sites glycosylated" may also be expressed as an "increased O-glycan occupancy".

Human Chorionic Gonadotropin Peptide (CTP)-Modified Polypeptides

In one embodiment, disclosed herein are long-acting GH polypeptides and methods of producing or manufacturing and using same. In another embodiment, long-acting polypeptides comprise carboxy terminal peptide (CTP) of human Chorionic Gonadotropin (hCG). In another embodiment, CTP acts as a protectant against degradation of proteins or peptides derived therefrom. In another embodiment, CTP extends circulatory half-lives of proteins or peptides derived therefrom. In some embodiments, CTP enhances the potency of proteins or peptides derived therefrom.

A skilled artisan would appreciate that the terms "CTP peptide", "CTP", "human chorionic gonadotropin carboxy terminal peptide", "carboxy terminal peptide" and "CTP sequence" may be used interchangeably herein. In one embodiment, a carboxy terminal peptide is a full-length CTP. In another embodiment, the carboxy terminal peptide is a truncated CTP.

In another embodiment, disclosed herein is a polypeptide consisting of a GH, a single CTP attached to the amino terminus of the GH, two CTPs attached to the carboxy terminus of the GH, and a signal peptide attached to the amino terminus of the N-terminal CTP, said polypeptide having the amino acid sequence set forth in SEQ ID NO: 4. A skilled artisan would appreciate that a mature, secreted polypeptide may lack a signal peptide. Thus, in yet another embodiment, disclosed herein is a polypeptide consisting of a GH, a single CTP attached to the amino terminus of the GH, two CTPs attached to the carboxy terminus of the GH, and no signal peptide, said polypeptide having the amino acid sequence set forth in SEQ ID NO: 7.

In another embodiment, disclosed herein is a method for producing a polypeptide consisting a polypeptide consisting of a GH, a single CTP attached to the amino terminus of the GH, two CTPs attached to the carboxy terminus of the GH, and a signal peptide attached to the amino terminus of the amino terminal CTP, said polypeptide having the amino acid sequence set forth in SEQ ID NO: 4. In yet another embodiment, disclosed herein is a method for producing a polypeptide consisting of a GH, a single CTP attached to the amino terminus of the GH, two CTPs attached to the carboxy terminus of the GH, and no signal peptide, said polypeptide having the amino acid sequence set forth in SEQ ID NO: 7.

In another embodiment, a GH comprising CTPs set forth in SEQ ID NO: 7 has enhanced in vivo biological activity compared with the same GH without CTPs.

In another embodiment, a subject is a human subject. In another embodiment, a subject is a pet. In another embodiment, a subject is a mammal. In another embodiment, a subject is a farm animal. In another embodiment, a subject is a dog. In another embodiment, a subject is a cat. In another embodiment, a subject is a monkey. In another embodiment, a subject is a horse. In another embodiment, a subject is a cow. In another embodiment, a subject is a mouse. In another embodiment, a subject is a rat. In one embodiment, the subject is male. In another embodiment, the subject is female.

In one embodiment, a carboxy-terminal peptide (CTP) sequence comprises the amino acid sequence set forth in SEQ ID NO: 1:

(SEQ ID NO: 1)
DPRFQDSSSSKAPPPSLPSPSRLPGPSDTPILQ.

In some embodiments, a CTP sequence at both the amino terminal end of a polypeptide and at the carboxy terminal end of the polypeptide provide enhanced protection against degradation of a protein. In some embodiments, CTP sequences at both the amino terminal end of a polypeptide and at the carboxy terminal end of the polypeptide provide an extended half-life to the attached protein.

In some embodiments, a CTP-modified hGH polypeptide disclosed herein has enhanced protection against degradation of the polypeptide. In some embodiments, a CTP-modified hGH polypeptide as disclosed herein has an extended half-life to the attached protein. In some embodiments, a CTP-modified hGH polypeptide disclosed herein has enhanced activity of the hGH.

In another embodiment, a CTP-modified hGH polypeptide disclosed herein has prolonged clearance time. In another embodiment, a CTP-modified hGH polypeptide disclosed herein has enhanced $C_{max}$ of the hGH. In another embodiment, a CTP-modified hGH polypeptide disclosed herein has enhanced $T_{max}$ of the hGH. In another embodiment, a CTP-modified hGH polypeptide disclosed herein has enhanced $T_{1/2}$ of the hGH. In some embodiments, a CTP-modified hGH polypeptide as disclosed herein provides extended half-life of the hGH.

In another embodiment, the carboxy terminal peptide (CTP) peptide disclosed herein comprises the amino acid sequence from amino acid 112 to position 145 of human chorionic gonadotropin, as set forth in SEQ ID NO: 1. In another embodiment, the CTP sequence disclosed herein comprises the amino acid sequence from amino acid 118 to position 145 of human chorionic gonadotropin, as set forth in SEQ ID NO: 2: SSSSKAPPPSLPSPSRLPGPSDTPILPQ. In another embodiment, the CTP sequence also commences from any position between positions 112-118 and terminates at position 145 of human chorionic gonadotropin. In some embodiments, the CTP sequence peptide is 28, 29, 30, 31, 32, 33 or 34 amino acids long and commences at position 112, 113, 114, 115, 116, 117 or 118 of the CTP amino acid sequence.

In another embodiment, the CTP peptide is a variant of chorionic gonadotropin CTP which differs from the native CTP by 1-5 conservative amino acid substitutions as described in U.S. Pat. No. 5,712,122. In another embodiment, the CTP peptide is a variant of chorionic gonadotropin CTP which differs from the native CTP by 1 conservative amino acid substitution. In another embodiment, the CTP peptide is a variant of chorionic gonadotropin CTP which differs from the native CTP by 2 conservative amino acid substitutions. In another embodiment, the CTP peptide is a variant of chorionic gonadotropin CTP which differs from the native CTP by 3 conservative amino acid substitutions. In another embodiment, the CTP peptide is a variant of chorionic gonadotropin CTP which differs from the native CTP by 4 conservative amino acid substitutions. In another embodiment, the CTP peptide is a variant of chorionic gonadotropin CTP which differs from the native CTP by 5 conservative amino acid substitutions. In another embodiment, the CTP peptide amino acid sequence disclosed herein is at least 70% homologous to the native CTP amino acid sequence or a peptide thereof. In another embodiment, the CTP peptide amino acid sequence disclosed herein is at least 80% homologous to the native CTP amino acid sequence or a peptide thereof. In another embodiment, the CTP peptide amino acid sequence disclosed herein is at least 90% homologous to the native CTP amino acid sequence or a peptide thereof. In another embodiment, the CTP peptide amino acid sequence disclosed herein is at least 95% homologous to the native CTP amino acid sequence or a peptide thereof.

In another embodiment, the CTP peptide DNA sequence disclosed herein is at least 70% homologous to the native CTP DNA sequence or a peptide thereof. In another embodiment, the CTP peptide DNA sequence disclosed herein is at least 80% homologous to the native CTP DNA sequence or a peptide thereof. In another embodiment, the CTP peptide DNA sequence disclosed herein is at least 90% homologous to the native CTP DNA sequence or a peptide thereof. In another embodiment, the CTP peptide DNA sequence disclosed herein is at least 95% homologous to the native CTP DNA sequence or a peptide thereof.

In one embodiment, at least one of the chorionic gonadotropin CTP amino acid sequences is truncated. In another embodiment, both of the chorionic gonadotropin CTP amino acid sequences are truncated. In another embodiment, 2 of the chorionic gonadotropin CTP amino acid sequences are truncated. In another embodiment, 2 or more of the chorionic gonadotropin CTP amino acid sequences are truncated. In another embodiment, all of the chorionic gonadotropin CTP amino acid sequences are truncated. In one embodiment, the truncated CTP comprises the first 10 amino acids of SEQ ID NO: 3: SSSSKAPPPSLP. In one embodiment, the truncated CTP comprises the first 11 amino acids of SEQ ID NO: 3. In one embodiment, the truncated CTP comprises the amino acids of SEQ ID NO: 3.

In one embodiment, at least one of the chorionic gonadotropin CTP amino acid sequences is glycosylated. In another embodiment, both of the chorionic gonadotropin CTP amino acid sequences are glycosylated. In another embodiment, 2 of the chorionic gonadotropin CTP amino acid sequences are glycosylated. In another embodiment, 2 or more of the chorionic gonadotropin CTP amino acid sequences are glycosylated. In another embodiment, all of the chorionic gonadotropin CTP amino acid sequences are glycosylated. In one embodiment, the CTP sequence disclosed herein comprises at least one glycosylation site. In another embodiment, the CTP sequence disclosed herein comprises 2 glycosylation sites. In another embodiment, the CTP sequence disclosed herein comprises 3 glycosylation sites. In another embodiment, the CTP sequence disclosed herein comprises 4 glycosylation sites. In another embodiment, the CTP sequence disclosed herein comprises 5 glycosylation sites. In another embodiment, the CTP sequence disclosed herein comprises 6 glycosylation sites. In another embodiment, the CTP sequence disclosed herein comprises 7 glycosylation sites. In another embodiment, the CTP sequence disclosed herein comprises 8 glycosylation sites. In another embodiment, glycosylation sites are O-glycosylation sites. In another embodiment, glycosylation is at a serine residue. In another embodiment, glycosylation is at a threonine residue.

In one embodiment, methods disclosed herein manufacture a human chorionic gonadotropin carboxy terminal peptide (CTP)-modified polypeptide, said CTP-modified polypeptide is highly glycosylated. In another embodiment, methods disclosed herein manufacture a CTP-modified human growth hormone (CTP-hGH), wherein said CTP-modified hGH is highly glycosylated. In another embodiment, methods disclosed herein manufacture a CTP-modified hGH, wherein said CTP-modified hGH is highly sialylated. Sialylation is important as the higher the sialylation, the more extended the half-life may be.

In another embodiment, methods disclosed herein manufacture a CTP-modified hGH, wherein at least one of the chorionic gonadotropin CTP amino acid sequences is glycosylated. In another embodiment, both of the chorionic gonadotropin CTP amino acid sequences are glycosylated. In another embodiment, 2 of the chorionic gonadotropin CTP amino acid sequences are glycosylated. In another embodiment, methods disclosed herein manufacture a CTP-modified hGH, 3 of the chorionic gonadotropin CTP amino acid sequences are glycosylated. In another embodiment, 3 or more of the chorionic gonadotropin CTP amino acid sequences are glycosylated. In another embodiment, all of the chorionic gonadotropin CTP amino acid sequences are glycosylated.

In one embodiment, each CTP sequence of CTP-modified hGH comprises glycosylation at least one glycosylation site. In another embodiment, each CTP sequence of said CTP-modified hGH comprises glycosylation at least two glycosylation sites. In another embodiment, each CTP sequence of said CTP-modified hGH comprises glycosylation at least three glycosylation sites. In another embodiment, each CTP sequence of said CTP-modified hGH comprises glycosylation at four glycosylation sites. In another embodiment, each CTP sequence of said CTP-modified hGH comprises glycosylation at least five glycosylation sites. In another embodiment, each CTP sequence of said CTP-modified hGH comprises glycosylation at least six glycosylation sites. In another embodiment, each CTP sequence of said CTP-modified hGH comprises glycosylation at least seven glycosylation sites. In another embodiment, each CTP sequence of said CTP-modified hGH comprises glycosylation at least eight glycosylation sites. In another embodiment, glycosylation sites are O-glycosylation sites. In another embodiment, glycosylation is at a serine residue. In another embodiment, glycosylation is at a threonine residue.

In one embodiment, wherein the CTP-modified hGH of SEQ ID NO: 7 manufactured consists of two CTPs attached to the carboxy terminus of the hGH, and one CTP attached to the amino terminus of the hGH, the CTP-modified hGH comprises glycosylation at between 12 and 18 glycosylation sites. In another embodiment, the CTP-modified hGH comprises glycosylation at between 12-21 glycosylation sites. In another embodiment, the CTP-modified hGH comprises glycosylation at between 12-24 glycosylation sites. In another embodiment, at between 13 and 18, 14 and 18, 15 and 18, 16 and 18, 17 and 18, 13-21, 14-21, 15-21, 16-21, 17-21, 18-21, 19-21, 20-21, 13-24, 14-24, 15-24, 16-24, 17-24, 18-24, 19-24, 20-24, 21-24, 22-24, or 23-24. In another embodiment, the CTP-modified hGH comprises glycosylation at 12 glycosylation sites, at 13 glycosylation sites, at 14 glycosylation sites, at 15 glycosylation sites, at 16 glycosylation sites, at 17 glycosylation sites, at 18 glycosylation sites, at 19 glycosylation sites, at 20 glycosylation sites, at 21 glycosylation sites, at 21 glycosylation sites, at 22 glycosylation sites, at 23 glycosylation sites, or at 24 glycosylation sites. Each possibility represents a separate embodiment.

In another embodiment, embodiment, wherein the amino acid sequence of CTP-modified hGH is set forth in SEQ ID NO: 7, O-linked glycosylation occurs at available Serine (S) residues present within each CTP unit. In another embodiment, each CTP contains 4-6 O-linked glycans, wherein the glycosylation is to the Serine (S) residues present in each CTP unit. In another embodiment, O-linked glycosylation at Serine (S) residues of each CTP unit comprises 12-18 O-linked sugar chains. In another embodiment, O-linked glycosylation at Serine (S) residues of each CTP unit comprises 12-21 O-linked sugar chains. In another embodiment, O-linked glycosylation at Serine (S) residues of each CTP unit comprises 12-24 O-linked sugar chains. In another embodiment, O-linked glycosylation at Serine (S) residues of each CTP unit comprises 12 O-linked sugar chains. In another embodiment, O-linked glycosylation at Serine (S) residues of each CTP unit comprises 13 O-linked sugar chains. In another embodiment, O-linked glycosylation at Serine (S) residues of each CTP unit comprises 14 O-linked sugar chains. In another embodiment, O-linked glycosylation at Serine (S) residues of each CTP unit comprises 15 O-linked sugar chains. In another embodiment, O-linked glycosylation at Serine (S) residues of each CTP unit comprises 16 O-linked sugar chains. In another embodiment, O-linked glycosylation at Serine (S) residues of each CTP unit comprises 17 O-linked sugar chains. In another embodiment, O-linked glycosylation at Serine (S) residues of each CTP unit comprises 18 O-linked sugar chains. In another embodiment, O-linked glycosylation at Serine (S) residues of each CTP unit comprises 19 O-linked sugar chains. In another embodiment, O-linked glycosylation at Serine (S) residues of each CTP unit comprises 20 O-linked sugar chains. In another embodiment, O-linked glycosylation at Serine (S) residues of each CTP unit comprises 21 O-linked sugar chains. In another embodiment, O-linked glycosylation at Serine (S) residues of each CTP unit comprises 22 O-linked sugar chains. In another embodiment, O-linked glycosylation at Serine (S) residues of each CTP unit comprises 23 O-linked sugar chains. In another embodiment, O-linked glycosylation at Serine (S) residues of each CTP unit comprises 24 O-linked sugar chains. In another embodiment, there are no O-linked sugar chains present on the hGH sequence (SEQ ID NO: 8) of said CTP-modified hGH.

In another embodiment, a CTP-modified hGH polypeptide disclosed herein comprises at least 4 O-glycan occupancy per CTP. In another embodiment, a CTP-modified hGH polypeptide disclosed herein comprises at least 5 O-glycan occupancy per CTP. In another embodiment, a CTP-modified hGH polypeptide disclosed herein comprises at least 6 O-glycan occupancy per CTP. In another embodiment, a CTP-modified hGH polypeptide disclosed herein comprises at least 7 O-glycan occupancy per CTP. In another embodiment, a CTP-modified hGH polypeptide disclosed herein comprises at least 8 O-glycan occupancy per CTP. A skilled artisan would recognize that O-glycan occupancy may differ per CTP comprised within a CTP-modified hGH polypeptide.

In another embodiment, a CTP-hGH-CTP-CTP polypeptide disclosed herein comprises at least one CTP comprising more than 4 O-glycan occupancy. In another embodiment, a CTP-hGH-CTP-CTP polypeptide disclosed herein comprises at least one CTP comprising more than 5 O-glycan occupancy. In another embodiment, a CTP-hGH-CTP-CTP polypeptide disclosed herein comprises at least one CTP comprising more than 6 O-glycan occupancy. In another embodiment, a CTP-hGH-CTP-CTP polypeptide disclosed herein comprises at least one CTP comprising more than 7 O-glycan occupancy.

A skilled artisan would appreciate that the term "homology" may encompass deletions, insertions, or substitution variants, including an amino acid substitution thereof, and biologically active polypeptide fragments thereof. In one embodiment the substitution variant is one in which the glutamine in position 65 of hGH is substituted by a valine [Gellerfors et al., J Pharm Biomed Anal 1989, 7:173-83].

In one embodiment, a "peptide" or a "peptide fragment" comprises a compound in which a plurality of amino acids are linked by a peptide bond. Herein, when a non-amino acid is contained, there is a case where a bond between the non-amino acid and an adjacent amino acid is not a peptide bond. However, a compound in this case is also collectively referred to as a peptide or a peptide fragment.

A skilled artisan would appreciate that the term "protected peptide fragment" may encompass a fragment of a peptide in which one or more reactive substituents selected from the group consisting of a hydroxy group, an amino group, a guanidino group, an imidazolyl group, an indolyl group, a mercapto group and a carboxyl group of the side chain of an amino acid or a non-amino-acid of a peptide fragment, which may cause an undesirable side reaction upon preparation of a peptide fragment or condensation reaction of peptide fragments, are protected with a protecting group. Hereinafter, it is abbreviated as a "protected peptide fragment" in the present specification.

In some embodiments, a human growth hormone (hGH) is utilized according to the teachings disclosed herein. In some embodiments, the attachment of a CTP sequence(s) to both the amino and carboxy termini of the hGH protein results in increased potency. In some embodiments, the attachment of CTP sequence to both the amino and carboxy termini of the hGH protein results in prolonged in vivo activity.

In one embodiment, a CTP-modified hGH precursor polypeptide disclosed herein is set forth in SEQ ID NO: 4.

```
SEQ ID NO: 4:
MATGSRTSLLLAFGLLCLPWLQEGSASSSSKAPPPSLPSPSRLPGPSDTP

ILPQFPTIPLSRLFDNAMLRAHRLHQLAFDTYQEFEEAYIPKEQKYSFLQ

NPQTSLCFSESIPTPSNREETQQKSNLELLRISLLLIQSWLEPVQFLRSV

FANSLVYGASDSNVYDLLKDLEEGIQTLMGRLEDGSPRTGQIFKQTYSKF

DTNSHNDDALLKNYGLLYCFRKDMDKVETFLRIVQCRSVEGSCGFSSSSK

APPPSLPSPSRLPGPSDTPILPQSSSSKAPPPSLPSPSRLPGPSDTPILP

Q.
```

A skilled artisan would appreciate that the phrase "human growth hormone" (hGH) may encompass a precursor polypeptide including a signal peptide, such as set forth in Genbank Accession No. P01241 (SEQ ID NO: 5), exhibiting hGH activity (i.e. stimulation of growth).

```
MATGSRTSLLLAFGLLCLPWLQEGSAFPTIPLSRLFDNAMLRAHRLHQLA

FDTYQEFEEAYIPKEQKYSFLQNPQTSLCFSESIPTPSNREETQQKSNLE

LLRISLLLIQSWLEPVQFLRSVFANSLVYGASDSNVYDLLKDLEEGIQTL

MGRLEDGSPRTGQIFKQTYSKFDTNSHNDDALLKNYGLLYCFRKDMDKVE

TFLRIVQCRSVEGSCGF. In another embodiment, a mature hGH disclosed herein has the amino acid sequence set forth in SEQ ID NO: 8:

FPTIPLSRLFDNAMLRAHRLHQLAFDTYQEFEEAYIPKEQKYSFLQNPQT

SLCFSESIPTPSNREETQQKSNLELLRISLLLIQSWLEPVQFLRSVFANS

LVYGASDSNVYDLLKDLEEGIQTLMGRLEDGSPRTGQIFKQTYSKFDTNS

HNDDALLKNYGLLYCFRKDMDKVETFLRIVQCRSVEGSCGF.
```

In another embodiment, a mature hGH disclosed herein has the amino acid sequence set forth in SEQ ID NO: 8: FPTIPLSRLFDNAMLRAHRLHQLAFDTYQEFEEAY-IPKEQKYSFLQNPQTSLCFSES IPTPSNREETQQKSN-LELLRISLLLIQSWLEPVQFLRSVFANSLVYGASDSN-VYDLL KDLEEGIQTLMGRLEDGSPRTGQIFKQTYSKFDTN-SHNDDALLKNYGLLYCFRKD MDKVETFLRIVQCRS-VEGSCGF.

A skilled artisan would appreciate that an "hGH" disclosed herein may encompass homologues. In another embodiment, a GH amino acid sequence of the methods and compositions disclosed herein is at least 50% homologous to a hGH sequence set forth herein as determined using BlastP software of the National Center of Biotechnology Information (NCBI) using default parameters. In another embodiment, the percent homology is 60%. In another embodiment, the percent homology is 70%. In another embodiment, the percent homology is 80%. In another embodiment, the percent homology is 90%. In another embodiment, the percent homology is at least 95%. In another embodiment, the percent homology is greater than 95%.

In one embodiment, following expression and secretion of a CTP-modified hGH polypeptide, disclosed herein, the signal peptide is cleaved from the precursor protein resulting in a mature protein. For example, in SEQ ID NO: 4, amino acids 1-26, MATGSRTSLLLAFGLLCLPWLQEGSA (SEQ ID NO: 6) represent the signal peptide of the CTP-modified hGH polypeptide, and amino acids SSSSKAPPPSLPSPSRLPGPSDTPILPQFPTIPLSRLFD-NAMLRAHRLHQLAFDTYQE FEEAY-IPKEQKYSFLQNPQTSLCFSESIPTPSNREETQQKSN-LELLRISLLLIQSWLEP VQFLRSVFANSLVYGASDSN-VYDLLKDLEEGIQTLMGRLEDGSPRTGQIFKQTYS KFDTNSHNDDALLKNYGLLYCFRKDMDKVETFL-RIVQCRSVEGSCGFSSSSKAPP PSLPSPSRLPGPSDT-PILPQSSSSKAPPPSLPSPSRLPGPSDTPILPQ (SEQ ID NO: 7) represent the mature engineered CTP-modified hGH polypeptide lacking the signal peptide (MOD-4023). In one embodiment, the amino acid sequence of CTP-modified hGH without the signal peptide is set forth in SEQ ID NO: 7. In another embodiment, the signal peptide of CTP-modified hGH is set forth in SEQ ID NO: 6. In another embodiment, the amino acids 29-219 of the CTP-modified hGH sequence as set forth in SEQ ID NO: 7, represent the hGH. In another embodiment, the amino acids 1-28, 220-247, and 248-275 of the CTP-modified hGH sequence as set forth in SEQ ID NO: 7 represent each of the CTP units, one N-terminal to the hGH, and two C-terminal to the hGH, of the CTP-modified hGH.

In one embodiment, MOD-4023 (SEQ ID NO: 7) comprises two disulfide (S—S) bridges, wherein both S—S bridges are within the hGH molecule. In another embodiment, one disulfide bridge is between cysteine residue 81 and cysteine residue 193 of SEQ ID NO: 7, and a second disulfide bridge is between cysteine residue 210 and cysteine residue 217 of SEQ ID NO: 7.

In another embodiment, the methods disclosed herein provide a CTP-modified hGH polypeptide for stimulating muscle growth.

In one embodiment, a method of manufacturing disclosed herein, produces the amino acid sequence of a mature CTP-modified hGH polypeptide disclosed herein lacking a signal peptide. In another embodiment, the method of manufacturing disclosed herein produces the amino acid sequence of the mature CTP-modified hGH polypeptide as set forth in SEQ ID NO: 7.

In another embodiment, the methods disclosed herein provide a CTP-modified hGH polypeptide set forth in SEQ ID NO: 7 for stimulating muscle growth.

In another embodiment, the methods disclosed herein comprise use of a nucleic acid sequence encoding a CTP-modified hGH polypeptide disclosed herein. In one embodiment, the methods disclosed herein comprise use of the nucleic acid set forth in SEQ ID NO: 9 encoding an hGH peptide with one CTP amino acid peptide on the N-terminus and two CTP amino acid peptides on the C-terminus #SEQ ID NO: 9:

```
ATGGCCACCGGCAGCAGGACCAGCCTGCTGCTGGCCTTCGGCCTGCTGTG

CCTGCCATGGCTGCAGGAGGGCAGCGCCAGCTCTTCTTCTAAGGCTCCAC

CCCCATCTCTGCCCAGCCCCAGCAGACTGCCGGGCCCCAGCGACACACCC

ATTCTGCCCCAGTTCCCCACCATCCCCCTGAGCAGGCTGTTCGACAACGC

CATGCTGAGGGCTCACAGGCTGCACCAGCTGGCCTTTGACACCTACCAGG

AGTTCGAGGAAGCCTACATCCCCAAGGAGCAGAAGTACAGCTTCCTGCAG

AACCCCCAGACCTCCCTGTGCTTCAGCGAGAGCATCCCCACCCCCAGCAA

CAGAGAGGAGACCCAGCAGAAGAGCAACCTGGAGCTGCTGAGGATCTCCC

TGCTGCTGATCCAGAGCTGGCTGGAGCCCGTGCAGTTCCTGAGAAGCGTG

TTCGCCAACAGCCTGGTGTACGGCGCCAGCGACAGCAACGTGTACGACCT

GCTGAAGGACCTGGAGGAGGGCATCCAGACCCTGATGGGCCGGCTGGAGG

ACGGCAGCCCCAGGACCGGCCAGATCTTCAAGCAGACCTACAGCAAGTTC

GACACCAACAGCCACAACGACGACGCCCTGCTGAAGAACTACGGGCTGCT

GTACTGCTTCAGAAAGGACATGGACAAGGTGGAGACCTTCCTGAGGATCG

TGCAGTGCAGAAGCGTGGAGGGCAGCTGCGGCTTCAGCTCCAGCAGCAAG

GCCCCTCCCCGAGCCTGCCCTCCCCAAGCAGGCTGCCTGGGCCCTCCGA

CACACCAATCCTGCCACAGAGCAGCTCCTCTAAGGCCCCTCCTCCATCCC

TGCCATCCCCCTCCCGGCTGCCTGGCCCCTCTGACACCCCTATCCTGCCT

CAG.
```

In one embodiment, methods comprise use of a nucleic acid sequence comprising a coding portion encoding a CTP-modified hGH disclosed herein. In another embodiment, a method disclosed herein comprises use of a nucleic acid sequence as set forth in SEQ ID NO: 9. A skilled artisan would appreciate that a nucleic acid sequence may be a part of an expression vector comprising a coding portion encoding a CTP-modified hGH disclosed herein.

In another embodiment, the methods disclosed herein provide a nucleic acid sequence encoding a CTP-modified hGH peptide for therapeutic use in numerous indications as provided in U.S. Pat. No. 8,946,155, which is incorporated by reference herein. Moreover, such CTP-modified hGH polypeptides are well described in US Patent Application Publication Serial No. US-2014-0113860-A1, in U.S. Pat. No. 8,450,269, and in U.S. Pat. No. 8,304,386, all of which are incorporated herein in their entirety.

In some embodiments, the polypeptides disclosed herein are utilized in therapeutics which requires the polypeptides to be in a soluble form.

In some embodiments, the polypeptides disclosed herein are biochemically synthesized such as by using standard solid phase techniques. In some embodiments, these biochemical methods of manufacture comprise exclusive solid phase synthesis, partial solid phase synthesis, fragment condensation, or classical solution synthesis. In some embodiments, these methods are used when the polypeptide is relatively short (about 5-15 kDa) and/or when it cannot be produced by recombinant techniques (i.e., not encoded by a nucleic acid sequence) and therefore involves different chemistry.

In some embodiments, solid phase polypeptide synthesis procedures are well known to one skilled in the art and further described by John Morrow Stewart and Janis Dillaha Young, Solid Phase Polypeptide Syntheses (2nd Ed., Pierce Chemical Company, 1984). In some embodiments, synthetic polypeptides are purified by preparative high performance liquid chromatography [Creighton T. (1983) Proteins, structures and molecular principles. WH Freeman and Co. N.Y.] and the composition of which can be confirmed via amino acid sequencing by methods known to one skilled in the art.

In some embodiments, recombinant protein techniques are used to generate the polypeptides disclosed herein. In some embodiments, recombinant protein techniques are used for generation of relatively long polypeptides (e.g., longer than 18-25 amino acid). In some embodiments, recombinant protein techniques are used for the generation of large amounts of the polypeptide disclosed herein. In some embodiments, recombinant techniques are described by Bitter et al., (1987) Methods in Enzymol. 153:516-544, Studier et al. (1990) Methods in Enzymol. 185:60-89, Brisson et al. (1984) Nature 310:511-514, Takamatsu et al. (1987) EMBO J. 6:307-311, Coruzzi et al. (1984) EMBO J. 3:1671-1680 and Brogli et al, (1984) Science 224:838-843, Gurley et al. (1986) Mol. Cell. Biol. 6:559-565 and Weissbach & Weissbach, 1988, Methods for Plant Molecular Biology, Academic Press, NY, Section VIII, pp 421-463.

In one embodiment, a polypeptide disclosed herein is synthesized using a polynucleotide encoding a polypeptide disclosed herein. In some embodiments, the polynucleotide encoding a polypeptide disclosed herein is ligated into an expression vector, comprising a transcriptional control of a cis-regulatory sequence (e.g., promoter sequence). In some embodiments, the cis-regulatory sequence is suitable for directing constitutive expression of the polypeptide disclosed herein. In some embodiments, the cis-regulatory sequence is suitable for directing tissue specific expression of the polypeptide disclosed herein. In some embodiments, the cis-regulatory sequence is suitable for directing inducible expression of the polypeptide disclosed herein.

In some embodiments, polynucleotides which express a polypeptide disclosed herein comprises the nucleotide sequence as set forth in SEQ ID NOs: 9.

In some embodiment, tissue-specific promoters suitable for use with polynucleotide sequences disclosed herein comprise sequences which are functional in specific cell population, example include, but are not limited to promoters such as albumin that is liver specific [Pinkert et al., (1987) Genes Dev. 1:268-277], lymphoid specific promoters [Calame et al., (1988) Adv. Immunol. 43:235-275]; in particular promoters of T-cell receptors [Winoto et al., (1989) EMBO J. 8:729-733] and immunoglobulins; [Banerji et al. (1983) Cell 33729-740], neuron-specific promoters such as the neurofilament promoter [Byrne et al. (1989) Proc. Natl.

Acad. Sci. USA 86:5473-5477], pancreas-specific promoters [Edlunch et al. (1985) Science 230:912-916] or mammary gland-specific promoters such as the milk whey promoter (U.S. Pat. No. 4,873,316 and European Application Publication No. 264,166). Inducible promoters suitable for use in the methods disclosed herein include for example the tetracycline-inducible promoter (Srour, M. A., et al., 2003. Thromb. Haemost. 90: 398-405).

A skilled artisan would appreciate that the phrase "a polynucleotide" may encompass a single or double stranded nucleic acid sequence which be isolated and provided in the form of an RNA sequence, a complementary polynucleotide sequence (cDNA), a genomic polynucleotide sequence and/ or a composite polynucleotide sequences (e.g., a combination of the above).

A skilled artisan would appreciate that the phrase "complementary polynucleotide sequence" may encompass a sequence, which results from reverse transcription of messenger RNA using a reverse transcriptase or any other RNA dependent DNA polymerase. In one embodiment, the sequence can be subsequently amplified in vivo or in vitro using a DNA polymerase.

A skilled artisan would appreciate that the phrase "genomic polynucleotide sequence" may encompass a sequence derived (isolated) from a chromosome and thus it represents a contiguous portion of a chromosome.

A skilled artisan would appreciate that the phrase "composite polynucleotide sequence" may encompass a sequence, which is at least partially complementary and at least partially genomic. In one embodiment, a composite sequence can include some exonal sequences required to encode the polypeptide disclosed herein, as well as some intronic sequences interposing there between. In one embodiment, the intronic sequences can be of any source, including of other genes, and typically will include conserved splicing signal sequences. In one embodiment, intronic sequences include cis acting expression regulatory elements.

In one embodiment, the polynucleotides disclosed herein further comprise a signal sequence encoding a signal peptide for the secretion of the polypeptides disclosed herein. In some embodiments, signal sequences include, but are not limited to the endogenous signal sequence for hGH as set forth in SEQ ID NO: 6. In another embodiment, the signal sequence is N-terminal to the CTP sequence that is in turn N-terminal to the polypeptide sequence of interest; e.g. the sequence is (a) signal sequence—(b) CTP—(c) sequence of interest—(d) optionally 1 or more additional CTP sequences. In another embodiment, 1 or more CTP sequences is inserted between the signal sequence of a polypeptide sequence of interest and the polypeptide sequence of interest itself, thus interrupting the wild-type sequence of interest.

In another embodiment, the polypeptides and methods of producing them disclosed herein provide a mature CTP-modified GH lacking a signal peptide as set forth in SEQ ID NO: 7.

In some embodiments, polynucleotides disclosed herein are prepared using PCR techniques, or any other method or procedure known to one skilled in the art. In some embodiments, the procedure involves the legation of two different DNA sequences (See, for example, "Current Protocols in Molecular Biology", eds. Ausubel et al., John Wiley & Sons, 1992).

Biological Activity and Uses

In one embodiment, disclosed herein is a method of reducing the dosing frequency of a GH in a subject, comprising administering to said subject a therapeutically effective amount of a polypeptide consisting of a hGH, one chorionic gonadotropin carboxy terminal peptide (CTP) attached to the amino terminus of said GH, and two chorionic gonadotropin CTPs attached to the carboxy terminus of said GH, and wherein said polypeptide lacks a signal peptide, wherein the amino acid sequence of said polypeptide is set forth in SEQ ID NO: 7, thereby reducing the dosing frequency of a GH in a subject.

In another embodiment, disclosed herein is a method of improving the area under the curve (AUC) of a GH in a subject, comprising administering to said subject a therapeutically effective amount of a polypeptide consisting of a hGH, one chorionic gonadotropin carboxy terminal peptide (CTP) attached to the amino terminus of said hGH, and two chorionic gonadotropin CTPs attached to the carboxy terminus of said hGH, and wherein said polypeptide lacks a signal peptide, wherein the amino acid sequence of said polypeptide is set forth in SEQ ID NO: 7, thereby improving the area under the curve (AUC) of a GH.

In one embodiment, disclosed herein is a method of treating a subject in need of GH therapy, comprising administering to said subject a therapeutically effective amount of a polypeptide consisting of a hGH, one chorionic gonadotropin carboxy terminal peptide (CTP) attached to the amino terminus of said hGH, and two chorionic gonadotropin CTPs attached to the carboxy terminus of said hGH, and wherein said polypeptide lacks a signal peptide, wherein the amino acid sequence of said polypeptide is set forth in SEQ ID NO: 7, thereby treating said subject in need of GH in therapy.

In another embodiment, disclosed herein is a method of increasing insulin-like growth factor (IGF-1) levels in a subject, comprising administering to said subject a therapeutically effective amount of a polypeptide consisting of a hGH, one chorionic gonadotropin carboxy terminal peptide (CTP) attached to the amino terminus of said hGH, and two chorionic gonadotropin CTPs attached to the carboxy terminus of said hGH, and wherein said polypeptide lacks a signal peptide, wherein the amino acid sequence of said polypeptide is set forth in SEQ ID NO: 7, thereby increasing insulin-like growth factor (IGF-1) levels in a subject.

In another embodiment, disclosed herein is a method of maintaining insulin-like growth factor (IGF-I) levels in a subject, comprising administering to said subject a therapeutically effective amount of a polypeptide consisting of a hGH, one chorionic gonadotropin carboxy terminal peptide (CTP) attached to the amino terminus of said hGH, and two chorionic gonadotropin CTPs attached to the carboxy terminus of said hGH, and wherein said polypeptide lacks a signal peptide, wherein the amino acid sequence of said polypeptide is set forth in SEQ ID NO: 7, thereby maintaining insulin-like growth factor (IGF-I) levels in a subject. In another embodiment, the IGF-I levels are kept in a defined range, as further disclosed herein.

In another embodiment, disclosed herein is a method of increasing and maintaining insulin-like growth factor (IGF-I) levels within a defined range in a subject, comprising administering to said subject a therapeutically effective amount of a polypeptide consisting of a hGH, one chorionic gonadotropin carboxy terminal peptide (CTP) attached to the amino terminus of said hGH, and two chorionic gonadotropin CTPs attached to the carboxy terminus of said hGH, and wherein said polypeptide lacks a signal, wherein the amino acid sequence of said polypeptide is set forth in SEQ ID NO: 7, thereby increasing and maintaining insulin-like growth factor (IGF-I) levels within a defined range in a subject.

In another embodiment, the defined range is a therapeutic dose range achieved by administering a CTP-modified hGH disclosed herein. In another embodiment, the defined range is one in which the Cmax and Ctrough of the sinusoidal behavior of IGF-I are maintained following consecutive administrations of a CTP-modified hGH disclosed herein. In another embodiment, the defined range is a therapeutic dose range for consecutively administering a CTP-modified hGH disclosed herein with excellent responsiveness in a subject and with minimal need for dose modification. In another embodiment, the defined range is comparable to the range of IGF-I levels in individuals that are considered to be normal. In another embodiment, the defined range is the normal range of IGF-I levels/values in normal individuals. In another yet embodiment, the defined range is within the normal range when IGF-I SDS values are within ±2 SDS.

In another embodiment, the methods disclosed herein provide a CTP-modified hGH polypeptide described herein, for stimulating bone growth.

In another embodiment, the methods disclosed herein provide a nucleic acid sequence encoding a CTP-modified hGH polypeptides described herein, for stimulating bone growth.

In another embodiment, a CTP-modified hGH disclosed herein is used in the same manner as unmodified GHs. In another embodiment, a CTP-modified hGH disclosed herein has an increased circulating half-life and plasma residence time, decreased clearance, and increased clinical activity in vivo. In another embodiment, due to the improved properties of the CTP-modified hGH described herein, this conjugate is administered less frequently than unmodified GHs. In another embodiment, a CTP-modified GH as described herein is administered once a week to once every two weeks. In another embodiment, a CTP-modified GH described herein is administered once every two weeks to once every three weeks. In another embodiment, a CTP-modified GH described herein is administered once a day to three times a week. In another embodiment, decreased frequency of administration will result in improved patient compliance leading to improved treatment outcomes, as well as improved patient quality of life. In another embodiment, compared to conventional conjugates of GHs linked to poly(ethylene glycol) it has been found that GH CTP conjugates having the molecular weight and linker structure of the conjugates disclosed herein have an improved potency, improved stability, elevated AUC levels, enhanced circulating half-life. In another embodiment, compared to conventional conjugates of GHs linked to poly(ethylene glycol) it has been found that GHs having the molecular weight and linker structure of the conjugate disclosed herein has an improved potency, improved stability, elevated AUC levels, enhanced circulating half-life. In another embodiment, a therapeutically effective amount of a CTP-modified hGH is the amount of conjugate necessary for the in vivo measurable expected biological activity. In another embodiment, a GH utilized according to the teachings disclosed herein exhibits increased potency. In some embodiments, the attachment of CTP sequence to both the amino and carboxy termini of a GH results in prolonged in-vivo activity.

In another embodiment, a therapeutically effective amount of a CTP-modified hGH is determined according to factors as the exact type of condition being treated, the condition of the patient being treated, as well as the other ingredients in the composition. In another embodiment, a therapeutically effective amount of a CTP-modified hGH is 0.01 to 10 µg per kg body weight administered once a week. In another embodiment, a therapeutically effective amount of a CTP-modified hGH is 0.1 to 1 µg per kg body weight, administered once a week. In another embodiment, a therapeutically effective amount of a CTP-modified hGH is 1 µg per kg body weight to 1 mg per kg body weight, administered once a week. In another embodiment, a therapeutically effective amount of a CTP-modified hGH is 1 mg per kg body weight, administered once a week. In another embodiment, a therapeutically effective amount for an adult growth hormone deficient patient comprises CTP-modified hGH is 1 mg-15 mg, administered once a week. In another embodiment, a therapeutically effective amount for an adult growth hormone deficient patient comprises CTP-modified hGH is greater than 1 mg, administered once a week. In another embodiment, a therapeutically effective amount for a growth hormone deficient child patient comprises CTP-modified hGH is between 1 µg per kg body weight and 1 mg/kg body weight, administered once a week. In another embodiment, a therapeutically effective amount for a growth hormone deficient child patient comprises CTP-modified hGH is up to 600 µg per kg body weight, administered once a week. In another embodiment, a therapeutically effective amount for a growth hormone deficient child patient comprises CTP-modified hGH is up to 700 µg per kg body weight, administered once a week. In another embodiment, a therapeutically effective amount for a growth hormone deficient child patient comprises CTP-modified hGH is between about 600 µg per kg body weight and 700 µg per kg body weight, administered once a week. In another embodiment, a pharmaceutical composition comprising a CTP-modified hGH is formulated at strength effective for administration by various means to a human patient.

In one embodiment, methods, polynucleotides, and polypeptides disclosed herein are employed in veterinary medicine. In one embodiment, disclosed herein treatment of domesticated mammals which are maintained as human companions (e.g., dogs, cats, horses), which have significant commercial value (e.g., dairy cows, beef cattle, sporting animals), which have significant scientific value (e.g., captive or free specimens of endangered species), or which otherwise have value.

In one embodiment, polypeptides, or polynucleotides disclosed herein are administered to an animal (e.g., mouse, rat, rabbit, hamster, guinea pig, pigs, micro-pig, chicken, camel, goat, horse, cow, sheep, dog, cat, non-human primate, and human. In one embodiment, the recited applications have uses in a wide variety of hosts. In some embodiments, such hosts include, but are not limited to, human, murine, rabbit, goat, guinea pig, camel, horse, mouse, rat, hamster, pig, micro-pig, chicken, goat, cow, sheep, dog, cat, or non-human primate.

In one embodiment, farm animals are treated by the methods disclosed herein. In one embodiment, farm animals include pigs, cattle, dairy cows, horses, goats, sheep, chickens, turkeys, geese, ducks and related species. In one embodiment, laboratory animals are treated by the methods disclosed herein. In one embodiment, laboratory animals include rats, mice, guinea pigs, rabbits, goats, monkeys, dogs, cats and others. In one embodiment, zoo animals are treated by the methods disclosed herein. In one embodiment, zoo animals include all vertebrate animals kept in zoos. In one embodiment, aquatic animals are treated by the methods disclosed herein. In one embodiment, aquatic animals include fish, eels, turtles, seals, penguins, sharks, whales, and related species. In one embodiment, domesticated animals are treated by the methods disclosed herein. In one embodiment, domesticated animals include any pet, such as cats and dogs, or animal that is kept by humans, e.g., horses, cattle, pigs, goats, rabbits, chickens, turkeys, geese, ducks and the like.

A skilled artisan would appreciate that the term "pigs" includes pigs, piglets, hogs, gilts, barrows, boars and sows. In a similar fashion the skilled artisan would appreciate that the term "cattle" encompasses calves, cows, dairy cows, heifers, steers and bulls.

In some embodiments, the CTP sequences modification is advantageous in permitting lower dosages to be used.

Manufacturing

In one embodiment, disclosed herein is a method of manufacturing a human chorionic gonadotropin carboxy terminal peptide (CTP)-modified human growth hormone (hGH) polypeptide, the method comprising the steps of: (a) stably transfecting a predetermined number of cells with an expression vector comprising a coding portion encoding said CTP-modified (hGH), wherein said transfected cell expresses and secretes said CTP-modified hGH; (b) obtaining cell clones that overexpress said CTP-modified hGH; (c) expanding said clones in solution to a predetermined scale; (d) harvesting said solution containing said clones; (e) filtering said solution containing said clones to obtain a clarified harvest solution; and, (f) purifying said clarified harvest solution to obtain a purified protein solution having a desired concentration of a CTP-modified hGH, wherein the amino acid sequence of the manufactures CTP-modified hGH is set forth in SEQ ID NO: 7, thereby manufacturing a human chorionic gonadotropin carboxy terminal peptide (CTP)-modified human growth hormone (hGH) polypeptide. In an alternative embodiment, at step (e) cells and debris is removed by centrifugation. In the manufacturing of CTP-modified hGH, transfection is an early step. In another embodiment, a method of manufacturing comprises clones the express and secrete said CTP-modified hGH. Once the final high expressing clone is selected, each production includes thawing of a working cell bank (WCB), expansion, harvest and purification. (See Example: steps 1-8 of FIG. 3 describing clone expansion through harvest; steps 8-16 of FIG. 4 describing purification). In an alternative embodiment, once the final high expressing clone is selected, each production includes thawing of a master cell bank (MCB), expansion, harvest and purification. (See Example: steps 1-8 of FIG. 3 describing clone expansion through harvest; steps 8-16 of FIG. 4 describing purification).

In one embodiment, polynucleotides disclosed herein are inserted into expression vectors (i.e., a nucleic acid construct) to enable expression of the recombinant polypeptide. In one embodiment, the expression vector disclosed herein includes additional sequences which render this vector suitable for replication and integration in prokaryotes. In one embodiment, the expression vector disclosed herein includes additional sequences which render this vector suitable for replication and integration in eukaryotes. In one embodiment, the expression vector disclosed herein includes a shuttle vector which renders this vector suitable for replication and integration in both prokaryotes and eukaryotes. In some embodiments, cloning vectors comprise transcription and translation initiation sequences (e.g., promoters, enhancer) and transcription and translation terminators (e.g., polyadenylation signals).

In one embodiment, a method of manufacture of a CTP-modified polypeptide, for example, a CTP-modified hGH, comprises a step comprising the use of an expression vector, wherein said expression vector comprises a promoter, a coding sequence for a CTP-modified polypeptide, and a polyadenylation sequence. In another embodiment, the coding sequence is set forth in SEQ ID NO: 9. In another embodiment the polyadenylation sequence is a simian virus (SV) 40 polyadenylation sequence.

In one embodiment, a variety of eukaryotic cells can be used as host-expression systems to express the polypeptides disclosed herein. In some embodiments, these include, but are not limited to, microorganisms; such as yeast transformed with recombinant yeast expression vectors containing the polypeptide coding sequence; plant cell systems infected with recombinant virus expression vectors (e.g., cauliflower mosaic virus, CaMV; tobacco mosaic virus, TMV) or transformed with recombinant plasmid expression vectors, such as Ti plasmid, containing the polypeptide coding sequence.

In one embodiment, non-bacterial expression systems are used (e.g. mammalian expression systems such as CHO cells or cells derived from CHO cells) to express the polypeptide disclosed herein. In one embodiment, the expression vector used to express polynucleotides disclosed herein in mammalian cells is pCI-DHFR vector comprising a CMV promoter and a neomycin resistance gene. In another embodiment, cells are grown as an adherent cell culture. In another embodiment, cells are grown in suspension culture.

In one embodiment, the expression vector disclosed herein further comprises additional polynucleotide sequences that allow, for example, the translation of several proteins from a single mRNA such as an internal ribosome entry site (IRES) and sequences for genomic integration of the promoter-chimeric polypeptide.

In some embodiments, mammalian expression vectors include, but are not limited to, pcDNA3, pcDNA3.1(+/−), pGL3, pZeoSV2(+/−), pSecTag2, pDisplay, pEF/myc/cyto, pCMV/myc/cyto, pCR3.1, pSinRep5, DH26S, DHBB, pNMT1, pNMT41, pNMT81, which are available from Invitrogen, pCI which is available from Promega, pMbac, pPbac, pBK-RSV and pBK-CMV which are available from Strategene, pTRES which is available from Clontech, and their derivatives.

In some embodiments, expression vectors containing regulatory elements from eukaryotic viruses such as retroviruses may be found in vectors disclosed herein. SV40 vectors include pSVT7 and pMT2. In some embodiments, vectors derived from bovine papilloma virus include pBV-1MTHA, and vectors derived from Epstein Bar virus include pHEBO, and p2O5. Other exemplary vectors include pMSG, pAV009/A+, pMTO10/A+, pMAMneo-5, baculovirus pDSVE, and any other vector allowing expression of proteins under the direction of the SV-40 early promoter, SV-40 later promoter, metallothionein promoter, murine mammary tumor virus promoter, Rous sarcoma virus promoter, polyhedrin promoter, or other promoters shown effective for expression in eukaryotic cells.

In one embodiment, various methods can be used to introduce the expression vector encoding the CTP-modified hGH disclosed herein into cells. "Transfection" of eukaryotic host cells with a polynucleotide or expression vector, resulting in genetically modified cells or transgenic cells, can be performed by any method well known in the art and described, e.g., Sambrook et al., Molecular Cloning: A Laboratory Manual, Cold Springs Harbor Laboratory, New York (1989, 1992), in Ausubel et al., Current Protocols in Molecular Biology, John Wiley and Sons, Baltimore, Md. (1989), Chang et al., Somatic Gene Therapy, CRC Press, Ann Arbor, Mich. (1995), Vega et al., Gene Targeting, CRC Press, Ann Arbor Mich. (1995), Vectors: A Survey of Molecular Cloning Vectors and Their Uses, Butterworths, Boston Mass. (1988) and Gilboa et at. [Biotechniques 4 (6): 504-512, 1986] and include, for example, stable or transient transfection, and electroporation. In addition, see U.S. Pat. Nos. 5,464,764 and 5,487,992 for positive-negative selection methods. Transfection methods further include but are not limited to liposome-mediated transfection, calcium phosphate co-precipitation, electroporation, polycation (such as DEAE-dextran)-mediated transfection, protoplast fusion, viral infections (including recombinant viral infections) and microinjection. Preferably, the transfection is a stable transfection. The transfection method that provides optimal transfection frequency and expression of the heterologous genes encoding the peptide of interest disclosed herein in the particular host cell line and type is favored. Suitable methods can be determined by routine procedures. For stable transfectants the constructs are either integrated into the host cell's genome or an artificial chromosome/mini-chromosome or located episomally so as to be stably maintained within the host cell.

Methods disclosed herein will employ, unless otherwise indicated, conventional techniques of cell biology, molecular biology, cell culture, immunology and the like which are in the skill of one in the art. These techniques are fully disclosed in the current literature. See e.g. Sambrook et al., Molecular Cloning: A Laboratory Manual, $2^{nd}$ Ed., Cold Spring Harbor Laboratory Press, Cold Spring Harbor, N.Y. (1989); Ausubel et al., Current Protocols in Molecular Biology (1987, updated); Brown ed., Essential Molecular Biology, IRL Press (1991); Goeddel ed., Gene Expression Technology, Academic Press (1991); Bothwell et al. eds., Methods for Cloning and Analysis of Eukaryotic Genes, Bartlett Publ. (1990); Wu et al., eds., Recombinant DNA Methodology, Academic Press (1989); Kriegler, Gene Transfer and Expression, Stockton Press (1990); McPherson et al., PCR: A Practical Approach, IRL Press at Oxford University Press (1991); Gait ed., Oligonucleotide Synthesis (1984); Miller & Calos eds., Gene Transfer Vectors for Mammalian Cells (1987); Butler ed., Mammalian Cell Biotechnology (1991); Pollard et al., eds., Animal Cell Culture, Humana Press (1990); Freshney et al., eds., Culture of Animal Cells, Alan R. Liss (1987); Studzinski, ed., Cell Growth and Apoptosis, A Practical Approach, IRL Press at Oxford University Press (1995); Melamed et al., eds., Flow Cytometry and Sorting, Wiley-Liss (1990); Current Protocols in Cytometry, John Wiley & Sons, Inc. (updated); Wirth & Hauser, Genetic Engineering of Animals Cells, in: Biotechnology Vol. 2, Pühler ed., VCH, Weinheim 663-744; the series Methods of Enzymology (Academic Press, Inc.), and Harlow et al., eds., Antibodies: A Laboratory Manual (1987).

A heterologous gene of interest encoding the CTP-modified hGH disclosed herein may be introduced into the cell disclosed herein by various methods, for example by viral transformation, transfection or microinjection. The heterologous gene of interest may be introduced into the cell as linear DNA or as part of an expression vector. A number of eukaryotic expression vectors are known which allow multiple cloning sites for the insertion of one or more heterologous genes and their expression. Commercial suppliers include among others companies such as Stratagene, La Jolla, Calif., USA; Invitrogen, Carlsbad, Calif., USA; Promega, Madison, Wis., USA or BD Biosciences Clontech, Palo Alto, Calif., USA. The transfection of the cells with a DNA or an expression vector which code(s) for one or more genes of interest is carried out by conventional methods as described for example in Sambrook et al., 1989 or Ausubel et al., 1994. Suitable methods of transfection include for example liposome-mediated transfection, calcium phosphate co-precipitation, electroporation, polycation-(e.g. DEAE dextran)-mediated transfection, protoplast fusion, microinjection and viral infections. Preferably, stable transfection is carried out in which the DNA molecules are either integrated into the genome of the host cell or an artificial chromosome/minichromosome, or are episomally contained in stable manner in the host cell. The transfection method which gives the optimum transfection frequency and expression of one or more heterologous genes of interest in the host cell in question is preferred. In one embodiment, the gene of interest encodes a CTP-modified GH as disclosed herein.

In some embodiments, introduction of nucleic acid by viral infection offers several advantages over other methods such as lipofection and electroporation, since higher transfection efficiency can be obtained due to the infectious nature of viruses.

In one embodiment, it will be appreciated that the polypeptides disclosed herein can also be expressed from a nucleic acid construct administered to the individual employing any suitable mode of administration, described hereinabove (i.e., in-vivo gene therapy). In one embodiment, the nucleic acid construct is introduced into a suitable cell via an appropriate gene delivery vehicle/method (transfection, transduction, homologous recombination, etc.) and an expression system as needed and then the modified cells are expanded in culture and returned to the individual (i.e., ex-vivo gene therapy).

The heterologous gene of interest is usually functionally linked to a promoter which enables the transcription of the gene of interest, and to other regulatory elements which allow transcription and translation (expression) of the gene of interest or increase its efficiency.

A skilled artisan would appreciate that the term "promoter" may encompass a polynucleotide sequence which enables and controls transcription of the genes or sequences functionally linked to it. A promoter contains recognition sequences for binding RNA polymerase and the initiation site for transcription (transcription initiation site). In order to express a desired sequence in a certain cell type or a host cell a suitable functional promoter must be chosen. The skilled artisan will be familiar with a variety of promoters from various sources, including constitutive, inducible and repressible promoters. They are deposited in databanks such as GenBank, for example, and may be obtained as separate elements or elements cloned within polynucleotide sequences from commercial or individual sources. In inducible promoters the activity of the promoter may be reduced or increased in response to a signal. One example of an inducible promoter is the tetracycline (tet) promoter. This contains tetracycline operator sequences (tetO) which can be induced by a tetracycline-regulated transactivator protein (tTA). In the presence of tetracycline the binding of tTA to tetO is inhibited. Examples of other inducible promoters are the jun, fos, metallothionein and heat shock promoter (see also Sambrook, J., Fritsch, E. F. & Maniatis, T., Molecular Cloning: A Laboratory Manual Cold Spring Harbor Laboratory, Cold Spring Harbor, N.Y., 1989; Gossen, M. et al., Curr Opi Biotech 1994, 5, 516-520). Of the promoters which are particularly suitable for high expression in eukaryotes, there are for example the ubiquitin/S27a promoter of the hamster (WO 97/15664), SV 40 early promoter, adenovirus major late promoter, mouse metallothionein-1 promoter, the long terminal repeat region of Rous Sarcoma Virus and the early promoter of human Cytomegalovirus. Examples of other heterologous mammalian promoters are the actin, immunoglobulin or heat shock promoter(s).

For example, the promoter may be functionally linked to enhancer sequences in order to increase the transcriptional activity. For this, one or more enhancers and/or several copies of an enhancer sequence may be used, e.g. a CMV or SV40 enhancer. For example, the promoter may be functionally linked to enhancer sequences in order to increase the transcriptional activity. For this, one or more enhancers and/or several copies of an enhancer sequence may be used, e.g. a CMV or SV40 enhancer.

A skilled artisan would recognize that the term "enhancer" denotes a polynucleotide sequence which in the cis location acts on the activity of a promoter and thus stimulates the transcription of a gene functionally connected to this promoter. Unlike promoters the effect of enhancers is independent of position and orientation and they can therefore be positioned in front of or behind a transcription unit, within an intron or even within the coding region. The enhancer may be located both in the immediate vicinity of the transcription unit and at a considerable distance from the promoter. It is also possible to have a physical and functional overlap with the promoter. The skilled artisan will be aware of a number of enhancers from various sources (and deposited in databanks such as GenBank, e.g. SV40 enhancers, CMV enhancers, polyoma enhancers, adenovirus enhancers) which are available as independent elements or elements cloned within polynucleotide sequences (e.g. deposited at the ATCC or from commercial and individual sources). A number of promoter sequences also contain enhancer sequences such as the frequently used CMV promoter. The human CMV enhancer is one of the strongest enhancers identified hitherto. One example of an inducible enhancer is the metallothionein enhancer, which can be stimulated by glucocorticoids or heavy metals.

Basically, the regulatory elements include promoters, enhancers, termination and polyadenylation signals and other expression control elements. Both inducible and constitutively regulatory sequences are known for the various cell types. "Transcription-regulatory elements" generally comprise a promoter upstream of the gene sequence to be expressed, transcription initiation and termination sites and a polyadenylation signal.

A skilled artisan would appreciate that the term "transcription initiation site" may encompass a nucleic acid in the construct which corresponds to the first nucleic acid which is incorporated in the primary transcript, i.e. the mRNA precursor. The transcription initiation site may overlap with the promoter sequences.

A skilled artisan would appreciate that the term "transcription termination site" may encompass a nucleotide sequence which is normally at the 3' end of the gene of interest or of the gene section which is to be transcribed, and which brings about the termination of transcription by RNA polymerase.

A skilled artisan would appreciate that the term "polyadenylation signal" encompasses a signal sequence, which causes cleavage at a specific site at the 3' end of the eukaryotic mRNA and posttranscriptional incorporation of a sequence of about 100-200 adenine nucleotides (polyA tail) at the cleaved 3'-end. The polyadenylation signal comprises the sequence AATAAA about 10-30 nucleotides upstream of the cleavage site and a sequence located downstream. Various polyadenylation elements are known such as tk polyA, SV40 late and early polyA or BGH polyA (described for example in U.S. Pat. No. 5,122,458).

A skilled artisan would appreciate that the term "Translation regulatory elements" may encompass a translation initiation site (AUG), a stop codon and a polyA signal for each polypeptide to be expressed. For optimum expression it may be advisable to remove, add or change 5'- and/or 3'-untranslated regions of the nucleic acid sequence which is to be expressed, in order to eliminate any potentially unsuitable additional translation initiation codons or other sequences which might affect expression at the transcription or expression level. In order to promote expression, ribosomal consensus binding sites may alternatively be inserted immediately upstream of the start codon. In order to produce a secreted polypeptide the gene of interest usually contains a signal sequence which codes for a signal precursor peptide which transports the synthesized polypeptide to and through the ER membrane. The signal sequence is often but not always located at the amino terminus of the secreted protein and is cleaved by signal peptidases after the protein has been filtered through the ER membrane. The gene sequence will usually but not necessarily contain its own signal sequence. If the native signal sequence is not present a heterologous signal sequence may be introduced in known manner. Numerous signal sequences of this kind are known to the skilled artisan and deposited in sequence databanks such as GenBank and EMBL.

A skilled artisan would appreciate that the term "polypeptides", "polypeptide" or grammatical equivalents thereof, is used for amino acid sequences or proteins and encompasses polymers of amino acids of any length. This term also includes proteins which have been modified post-translationally by reactions such as glycosylation, phosphorylation, acetylation or protein processing. The structure of the polypeptide may be modified, for example, by substitutions, deletions or insertions of amino acids and fusion with other proteins while retaining its biological activity.

In order to produce one or more gene products of interest in the cells, the cells may be grown in a serum-free culture medium and in suspension culture under conditions which allow expression of the gene of interest. If for example the gene of interest is under the control of a constitutive promoter, there is no need to add special inducers. If the expression of the gene of interest is under the control of an inducible promoter, for example, a corresponding inducer must be added to the cell culture medium in a sufficient but non-toxic concentration. The cells can be expanded as desired by multiple subpassaging and transferred into suitable cell culture vessels. The gene product(s) is or are produced as either a cellular, membrane-bound or secretory product.

Figure 2:
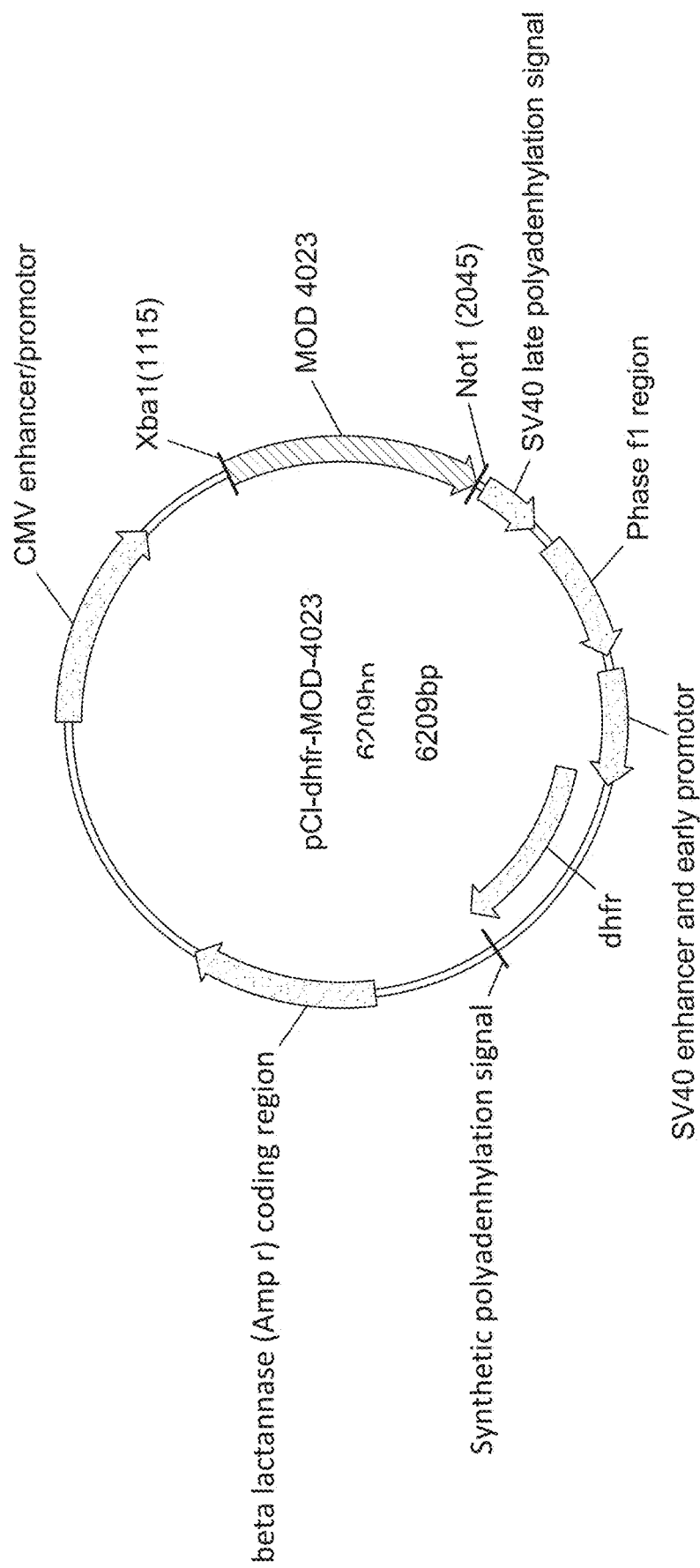
FIG. 2. Shows the map of the MOD-4023 pCI-dhfr plasmid.

In one embodiment, a step of manufacturing a CTP-modified hGH disclosed herein comprises stably transfecting a predetermined number of cells with an expression vector comprising a coding portion encoding a CTP-modified hGH disclosed herein. In another embodiment, the nucleotide sequence of the coding portion is set forth in SEQ ID NO: 9. In another embodiment, a step of manufacturing a CTP-modified hGH comprises stably transfecting cells with an expression vector comprising a coding portion encoding said CTP-modified hGH. In one embodiment, cells are CHO cells. In another embodiment, cells are DG44 cells. In another embodiment, cells are any cells known in the art suitable for expression and secretion of CTP-modified hGH. In another embodiment, the expression vector is a pCI-dhfr-MOD-23 expression vector (FIG. 2). In another embodiment, the transfected cells express a CTP-modified hGH disclosed herein. In another embodiment, the CTP-modified hGH being manufactured and expressed consists of two chorionic gonadotropin carboxy terminal peptides attached to the carboxy terminus of said hGH, and one chorionic gonadotropin carboxy terminal peptide attached to the amino terminus of said hGH, wherein the amino acid sequence of the expressed premature CTP-modified hGH is set forth in SEQ ID NO: 4. In another embodiment, the mature CTP-modified hGH being manufactured, expressed and secreted consists of two chorionic gonadotropin carboxy terminal peptides attached to the carboxy terminus of said hGH, and one chorionic gonadotropin carboxy terminal peptide attached to the amino terminus of said hGH, wherein the amino acid sequence of the expressed and secreted mature CTP-modified hGH is set forth in SEQ ID NO: 7. In other embodiment, the expression of CTP-modified hGH is at a high expression level. In another embodiment, said CTP-modified hGH is highly glycosylated. In another embodiment, said CTP-modified hGH is highly sialylated. As described above in detail, CTP-modified hGH may have different glycosylation content and patterns. A CTP-modified hGH manufactured by the methods disclosed herein may include any of the glycosylation patterns and content as disclosed above. In general, method of manufacture presented here, provide a CTP-modified hGH having a high glycosylation content and a high percentage of glycosylation sites glycosylated.

In one embodiment, a step of manufacturing a CTP-modified hGH comprises obtaining cell clones that overexpress the CTP-modified hGH. In another embodiment, expression of CTP-modified hGH is optimal. In one embodiment, the level of expression is at least 200 mg/L. In another embodiment, the level of expression is at least 300 mg/L. In another embodiment, the level of expression is at least 400 mg/L. In another embodiment, the level of expression is at least 500 mg/L. In another embodiment, the level of expression is at least 600 mg/L. In another embodiment, the level of expression is at least 700 mg/L. In another embodiment, the level of expression is at least 800 mg/L. In another embodiment, the level of expression is at least 900 mg/L. In another embodiment, the level of expression is at least 1 gm/L. In another embodiment, the level of expression is at least 1.2 gm/L. In another embodiment, the level of expression is at least 1.4 gm/L. In another embodiment, the level of expression is at least 1.6 gm/L. In another embodiment, the level of expression is at least 1.8 gm/L. In another embodiment, the level of expression is at least 2 gm/L. In another embodiment, the level of expression is at least 2.2 gm/L. In another embodiment, the level of expression is at least 2.4 gm/L. In another embodiment, the level of expression is at least 2.6 gm/L. In another embodiment, the level of expression is at least 2.8 gm/L. In another embodiment, the level of expression is at least 3 gm/L. In another embodiment, the clones in step (b) are propagated in medium to form a master cell bank (MCB) and a working cell bank (WCB). In one embodiment, clones at step (c) are obtained from a MCB. In another embodiment, clones at step (c) are obtained from a WCB.

The mature CTP-modified hGH polypeptide product disclosed herein is obtained from the cell culture medium as a secreted gene product. The skilled artisan would recognize that the secreted gene product would lack the signal peptide comprised in the full-length translation product and encoded in the nucleic acid sequence. However, if a protein or polypeptide is expressed without a secretion signal, the gene product may also be isolated from cell lysates. In order to obtain a pure homogeneous product which is substantially free from other recombinant proteins and host cell proteins, conventional purification procedures are carried out. First of all, cells and cell debris are frequently removed from the culture medium or lysate. The desired gene product can then be freed from contaminating soluble proteins, polypeptides and nucleic acids, e.g. by fractionation on immunoaffinity and ion exchange columns, ethanol precipitation, reversed phase HPLC or chromatography on Sephadex, hydroxyapatite, silica or cation exchange resins such as DEAE (see Examples herein). Methods known in the art and which result in the purification of a heterologous protein expressed by recombinant host cells are known to the skilled man and described in the literature, e.g. by Harris et al. (Harris et al., Protein Purification: A Practical Approach, Pickwood and Hames, eds., IRL Press, Oxford, 1995) and Scopes (Scopes, R., Protein Purification, Springer Verlag, 1988). These methods may be employed in whole or in part in the methods disclosed herein. Based on the methodology provided herein, the skilled artisan would appreciate and be able to adapt and modify use of particular chromatography methodologies based on need and knowledge in the art. For example, the skilled artisan may choose an alternative cation exchange column in place of a DEAE column, wherein the goal of separation by cation exchange would be maintained. Similar alternatives known in the art would be recognized by the skilled artisan for fractionation, immunoaffinity, protein precipitation, nucleic acid precipitation, ethanol precipitation, reversed phase HPLC, or chromatography on Sephadex, hydroxyapatite, silica, anion exchange or cation exchange resins.

In another embodiment, disclosed herein is a method of preparing one or more products in mammalian cells under serum-free conditions, characterized in that (i) mammalian cells contain a gene which codes for a CTP-modified hGH polypeptide disclosed herein; (ii) the mammalian cells are grown under serum-free conditions which allow replication of the mammalian cells; (iii) in each case at least one (1) of these mammalian cell(s) are deposited in a cell culture vessel under serum-free conditions; (iv) the suitably deposited mammalian cells are replicated under serum-free conditions; (v) the replicated cells are cultivated under serum-free conditions in which the gene is expressed and the CTP-modified hGH is secreted; and (vi) the gene product is then isolated from the culture supernatant and purified (see Examples herein). In another embodiment, a method of manufacturing comprises clones that express and secrete said CTP-modified hGH polypeptide. In another embodiment of this process the mammalian cell is a transfected mammalian cell into which the gene of interest has been introduced. Accordingly, a method of preparing recombinant gene products, disclosed herein, may be characterized in that before step (i) of the process described above the mammalian cells are transfected with a nucleic acid which at least codes for a gene of interest. Stable transfection of the corresponding mammalian cell is preferred.

Examples of serum-free, protein-free or chemically defined media include for example the commercially obtainable media Ham's F12 (Sigma, Deisenhofen, DE), RPMI 1640 (Sigma), Dulbecco's Modified Eagle's medium (DMEM; Sigma), Minimal Essential medium (MEM; Sigma), Iscove's Modified Dulbecco's medium (IMDM; Sigma), CDCHO (Invitrogen, Carlsbad, Calif., USA), CHO-S-SFMII (Invitrogen), serum-free CHO medium (Sigma), CD-PowerCHO2 medium (Lonza) and protein-free CHO medium (Sigma). Each of these media can if desired be supplemented with various compounds such as hormones and/or other growth factors (e.g. insulin, transferrin, epidermal growth factor, insulin-like growth factor), salts (e.g. sodium chloride, calcium, magnesium, phosphate), buffers (e.g. HEPES), nucleosides (e.g. adenosine, thymidine), glutamine, glucose or other equivalent nutrients, antibiotics and/or trace elements or commercially available Feed such as Power Feed A (Lonza) or Cell Boost 6 (HyCLone). If the replicable cells are recombinant cells which express one or more selectable markers, one or more suitable selection agents such as antibiotics may also be added to the medium.

It will be appreciated that other than containing the necessary elements for the transcription and translation of the inserted coding sequence (encoding the polypeptide), the expression construct disclosed herein can also include sequences engineered to optimize stability, production, purification, yield or activity of the expressed polypeptide.

In some embodiments, transformed cells are cultured under effective conditions, which allow for the expression of high amounts of recombinant polypeptide. In some embodiments, effective culture conditions include, but are not limited to, effective media, bioreactor, temperature, pH and oxygen conditions that permit protein production. In one embodiment, an effective medium may encompass any medium in which a cell is cultured to produce the recombinant polypeptide disclosed herein. In some embodiments, a medium typically includes an aqueous solution having assimilable carbon, nitrogen and phosphate sources, and appropriate salts, minerals, metals and other nutrients, such as vitamins. In some embodiments, cells disclosed herein can be cultured in conventional fermentation bioreactors, shake flasks, test tubes, microtiter dishes and petri plates. In some embodiments, culturing is carried out at a temperature, pH and oxygen content appropriate for a recombinant cell. In some embodiments, culturing conditions are within the expertise of one of ordinary skill in the art.

In one embodiment, culture conditions comprise dissolved oxygen (DO) content at about 20-80%. In another embodiment, DO content is at about 20-30%. In another embodiment, DO content is at about 30-40%. In another embodiment, DO content is at about 40-50%. In another embodiment, DO content is at about 50-60%. In another embodiment, DO content is at about 60-70%. In another embodiment, DO content is at about 70-80%.

In one embodiment, culture conditions comprise pH starting at one temperature and shifting to another during the manufacture. In another embodiment, pH starts at about 7.3 and shifts to about 6.7 during bioreactor incubation. In another embodiment, pH starts at about 7.3, about 7.2 or about 7.1 and shifts to about 6.7, about 6.8, about 6.9 or about 7.0 during bioreactor incubation. Each possibility represents an embodiment disclosed herein.

In some embodiments, depending on the vector and host system used for production, resultant polypeptides disclosed herein either remain within the recombinant cell, or are secreted into the medium.

In one embodiment, following a predetermined time in culture, recovery of the recombinant polypeptide is effected.

A skilled artisan would appreciate that the phrase "recovering the recombinant polypeptide" may encompass collecting the whole medium containing the polypeptide and can imply additional steps of separation or purification.

In one embodiment, polypeptides disclosed herein are purified using a variety of standard protein purification techniques, such as, but not limited to, affinity chromatography, ion exchange chromatography, filtration, electrophoresis, hydrophobic interaction chromatography, gel filtration chromatography, reverse phase chromatography, concanavalin A chromatography, hydroxyapatite chromatography, chromatofocusing and differential solubilization.

In one embodiment, each column is run under controlled or non-controlled temperature.

In one embodiment, to facilitate recovery, the expressed coding sequence can be engineered to encode the polypeptide disclosed herein and fused to a cleavable moiety. In one embodiment, a fusion protein is designed so that the polypeptide can be readily isolated by affinity chromatography; e.g., by immobilization on a column specific for the cleavable moiety. In one embodiment, a cleavage site is engineered between the polypeptide and the cleavable moiety and the polypeptide can be released from the chromatographic column by treatment with an appropriate enzyme or agent that specifically cleaves the fusion protein at this site [e.g., see Booth et al., Immunol. Lett. 19:65-70 (1988); and Gardella et al., J. Biol. Chem. 265:15854-15859 (1990)].

In one embodiment, the polypeptide disclosed herein is retrieved in "substantially pure" form.

A skilled artisan would appreciate that the phrase "substantially pure" may encompass a purity that allows for the effective use of the protein in the applications described herein. Such a form may also include highly glycosylated and highly sialylated forms as also disclosed herein.

In one embodiment, the polypeptide disclosed herein is synthesized using in vitro expression systems. In one embodiment, in vitro synthesis methods are well known in the art and the components of the system are commercially available.

In one embodiment, production of GH modified by CTPs using recombinant DNA technology is performed.

In some embodiments, the recombinant polypeptides are synthesized and purified; their therapeutic efficacy can be assayed either in vivo or in vitro. In one embodiment, the binding activities of the recombinant GH modified by CTPs disclosed herein can be ascertained using various assays.

In one embodiment, a method of manufacturing a CTP-modified hGH disclosed herein comprises a step for obtaining clones that optimally express and secrete said CTP-modified hGH from said WCB, and expanding said clones. In another embodiment, a method of manufacturing CTP-modified hGH comprises a step for obtaining clones that optimally express said CTP-modified hGH from said MCB, and expanding said clones. In another embodiment, a method of manufacturing comprises clones the optimally express and secrete said CTP-modified hGH. In another embodiment, the cell clones are expanded in solution through a series of sub-cultivation steps up to production bioreactor level. In another embodiment, the solution containing said sub-cultivated clones is seeded in a bioreactor. In another embodiment, the bioreactor is a disposable bioreactor. In another embodiment, the bioreactor comprises a stainless steel bioreactor, a rocking motion bioreactor such as Wave system from GE, a perfusion bioreactor, or any other bioreactor system known in the art. In one embodiment, removal of cells from a bioreactor is accomplished by use of a disposable filter system. If a large scale manufacture is performed, continuous centrifugation could be used prior to use of a filtering system.

In one embodiment, the cell clones are expanded further or up-scaled by serially culturing said cells in increasing sizes of the bioreactor until a desired scale is reached. In another embodiment, a bioreactor is run in a fed-batch mode. In another embodiment, a bioreactor is run in a batch mode. In another embodiment, a bioreactor is run in a repeated-batch mode. In another embodiment, a bioreactor is run in a perfusion mode. Each possibility described above, is another embodiment.

Peak viable cell densities differ depending on the type of bioreactor employed. In one embodiment, the peak viable cell density of a bioreactor used in methods of manufacturing disclosed herein is about $0.2 \times 10^6$-$1.4 \times 10^6$ cells/ml. In another embodiment, the peak viable cell density of a bioreactor used in methods of manufacturing disclosed herein is about $0.05 \times 10^6$-$100 \times 10^6$. In another embodiment, the peak viable cell density of a bioreactor is about $0.05 \times 10^6$-$0.5 \times 10^6$. In another embodiment, the peak viable cell density of a bioreactor is about $0.5 \times 10^6$-$5 \times 10^6$. In another embodiment, the peak viable cell density of a bioreactor is about $5.0 \times 10^6$-$50 \times 10^6$. In another embodiment, the peak viable cell density of a bioreactor is about $50 \times 10^6$-$100 \times 10^6$. Each possibility represents separate embodiments disclosed herein.

Feed schemes for bioreactor use could be different, e.g. repeated daily feeding from a certain day, or fixed in several days, in addition % of feed added could be different from few % up to even 50% or more. Each possibility is an embodiment disclosed herein.

DMSO may be added to a bioreactor at different concentrations as is known in the art. In one embodiment, 0.1-3% DMSO is added to a bioreactor during its use. In another embodiment, 0.1-0.5% DMSO is added. In another embodiment, 0.5-1.0% DMSO is added. In another embodiment, 1.0-1.5% DMSO is added. In another embodiment, 1.5-2.0% DMSO is added. In another embodiment, 2.0-2.5% DMSO is added. In another embodiment, 2.5-3.0% DMSO is added.

In one embodiment, a method of manufacturing a CTP-modified hGH disclose comprises the step of purifying a clarified harvest solution in order to obtain a purified protein solution. In another embodiment, a purified protein solution manufactured using methods presented herein, comprises at least 40% CTP-modified hGH. In another embodiment, a purified protein solution comprises at least 50% CTP-modified hGH. In another embodiment, a purified protein solution comprises at least 60% CTP-modified hGH. In another embodiment, a purified protein solution comprises at least 70% CTP-modified hGH. In another embodiment, a purified protein solution comprises at least 80% CTP-modified hGH. In another embodiment, a purified protein solution comprises at least 90% CTP-modified hGH.

In one embodiment, a clarified harvest is held up to 24 hours at 2-25° C. In another embodiment, the clarified harvest is stored at 5° C. for up to one month.

In one embodiment, the clarified harvest obtained in step (e) is tested for bioburden, bacterial endotoxin, specific protein content, residual DNA, viruses, virus-like particles, and/or Mycoplasma, or any combination thereof.

In one embodiment, the purification of the clarified harvest in step (f) is accomplished by sequentially performing the steps comprising: (g) concentrating, diafiltering and purifying said clarified harvest solution, wherein said concentration, diafiltration and purifying is accomplished by hollow fiber cassette or tangential flow cassette sequentially passing said clarified harvest solution through an anion exchange column and a hydrophobic interaction column; (h) obtaining said clarified harvest obtained following step; (i) and inactivating viruses present in said clarified harvest by incubating in a solution toxic to said viruses; (j) obtaining said clarified harvest solution from (h) and concentrating, diafiltering and purifying said clarified harvest solution, wherein said concentration, diafiltration and purification is followed by sequentially passing said clarified harvest solution through a Hydroxyapatite Mixed-Mode column and a cation exchange column; (j) obtaining said clarified harvest solution following step (i) and physically removing said clarified harvest solution from viruses by nanofiltration; (k) obtaining said clarified harvest solution following step (j) and concentrating, diafiltering and purifying said clarified harvest solution to arrive at a maximally purified clarified harvest containing said a highly glycosylated form of CTP-modified polypeptides. In another embodiment, methods disclosed herein comprise a centrifugation step before the final filtration. A skilled artisan would appreciate that both centrifugation and/or filtering are methods of clarifying a solution.

In one embodiment, ultrafiltration and diafiltration to concentrate and filter a clarified harvest may be performed using a hollow fiber cartridge, or equivalent TFF based UFDF step. The cartridge nominal molecular weight cutoff size is 10,000 kDa. In another embodiment a membrane cartridge could comply PES/PS/RC membranes with a cut-off of 3 kDa to 30 kDa.

In another embodiment, the anion exchange column of step (g) is a DEAE-Sepharose Fast Flow column. In another embodiment, the DEAE column purifies a highly glycosylated form of s CTP-modified hGH disclosed herein. In one embodiment, the higher the glycosylation the better the pharmacodynamics of the CTP-modified hGH. In another embodiment, an anion exchange column may comprise other anion exchange columns known in the art, for example a Capto DEAE anion exchange column or other resins such as Eshmuno Q.

In one embodiment, the hydrophobic column of step (g) is a Phenyl Hydrophobic Interaction Chromatography (HIC) column. The number of cycles of use for phenyl HIC may range between about 1-10. In one embodiment, 1-3 cycles are performed. In another embodiment, 1-5 cycles are performed. In another embodiment, 1-6 cycles are performed. In another embodiment, 1-7 cycles are performed. In another embodiment, 1-8 cycles are performed. In another embodiment, 1-9 cycles are performed. In another embodiment, 1-10 cycles are performed. In another embodiment, buffers known in the art are used for washing and elution. In one embodiment, an elution buffer comprises Ammonium Sulfate with propylene glycol. In one embodiment, an elution buffer comprises Ammonium Sulfate with ethylene glycol.

In one embodiment, a Hydroxyapatite Mixed-Mode column comprises a ceramic hydroxyapatite Mixed-Mode column (CHT). The number of cycles of use for CHT may range between about 1-10. In one embodiment, 1-3 cycles are performed. In another embodiment, 1-5 cycles are performed. In another embodiment, 1-6 cycles are performed. In another embodiment, 1-7 cycles are performed. In another embodiment, 1-8 cycles are performed. In another embodiment, 1-9 cycles are performed. In another embodiment, 1-10 cycles are performed. Elution from a CHT column may be performed with between about 3-10 column volumes (CV). In one embodiment, elution is performed with about 3 CV. In another embodiment, elution is performed with about 4 CV. In another embodiment, elution is performed with about 5 CV. In another embodiment, elution is performed with about 6 CV. In another embodiment, elution is performed with about 7 CV. In another embodiment, elution is performed with about 8 CV. In another embodiment, elution is performed with about 9 CV. In another embodiment, elution is performed with about 10 CV.

In one embodiment, viruses that could be present in the clarified harvest due to contamination are inactivated in the clarified harvest. In another embodiment, the viruses are inactivated using a 1% Triton-X 100 solution. In another embodiment, the viruses are inactivated using a 0.1 to 2% Triton-X 100 solution. In another embodiment, the viruses are inactivated using 0.2% Triton-X 100 solution. In another embodiment, the viruses are inactivated using 0.5% Triton-X 100 solution. In another embodiment, the viruses are inactivated using a 1-4% Triton-X 100 solution. In another embodiment, the viruses are inactivated using a 0.2-0.5% Triton-X 100 solution. In another embodiment, the viruses are inactivated using a 0.5-1.0% Triton-X 100 solution. In another embodiment, the viruses are inactivated using a 2% Triton-X 100 solution. In another embodiment, the viruses are inactivated using a 3% Triton-X 100 solution. In another embodiment, the viruses are inactivated using a 4% Triton-X 100 solution. In another embodiment, the viruses are inactivated using a 5-10% Triton-X 100 solution. In another embodiment, viral inactivation in a Triton-X 100 solution is for about 0.5 to 24 hours. In another embodiment, viral inactivation in a Triton-X solution is for about 0.5 to 1 hours. In another embodiment, viral inactivation in a Triton-X solution is for about 1 to 2 hours. In another embodiment, viral inactivation in a Triton-X solution is for about 2 to 3 hours. In another embodiment, viral inactivation in a Triton-X solution is for about 3 to 4 hours. In another embodiment, viral inactivation in a Triton-X solution is for about 4 to 6 hours. In another embodiment, viral inactivation in a Triton-X solution is for about 6 to 8 hours. In another embodiment, viral inactivation in a Triton-X solution is for about 8 to 10 hours. In another embodiment, viral inactivation in a Triton-X solution is for about 10 to 12 hours. In another embodiment, viral inactivation in a Triton-X solution is for about 12 to 24 hours.

It will be appreciated by the skilled artisan that other concentrations or other solutions available in the art and that are toxic to these viruses, including but not limited to, sodium cholate and Tween 80 may be used in the methods disclosed herein. In another embodiment, a mixture of Tri-n-butyl phosphate (TNBP) and Polysorbate 80 (Tween 80) is used to inactivate the virus in step (h). In another embodiment, methods of inactivation of viruses comprise lowering pH. A skilled artisan would appreciate that inactivation of viruses may encompass changing conditions of the solution as is known in the art.

In one embodiment, viruses are physically removed by using nanofiltration. It will be appreciated by the skilled artisan that any filter known in the art for removing viruses may be applied in methods disclosed herein. In another embodiment, nanofiltration is carried out using a Planova or Planova type filter cartridge (1-60 mm$^2$). Such methods are followed by confirmation of viral clearance from the clarified harvest using methods known in the art.

In one embodiment, a cation exchange column of step (i) herein is a SP-Sepharose Fast Flow column. In another embodiment, the cation exchange column comprises a CM sepharose Capto S. In another embodiment, the cation exchange column comprises any known in the art for the purpose herein.

In one embodiment, the methods disclosed herein achieve at least a 20% recovery rate of highly glycosylated CTP-modified hGH. In another embodiment, the methods achieve a recovery rate of at least 25%, at least 30%, at least 40%, at least 50%, at least 60%, at least 70%, at least 80%, at least 90%, at least 95%, at least 96%, at least 97%, at least 98%, at least 99%, at least 99.9% recovery rate of highly glycosylated CTP-modified hGH.

In one embodiment, following purification of a highly glycosylated CTP-modified hGH disclosed herein, the methods disclosed herein further comprise characterizing said CTP-modified polypeptide. In another embodiment, the purity of the CTP-modified hGH is determined. In another embodiment, glycosylation content is determined. In another embodiment, glycosylation site occupancy is determined. In one embodiment, purity, glycosylation content and glycosylation site occupancy are determined in the manufactured CTP-modified hGH.

In another embodiment, the cell clones utilized in methods disclosed herein are stored in a frozen cell bank. In another embodiment, the cell clones are stored in a lyophilized cell bank.

In another embodiment, the cell bank of methods and compositions disclosed herein is a master cell bank. In another embodiment, the cell bank is a working cell bank. In another embodiment, the cell bank is Good Manufacturing Practice (GMP) cell bank. In another embodiment, the cell bank is intended for production of clinical-grade material. In another embodiment, the cell bank conforms to regulatory practices for human use. In another embodiment, the cell bank is any other type of cell bank known in the art.

"Good Manufacturing Practices" are defined, in another embodiment, by (21 CFR 210-211) of the United States Code of Federal Regulations. In another embodiment, "Good Manufacturing Practices" are defined by other standards for production of clinical-grade material or for human consumption; e.g. standards of a country other than the United States.

In another embodiment, the medium used for propagating cells contains methotrexate (MXT). In another embodiment, the medium is methotrexate-free medium. In another embodiment, the concentration of MXT present in a medium is between about 0.1-2 uM. In another embodiment, the concentration of MXT present in the medium is about 0.1-0.5 uM. In another embodiment, the concentration of MXT present in the medium is about 0.5-1.0 uM. In another embodiment, the concentration of MXT present in the medium is about 1.0-1.5 uM. In another embodiment, the concentration of MXT present in the medium is about 1.5-2.0 uM. It will be well appreciated that the term "medium" may encompass a liquid or gel or powder that is suitable for growth or culture of the cells comprising the CTP-modified hGH disclosed herein. Such medium may be alternatively referred to as "growth medium" or "culture medium" and may include but is not limited to, nutrient media, enriched media, minimal media, differential media, transport media, or selective media. In a further aspect, selective medium may be suitable for selecting a particular group of cells during the manufacturing process.

In one embodiment, a purified protein solution contains at least 70% CTP-modified hGH. In another embodiment, the purified protein solution contains at least 80% CTP-modified hGH. In another embodiment, the purified solution contains at least 90-95% CTP-modified hGH. In another embodiment, the purified solution contains 95.1-99.9% CTP-modified hGH. In another embodiment, the purified solution contains 100% CTP-modified hGH.

In one embodiment, a CTP-modified hGH disclosed herein is highly glycosylated. It will be well appreciated by the skilled artisan that the term "highly glycosylated" when in reference to the harvested CTP-modified hGH polypeptides present in the harvest, may encompass a glycosylation level of about 60-80% of total CTP-modified hGH polypeptides of the purified solution. (See for example as measured by reverse phase HPLC in FIG. 11) In another embodiment, the harvest comprising highly glycosylated CTP-modified hGH has a glycosylation level of at least 50% of the CTP-modified hGH polypeptides in the purified solution. In another embodiment, the harvest comprising highly glycosylated CTP-modified hGH has a glycosylation level of at least 60% of the CTP-modified hGH polypeptides in the purified solution. In another embodiment, the harvest comprising highly glycosylated CTP-modified hGH has a glycosylation level of at least 70% of the CTP-modified hGH polypeptides In another embodiment, the harvest comprising highly glycosylated CTP-modified hGH has a glycosylation level of at least 80% of the CTP-modified hGH polypeptides in the purified solution. In another embodiment, the harvest comprises a glycosylation level of about 81-90% of the total CTP-modified hGH polypeptides of the purified solution. In another embodiment, the harvest comprising highly glycosylated CTP-modified hGH has a glycosylation level of at least 90% of the CTP-modified hGH polypeptides in the purified solution. In another embodiment, the harvest comprises a glycosylation level of about 91-95% of the total CTP-modified hGH polypeptides of the purified solution. In another embodiment, the harvest comprises a glycosylation level of about 95.1-99% of the total CTP-modified hGH polypeptides of the purified solution. In another embodiment, the harvest comprises a glycosylation level of 100% of the total CTP-modified hGH polypeptide of the purified solution.

In another embodiment, the purified CTP-modified hGH solution (drug substance (DS)) comprises a solution wherein at least 90% of the molecules are highly glycosylated. In another embodiment, the purified CTP-modified hGH solution (drug substance (DS)) comprises a solution wherein at least 95% of the molecules are highly glycosylated. In another embodiment, the purified CTP-modified hGH solution (drug substance (DS)) comprises a solution wherein 100% of the molecules are highly glycosylated. A skilled artisan would recognize that the purified CTP-modified hGH drug substance (DS) may encompass CTP-modified hGH wherein each molecule comprises 12-18 O-glycan occupancy.

A skilled artisan would appreciate that the term "drug substance" (DS) may encompass or be equivalent to the active pharmaceutical ingredient (API). In one embodiment, a CTP-modified hGH polypeptide, as set forth in SEQ ID NO: 7, drug substance (DS) comprises the bulk purified drug. The skilled artisan would also appreciate that the term "drug product" (DP) may encompass the finally formulated drug once dispensed into a final container, for example a vial, under aseptic conditions. In one embodiment, a CTP-modified hGH polypeptide, as set forth in SEQ ID NO: 7, drug product (DP) comprises the finally formulated CTP-modified hGH.

Highly glycosylated CTP-modified hGH polypeptides may have beneficial properties in methods of use for a long-acting hGH (for example MOD-4023), supporting reduced frequency of administration, for example a single weekly injection, of growth hormone deficient patients. The high glycosylation levels contribute to the significant increased hydrodynamic volume of a CTP-modified hGH, for example a CTP-modified hGH, as compared to recombinant hGH. This may result in an elongated circulating time of CTP-modified hGH.

In one embodiment, the number of O-glycans per CTP is at least 4-6. In another embodiment, the number of O-glycans per CTP is between 4-6. In another embodiment, the number of O-glycans per CTP is at least 4-8. In another embodiment, the number of O-glycans per CTP is between 4-8. In one embodiment, the number of O-glycans per CTP is at least 6-8. In one embodiment, the number of O-glycans per CTP is between 6-8. In another embodiment, the number of O-glycans per CTP is 4, 5, 6, 7 or 8. Each possibility represents another embodiment of CTP O-linked glycosylation.

In one embodiment, the number of O-glycans per CTP-modified hGH polypeptide having one CTP attached is at least 4-6. In another embodiment, the number of O-glycans per CTP-modified hGH polypeptide having one CTP attached is at least 6-8. In another embodiment, the number of O-glycans per CTP-modified hGH polypeptide having one CTP attached is at least 4-8. In another embodiment, the number of O-glycans per CTP-modified hGH polypeptide having two CTP units attached is at least 8-12. In another embodiment, the number of O-glycans per CTP-modified hGH polypeptide having two CTP units attached is at least 12-16. In another embodiment, the number of O-glycans per CTP-modified hGH polypeptide having two CTP units attached is at least 8-16. In another embodiment, the number of O-glycans per CTP-modified hGH polypeptide having three CTP units attached is at least 12-18. In another embodiment, the number of O-glycans per CTP-modified hGH polypeptide having three CTP units attached is at least 18-24. In another embodiment, the number of O-glycans per CTP-modified hGH polypeptide having three CTP units attached is at least 12-24. In another embodiment, the number of O-glycans per CTP-modified hGH polypeptide having four CTP units attached is at least 16-24. In another embodiment, the number of O-glycans per CTP-modified hGH polypeptide having four CTP units attached is at least 24-32. In another embodiment, the number of O-glycans per CTP-modified hGH polypeptide having four CTP units attached is at least 16-32. In another embodiment, the number of O-glycans per CTP-modified hGH polypeptide having five CTP units attached is at least 20-30. In another embodiment, the number of O-glycans per CTP-modified hGH polypeptide having five CTP units attached is at least 30-40. In another embodiment, the number of O-glycans per CTP-modified hGH polypeptide having five CTP units attached is at least 20-40.

In another embodiment, the number of O-glycans per each CTP-hGH-CTP-CTP (also known as "MOD-4023") is at least 12-18. In another embodiment, the number of O-glycans per MOD-4023 is at least 18-24. In another embodiment, the number of O-glycans per MOD-4023 is at least 12-24. In another embodiment, the number of O-glycans per MOD-4023 is at least 13, 14, 15, 16, 17, 18, 19, 20, 21, 22, 23, or 24. Each possibility represents another embodiment of CTP O-linked glycosylation.

In one embodiment, O-glycan occupancy per CTP is at least 70%. In another embodiment, O-glycan occupancy per CTP is at least 80%. In another embodiment, O-glycan occupancy per CTP is at least 90%. In another embodiment, O-glycan occupancy per CTP is 100%.

In one embodiment, the CTP-modified hGH is highly sialylated. It will be appreciated by the skilled artisan that the term "highly sialylated" when in reference to a CTP-modified hGH, may encompass a sialylation level of about 60-80% of total CTP-modified hGH polypeptides of the purified solution. In another embodiment, a sialylation level of about 60-70% of the total CTP-modified hGH polypeptides of the purified solution. In another embodiment, a sialylation level of about 70-80% of the total CTP-modified hGH polypeptides of the purified solution. In another embodiment, a sialylation level of about 80-90% of the total CTP-modified hGH polypeptides of the purified solution. In another embodiment, a sialylation level of about 90-95% of the total CTP-modified hGH polypeptides of the purified solution. In another embodiment, a sialylation level of about 95.1-99% of the total CTP-modified hGH polypeptides of the purified solution. In another embodiment, a sialylation level of 100% of the total CTP-modified hGH polypeptides of the purified solution. In another embodiment, an O-glycan structure in a CTP-modified hGH comprises a mono-sialylated core 1.

In one embodiment, the expression vector comprising a coding portion encoding a CTP-modified human GH disclosed herein also comprises a promoter, a coding sequence for the CTP-modified polypeptide, and a polyadenylation sequence. In one embodiment, the polyadenylation sequence is a simian virus (SV) 40 polyadenylation sequence.

In one embodiment, the CTP-modified hGH is expressed at a level of at least 600 mg/L. In another embodiment, the CTP-modified hGH is expressed at a level of at least 600-700 mg/L. In another embodiment, the CTP-modified hGH is expressed at a level of at least 701-800 mg/L. In another embodiment, the CTP-modified hGH is expressed at a level of at least 801-900 mg/L. In another embodiment, the CTP-modified hGH is expressed at a level of at least 901-1000 mg/L. In another embodiment, the CTP-modified hGH is expressed at a level of at least 1001-1100 mg/L. In another embodiment, the CTP-modified hGH is expressed at a level of at least 1101-1200 mg/L. In another embodiment, the CTP-modified hGH is expressed at a level of at least 1201-1300 mg/L. In another embodiment, the CTP-modified hGH is expressed at a level of at least 1301-1400 mg/L. In another embodiment, the CTP-modified hGH is expressed at a level of at least 1401-1500 mg/L. In another embodiment, the CTP-modified hGH is expressed at a level of at least 1501-1600 mg/L. In another embodiment, the CTP-modified hGH is expressed at a level of at least 1601-1700 mg/L. In another embodiment, the CTP-modified hGH is expressed at a level of at least 1701-1800 mg/L. In another embodiment, the CTP-modified hGH is expressed at a level of at least 1801-1900 mg/L. In another embodiment, the CTP-modified hGH is expressed at a level of at least 1901-2000 mg/L. In another embodiment, the CTP-modified hGH is expressed at a level of at least 2001-2100 mg/L. In another embodiment, the CTP-modified hGH is expressed at a level of at least 2101-2200 mg/L. In another embodiment, the CTP-modified hGH is expressed at a level of at least 2201-2300 mg/L. In another embodiment, the CTP-modified hGH is expressed at a level of at least 2301-2400 mg/L. In another embodiment, the CTP-modified hGH is expressed at a level of at least 2401-2500 mg/L. In another embodiment, the CTP-modified hGH is expressed at a level of at least 2501-2600 mg/L. In another embodiment, the CTP-modified hGH is expressed at a level of at least 2601-2700 mg/L. In another embodiment, the CTP-modified hGH is expressed at a level of at least 2701-2800 mg/L. In another embodiment, the CTP-modified hGH is expressed at a level of at least 2801-2900 mg/L. In another embodiment, the CTP-modified hGH is expressed at a level of at least 2901-3000 mg/L.

It will be appreciated by the skilled artisan that the term "expression" may encompass transcription and/or translation of a heterologous nucleic acid sequence within a host cell. The level of expression of a desired product/protein of interest in a host cell may be determined on the basis of either the amount of corresponding mRNA or cDNA that is present in the cell, or the amount of the desired polypeptide/protein of interest encoded by the selected sequence as in the present examples. For example, mRNA transcribed from a selected sequence can be quantitated by Northern blot hybridization, ribonuclease RNA protection, in situ hybridization to cellular RNA or by PCR (see Sambrook et al., 1989; Ausubel et al., 1987 updated). Proteins encoded by a selected sequence can be quantitated by various methods, e.g. by ELISA, by Western blotting, by radioimmunoassays, by immunoprecipitation, by assaying for the biological activity of the protein, by immunostaining of the protein followed by FACS analysis (see Sambrook et al., 1989; Ausubel et al., 1987 updated) or by homogeneous time-resolved fluorescence (HTRF) assays. In one embodiment, quantitation of the CTP-modified hGH comprises use of a reverse phase high performance liquid chromatography (RP-HPLC). In another embodiment, the RP-HPLC comprises a C-18 column. In another embodiment, the RP-HPLC comprises a C-8 column. In another embodiment, methods disclosed herein use an RP-HPLC to quantitate a CTP-modified hGH in the harvest (See Example steps 3 to 8). In another embodiment, methods disclosed herein use an RP-HPLC to quantitate a CTP-modified hGH in the first steps of purification (See Example steps 9-12).

In another embodiment, a cell bank, or frozen stock disclosed herein exhibits viability upon thawing of greater than 90%. In another embodiment, the storage is for an indefinite amount of time. Each possibility represents a separate embodiment disclosed herein.

In another embodiment, the storage is for 2 weeks. In another embodiment, the storage is for 3 weeks. In another embodiment, the storage is for 1 month. In another embodiment, the storage is for 2 months. In another embodiment, the storage is for 3 months. In another embodiment, the storage is for 5 months. In another embodiment, the storage is for 6 months. In another embodiment, the storage is for 9 months. In another embodiment, the storage is for 1 year.

In another embodiment, a cell bank, or frozen stock disclosed herein is cryopreserved by a method that comprises growing a culture of the cells in a defined media disclosed herein, freezing the culture in a solution comprising glycerol, and storing the cell clones at below −20 degrees Celsius. In another embodiment, the temperature is about −70 degrees Celsius. In another embodiment, the temperature is about ⁻70-⁻80 degrees Celsius. In another embodiment, any defined media disclosed herein may be used in this method. Each defined media represents a separate embodiment disclosed herein.

In another embodiment of methods and compositions disclosed herein, the culture is inoculated from a cell bank. In another embodiment, the culture is inoculated from a frozen stock. In another embodiment, the culture is inoculated from a starter culture. In another embodiment, the culture is inoculated from a colony. In another embodiment, the culture is inoculated at mid-log growth phase. In another embodiment, the culture is inoculated at approximately mid-log growth phase. In another embodiment, the culture is inoculated at another growth phase.

In another embodiment of methods and compositions disclosed herein, the solution used for freezing comprises DMSO in an amount of 2-20%. In another embodiment, the amount is 2%. In another embodiment, the amount is 20%. In another embodiment, the amount is 1%. In another embodiment, the amount is 1.5%. In another embodiment, the amount is 3%. In another embodiment, the amount is 4%. In another embodiment, the amount is 5%. In another embodiment, the amount is 2%. In another embodiment, the amount is 2%. In another embodiment, the amount is 7%. In another embodiment, the amount is 7.5%. In another embodiment, the amount is 9%. In another embodiment, the amount is 10%. In another embodiment, the amount is 12%. In another embodiment, the amount is 14%. In another embodiment, the amount is 16%. In another embodiment, the amount is 18%. In another embodiment, the amount is 22%. In another embodiment, the amount is 25%. In another embodiment, the amount is 30%. In another embodiment, the amount is 35%. In another embodiment, the amount is 40%.

In another embodiment, the additive is sucrose. In another embodiment, the additive is any other colligative additive or additive with anti-freeze properties that is known in the art. Each possibility represents a separate embodiment disclosed herein.

In one embodiment, a freezing solution used in the methods and for the compositions disclosed herein comprises conditioned media and DMSO. In one embodiment, a freezing solution used in the methods and for the compositions disclosed herein comprises about 46.255% conditioned media and 7.5% DMSO.

In one embodiment, the cell culture is grown by techniques routine in the art. In another embodiment, a constant pH is maintained during growth of the cell culture. In another embodiment, the pH is maintained at about 7.0. In another embodiment, the pH is about 6. In another embodiment, the pH is about 6.5. In another embodiment, the pH is about 7.5. In another embodiment, the pH is about 8. In another embodiment, the pH is 6.5-7.5. In another embodiment, the pH is 6-8. In another embodiment, the pH is 6-7. In another embodiment, the pH is 7-8. Each possibility represents a separate embodiment disclosed herein.

In another embodiment, a constant temperature is maintained during growth of the culture. In another embodiment, the temperature is maintained at about 37° C. In another embodiment, the temperature is 37° C. In another embodiment, the temperature is 25° C. In another embodiment, the temperature is 27° C. In another embodiment, the temperature is 28° C. In another embodiment, the temperature is 30° C. In another embodiment, the temperature is 32° C. In another embodiment, the temperature is 34° C. In another embodiment, the temperature is 35° C. In another embodiment, the temperature is 36° C. In another embodiment, the temperature is 38° C. In another embodiment, the temperature is 39° C.

In another embodiment, a constant dissolved oxygen concentration is maintained during growth of the culture. In another embodiment, the dissolved oxygen concentration is maintained at 20% of saturation. In another embodiment, the concentration is 15% of saturation. In another embodiment, the concentration is 16% of saturation. In another embodiment, the concentration is 18% of saturation. In another embodiment, the concentration is 22% of saturation. In another embodiment, the concentration is 25% of saturation. In another embodiment, the concentration is 30% of saturation. In another embodiment, the concentration is 35% of saturation. In another embodiment, the concentration is 40% of saturation. In another embodiment, the concentration is 45% of saturation. In another embodiment, the concentration is 50% of saturation. In another embodiment, the concentration is 55% of saturation. In another embodiment, the concentration is 60% of saturation. In another embodiment, the concentration is 65% of saturation. In another embodiment, the concentration is 70% of saturation. In another embodiment, the concentration is 75% of saturation. In another embodiment, the concentration is 80% of saturation. In another embodiment, the concentration is 85% of saturation. In another embodiment, the concentration is 90% of saturation. In another embodiment, the concentration is 95% of saturation. In another embodiment, the concentration is 100% of saturation. In another embodiment, the concentration is near 100% of saturation.

In another embodiment of methods and compositions disclosed herein, the culture is grown in media having a maximum volume of 2 liters (L) per vessel. In another embodiment, the media has a maximum volume of 200 ml per vessel. In another embodiment, the media has a maximum volume of 300 ml per vessel. In another embodiment, the media has a maximum volume of 500 ml per vessel. In another embodiment, the media has a maximum volume of 750 ml per vessel. In another embodiment, the media has a maximum volume of 1 L per vessel. In another embodiment, the media has a maximum volume of 1.5 L per vessel. In another embodiment, the media has a maximum volume of 2.5 L per vessel. In another embodiment, the media has a volume of 3 L per vessel. In another embodiment, the media has a volume of 5 L per vessel. In another embodiment, the media has a volume of at least 5 L per vessel. In another embodiment, the media has a volume of at least 10 L per vessel.

In another embodiment, the media has a minimum volume of 2 L per vessel. In another embodiment, the media has a minimum volume of 500 ml per vessel. In another embodiment, the media has a minimum volume of 750 ml per vessel. In another embodiment, the media has a minimum volume of 1 L per vessel. In another embodiment, the media has a minimum volume of 1.5 L per vessel. In another embodiment, the media has a minimum volume of 2.5 L per vessel. In another embodiment, the media has a minimum volume of 3 L per vessel. In another embodiment, the media has a minimum volume of 4 L per vessel. In another embodiment, the media has a minimum volume of 5 L per vessel. In another embodiment, the media has a minimum volume of 6 L per vessel. In another embodiment, the media has a minimum volume of 8 L per vessel. In another embodiment, the media has a minimum volume of 10 L per vessel.

In another embodiment, the step of freezing is performed when the culture has a density of $1 \times 10^6$ viable cells (VC)/ml. In another embodiment, the biomass is $1.5 \times 10^6$ VC/ml. In another embodiment, the biomass is $1.5 \times 10^6$ VC/ml. In another embodiment, the biomass is $2 \times 10^6$ VC/ml. In another embodiment, the biomass is $3 \times 10^6$ VC/ml. In another embodiment, the biomass is $4 \times 10^6$ VC/ml. In another embodiment, the biomass is $5 \times 10^6$ VC/ml. In another embodiment, the biomass is $7 \times 10^6$ VC/ml. In another embodiment, the biomass is $9 \times 10^6$ VC/ml. In another embodiment, the biomass is $10 \times 10^6$ VC/ml. In another embodiment, the biomass is $12 \times 10^6$ VC/ml. In another embodiment, the biomass is $15 \times 10^6$ VC/ml. In another embodiment, the biomass is $20 \times 10^7$ VC/ml. In another embodiment, the biomass is $25 \times 10^6$ VC/ml. In another embodiment, the biomass is $30 \times 10^7$ VC/ml. In another embodiment, the biomass is $33 \times 10^6$ VC/ml. In another embodiment, the biomass is $40 \times 10^6$ VC/ml. In another embodiment, the biomass is $50 \times 10^6$ VC/ml. In another embodiment, the biomass is more than $50 \times 10^6$ VC/ml.

In another embodiment of methods and compositions disclosed herein, the cell culture is flash-frozen in liquid nitrogen, followed by storage at the final freezing temperature. In another embodiment, the culture is frozen in a more gradual manner; e.g. by placing in a vial of the culture in the final storage temperature. In another embodiment, the culture is frozen by any other method known in the art for freezing cell cultures.

It will be understood by the skilled artisan that the terms "cell culture" and "tissue culture" may be used interchangeably and denote the maintenance of cells in vitro, in suspension culture in a liquid medium or on surface such as glass, plastic or agar provided with liquid medium. In general, "cell culture" necessitates a medium that is buffered to maintain a constant suitable pH. Media used in cell culture are generally formulated to include an adequate supply of necessary nutrients and can be osmotically tailored to the particular cells being maintained, with temperature and gas phase also being controlled within suitable limits. Cell culture techniques are well known in the art. See, e.g., Morgan et al. 1993 Animal Cell Culture, BIOS Scientific Publishers, Oxford, UK; and Adams, R. L. P. 1990 Cell Culture for Biochemists, Second Edition, Elsevier.

It will be appreciated by the skilled artisan that the term "Passage" may encompass the act of subculturing a cell population. A "subculture" may encompass a cell culture established by the inoculation of sterile medium, which in one embodiment is a fresh sterile medium, with a sample from a previous culture.

It will also be appreciated by the skilled artisan that the term "cell strain" may encompass a population of cells derived from a primary culture using subcultivation techniques. Thus, a primary culture can be subcultured into two or more new cultures and the subculturing repeated at periodic intervals for several months to maintain the cell strain. Subculturing under the methods disclosed herein can be carried out using established cell culture techniques.

In one embodiment, passaged cell strains, and immortalized cell lines can be characterized by their expression of specific functional markers such as keratins, hormonal and growth factor receptors and the like.

In some embodiments, cultures may be carried out in serum-free defined media with added growth factors. In other aspects the media contains serum with or without added growth factors. Such modifications may be empirically determined by the skilled artisan so as to optimize cell proliferation.

It will be appreciated by a skilled artisan that the term "cell line" can encompass a population of cells derived from a single explant which are characterized as having the potential for unlimited proliferation in vitro. As disclosed herein, a cell line can be isolated from a primary culture based on its ability to survive and continue to grow in culture. Cell lines which have been derived originally from tumor tissue may have been transformed in vivo, although not all neoplastic cell populations have the capacity to grow indefinitely in vitro. Further, cell lines generally retain their differentiated character through many rounds of division.

Suitable cell culture substrates are generally a container that can be sterilized, does not leach toxic factors and does not distort microscopy images. Thus plates formed from glass and plastic are suitable substrates for use in the methods disclosed herein. Plastic containers may further be treated to encourage cell attachment using techniques known in the art (Ramsey et al. 1984 In vitro 20:802). Suitable tissue culture media generally consist of an isotonic, buffered, basal nutrient medium which provides an energy source, coupled with inorganic salts, amino acids, vitamins and various supplements. Supplements may include serum (e.g., fetal calf serum, or the like) various antibiotics to prevent contamination or to provide selective conditions, attachment and growth factors, or the like. A number of media formulations are known in the art, such as, but not limited to, minimal essential medium (MEM), Rosewell Park Memorial Institute (RPMI) 1640 or Dulbecco's modified Eagle's medium (DMEM). Suitable tissue culture conditions are also known in the art. See, e.g., Morgan et al. 1993 Animal Cell Culture, BIOS Scientific Publishers Ltd., Oxford, U K, and Adams, R. L. P. 1990 Cell Culture for Biochemists, Second Edition, Elsevier. In another embodiment disclosed herein, methods of manufacture of CTP-modified hGH is a serum-free process. In another embodiment disclosed herein, methods of manufacture of CTP-modified hGH is an animal derived-free process.

In another embodiment of methods and compositions disclosed herein, the storage temperature of the culture is between $^-20$ and $^-80$ degrees Celsius (° C.). In another embodiment, the temperature is significantly below $^-20°$ C. In another embodiment, the temperature is not warmer than $^-70°$ C. In another embodiment, the temperature is $^-70°$ C. In another embodiment, the temperature is about $^-70°$ C. In another embodiment, the temperature is $^-20°$ C. In another embodiment, the temperature is about $^-20°$ C. In another embodiment, the temperature is $^-30°$ C. In another embodiment, the temperature is $^-40°$ C. In another embodiment, the temperature is $^-50°$ C. In another embodiment, the temperature is $^-60°$ C. In another embodiment, the temperature is $^-80°$ C. In another embodiment, the temperature is $^-30$-$^-70°$ C. In another embodiment, the temperature is $^-40$-$^-70°$ C. In another embodiment, the temperature is $^-50$-$^-70°$ C. In another embodiment, the temperature is $^-60$-$^-70°$ C. In another embodiment, the temperature is $^-30$-$^-80°$ C. In another embodiment, the temperature is $^-40$-$^-80°$ C. In another embodiment, the temperature is $^-50$-$^-80°$ C. In another embodiment, the temperature is $^-60$-$^-80°$ C. In another embodiment, the temperature is $^-70$-$^-80°$ C. In another embodiment, the temperature is colder than $^-70°$ C. In another embodiment, the temperature is colder than $^-80°$ C.

In another embodiment, for cryopreservation, the cells are frozen slowly until they reach a temperature below $-70°$ C. in medium that includes a cryoprotectant and vials are then transferred to a liquid-nitrogen freezer to maintain them at temperatures below $-130°$ C.

In another embodiment of methods and compositions disclosed herein, the cryopreservation, or frozen storage, is for a maximum of 24 hours. In another embodiment, the cryopreservation, or frozen storage is for maximum of 2 days. In another embodiment, the cryopreservation, frozen storage is for maximum of 3 days. In another embodiment, the cryopreservation, or frozen storage is for maximum of 4 days. In another embodiment, the cryopreservation, or frozen storage is for maximum of 1 week. In another embodiment, the cryopreservation, or frozen storage is for maximum of 2 weeks. In another embodiment, the cryopreservation, or frozen storage is for maximum of 3 weeks. In another embodiment, the cryopreservation, or frozen storage is for maximum of 1 month. In another embodiment, the cryopreservation, or frozen storage is for maximum of 2 months. In another embodiment, the cryopreservation, or frozen storage is for maximum of 3 months. In another embodiment, the cryopreservation, or frozen storage is for maximum of 5 months. In another embodiment, the cryopreservation, or frozen storage is for maximum of 6 months. In another embodiment, the cryopreservation, or frozen storage is for maximum of 9 months. In another embodiment, the cryopreservation, or frozen storage is for maximum of 1 year.

In another embodiment, the cryopreservation, or frozen storage is for a minimum of 1 week. In another embodiment, the cryopreservation, or frozen storage is for minimum of 2 weeks. In another embodiment, the cryopreservation, or frozen storage is for minimum of 3 weeks. In another embodiment, the cryopreservation, or frozen storage is for minimum of 1 month. In another embodiment, the cryopreservation, or frozen storage is for minimum of 2 months. In another embodiment, the cryopreservation, or frozen storage is for minimum of 3 months. In another embodiment, the cryopreservation, or frozen storage is for minimum of 5 months. In another embodiment, the cryopreservation, or frozen storage is for minimum of 6 months. In another embodiment, the cryopreservation, or frozen storage is for minimum of 9 months. In another embodiment, the cryopreservation, or frozen storage is for minimum of 1 year. In another embodiment, the cryopreservation, or frozen storage is for minimum of 1.5 years. In another embodiment, the cryopreservation, or frozen storage is for minimum of 2 years. In another embodiment, the cryopreservation, or frozen storage is for minimum of 3 years. In another embodiment, the cryopreservation, or frozen storage is for minimum of 5 years. In another embodiment, the cryopreservation, or frozen storage is for minimum of 7 years. In another embodiment, the cryopreservation, or frozen storage is for minimum of 10 years. In another embodiment, the cryopreservation, or frozen storage is for longer than 10 years.

In another embodiment of methods and compositions disclosed herein, the cells exhibit growth after thawing following an extended period of cryopreservation or frozen storage. In another embodiment, the cells exhibit growth within about 15-22 hours after inoculating fresh media with cells from the cell bank or starter culture. In another embodiment, the cells exhibit growth within about 12-20 hours after inoculating fresh media with cells from the cell bank or starter culture. In one embodiment, to ensure viability, genetic stability, and phenotypic stability, cell lines need to be maintained in the exponential growth phase (via subculturing on a regular basis).

A skilled artisan would appreciate that the term "extended period" of cryopreservation, or frozen storage, may encompass 1 month. In another embodiment, the period is 2 months. In another embodiment, the period is 3 months. In another embodiment, the period is 5 months. In another embodiment, the period is 6 months. In another embodiment, the period is 9 months. In another embodiment, the period is 1 year. In another embodiment, the period is 1.5 years. In another embodiment, the period is 2 years. In another embodiment, the period is 2-7 years. In another embodiment, the period is for at least 7 years. In another embodiment, the period is for at least 10 years.

In another embodiment, the cells of the methods and compositions disclosed herein retain a viability of over 90% after thawing following cryopreservation. In another embodiment, the viability upon thawing is close to 100% following the period of cryopreservation. In another embodiment, the viability upon thawing is close to 90%. In another embodiment, the viability upon thawing is at least 90%. In another embodiment, the viability upon thawing is over 80%.

In another embodiment, a cell bank, frozen stock, or batch of vaccine doses disclosed herein is grown in a defined cell culture media. Such media are known in the art and may include, but not limited to Dulbecco's Modified Eagle's Medium (DMEM) (ATCC® No. 30-2002), Iscove's Modified Dulbecco's Medium (IMDM) (ATCC® No. 30-2005), Hybri-Care Medium (ATCC® No. 46-X), McCoy's 5A and RPMI-1640 (ATCC® No. 30-2007), Ham's Nutrient Mixtures (ATCC® CCL-61™), PowerCHO™ Chemically Defined, Serum-free CHO Medium (Lonza Cat. No. 12-771Q); or any other media known in the art. In another embodiment these media may be supplemented in antibiotics or animal sera, as will be empirically determined by the skilled artisan.

In one embodiment, disclosed herein are bioreactors and methods, which allow the cultivation of mammalian cells in large scale volumes. Furthermore, and in another embodiment, said bioreactors and methods, allow the cultivation of mammalian cells under optimal conditions, even if grown in large scale volumes and therefore allow a process performance and product quality independent of the size of the bioreactor. The duration of time of incubation within the bioreactor can vary, just by changing the scale and bioreactor system, for example the duration may be between 8-9, or it may be between 15-16 days. In another embodiment, the duration of incubation in a bioreactor is about 7 days, about 8 days, about 9 days, about 10 days, about 11 days, about 12 days, about 13 days, about 14 days, about 15 days, about 16 days, about 17 days, about 18 days, about 19 days, about 20 days or more. In another embodiment, when a perfusion bioreactor is used, the duration of incubation may be up to 7-120 days. Each possibility listed above is an embodiment disclosed herein.

In another embodiment, disclosed herein are large-scale bioreactors which allow the cultivation of mammalian cells in a homogenous environment with respect to process parameters such as pH, dissolved oxygen tension (DOT) and temperature, maintaining a well-mixed cell suspension and blending nutrient feeds within the bioreactor. In another embodiment, the bioreactor is a disposable bioreactor.

The methods of manufacturing disclosed herein solve the technical problems underlying the manufacturing of CTP-modified hGH polypeptides by the provision of bioreactors, bioreactor systems and methods for the cultivation of eukaryotic cells, especially of mammalian cells.

In one embodiment, the bioreactor has a volume of at least 250 liters (L). In another embodiment, the bioreactor has a volume of at least 500 L. In another embodiment the volume is at least 1000 L, at least 2000 L, at least 5,000 L, at least 10,000 L at least 12,000 L or at least 15,000 L.

In another embodiment, the cells are subcultivated in increasing volumes of bioreactors (see Examples herein).

Compositions

In some embodiment, CTP-modified human growth hormone (hGH) polypeptides disclosed herein and manufactured using the methods disclosed herein can be used to treat a subject, with conditions related to growth and weight, such as a growth deficiency disorder, AIDS wasting, aging, impaired immune function of HIV-infected subjects, a catabolic illness, surgical recovery, a congestive cardiomyopathy, liver transplantation, liver regeneration after hepatectomy, chronic renal failure, renal osteodystrophy, osteoporosis, achondroplasia/hypochondroplasia, skeletal dysplasia, a chronic inflammatory or nutritional disorder such as Crohn's disease, short bowel syndrome, juvenile chronic arthritis, cystic fibrosis, male infertility, X-linked hypophosphatemic rickets, Down's syndrome, Spina bifida, Noonan Syndrome, obesity, impaired muscle strength and fibromyalgia. In one embodiment, the polypeptides disclosed herein can be provided to the individual per se. In one embodiment, the polypeptides disclosed herein can be provided to the individual as part of a pharmaceutical composition where it is mixed with a pharmaceutically acceptable carrier.

A skilled artisan would appreciate that the term "pharmaceutical composition" may encompass a preparation of one or more of the active ingredients described herein with other chemical components such as physiologically suitable carriers and excipients. The purpose of a pharmaceutical composition is to facilitate administration of a compound to an organism.

The modified peptides disclosed herein can be formulated into suitable pharmaceutical preparations such as capsules and injections in admixture with carriers, diluents, etc. known per se, which can be orally or parenterally administered to mammals (e.g. cows, horses, pigs, sheep, humans).

A skilled artisan would appreciate that the term "active ingredient" may encompass the polypeptide sequence of interest, which is accountable for the biological effect.

In some embodiments, any of the compositions disclosed herein will comprise at least two CTP sequences bound to a protein of interest, in any form. In one embodiment, disclosed herein combined preparations. A skilled artisan would appreciated that the term "a combined preparation" may encompass a "kit of parts" in the sense that the combination partners as defined above can be dosed independently or by use of different fixed combinations with distinguished amounts of the combination partners i.e., simultaneously, concurrently, separately or sequentially. In some embodiments, the parts of the kit of parts can then, e.g., be administered simultaneously or chronologically staggered, that is at different time points and with equal or different time intervals for any part of the kit of parts. The ratio of the total amounts of the combination partners, in some embodiments, can be administered in the combined preparation. In one embodiment, the combined preparation can be varied, e.g., in order to cope with the needs of a patient subpopulation to be treated or the needs of the single patient which different needs can be due to a particular disease, severity of a disease, age, sex, or body weight as can be readily made by a person skilled in the art.

A skilled artisan would appreciated that the phrases "physiologically acceptable carrier" and "pharmaceutically acceptable carrier" which can be used interchangeably may encompass a carrier or a diluent that does not cause significant irritation to an organism and does not abrogate the biological activity and properties of the administered compound. An adjuvant is included under these phrases. In one embodiment, one of the ingredients included in the pharmaceutically acceptable carrier can be for example polyethylene glycol (PEG), a biocompatible polymer with a wide range of solubility in both organic and aqueous media (Mutter et al. (1979).

A skilled artisan would appreciate that the term "excipient" may encompass an inert substance added to a pharmaceutical composition to further facilitate administration of an active ingredient. In one embodiment, excipients include calcium carbonate, calcium phosphate, various sugars and types of starch, cellulose derivatives, gelatin, vegetable oils and polyethylene glycols.

Techniques for formulation and administration of drugs are found in "Remington's Pharmaceutical Sciences," Mack Publishing Co., Easton, PA, latest edition, which is incorporated herein by reference.

In one embodiment, suitable routes of administration, for example, include oral, rectal, transmucosal, transnasal, intestinal or parenteral delivery, including intramuscular, subcutaneous and intramedullary injections as well as intrathecal, direct intraventricular, intravenous, intraperitoneal, intranasal, or intraocular injections.

In one embodiment, the preparation is administered in a local rather than systemic manner, for example, via injection of the preparation directly into a specific region of a patient's body.

In another embodiment, CTP-modified hGH polypeptides disclosed herein are administered in a dose of 1-90 micrograms in 0.1-5 ml solution. In another embodiment, CTP-modified hGH polypeptides are administered in a dose of 1-50 micrograms in 0.1-5 ml solution. In another embodiment, CTP-modified hGH polypeptides are administered in a dose of 1-25 micrograms in 0.1-5 ml solution. In another embodiment, CTP-modified hGH polypeptides are administered in a dose of 50-90 micrograms in 0.1-5 ml solution. In another embodiment, CTP-modified hGH polypeptides are administered in a dose of 10-50 micrograms in 0.1-5 ml solution.

In another embodiment, CTP-modified hGH polypeptides are administered in a dose of 1-90 micrograms in 0.1-5 ml solution by intramuscular (IM) injection, subcutaneous (SC) injection, or intravenous (IV) injection once a week. In another embodiment, CTP-modified hGH polypeptides are administered in a dose of 1-90 micrograms in 0.1-5 ml solution by intramuscular (IM) injection, subcutaneous (SC) injection, or intravenous (IV) injection twice a week. In another embodiment, CTP-modified hGH polypeptides are administered in a dose of 1-90 micrograms in 0.1-5 ml solution by intramuscular (IM) injection, subcutaneous (SC) injection, or intravenous (IV) injection three times a week. In another embodiment, CTP-modified hGH polypeptides are administered in a dose of 1-90 micrograms in 0.1-5 ml solution by intramuscular (IM) injection, subcutaneous (SC) injection, or intravenous (IV) injection once every two weeks. In another embodiment, CTP-modified hGH polypeptides are administered in a dose of 1-90 micrograms in 0.1-5 ml solution by intramuscular (IM) injection, subcutaneous (SC) injection, or intravenous (IV) injection once every 17 days. In another embodiment, CTP-modified hGH polypeptides are administered in a dose of 1-90 micrograms in 0.1-5 ml solution by intramuscular (IM) injection, subcutaneous (SC) injection, or intravenous (IV) injection once every 19 days weeks.

Various embodiments of dosage ranges are contemplated. The dosage of the polypeptide disclosed herein, in one embodiment, is in the range of 0.05-80 mg/day. In another embodiment, the dosage is in the range of 0.05-50 mg/day. In another embodiment, the dosage is in the range of 0.1-20 mg/day. In another embodiment, the dosage is in the range of 0.1-10 mg/day. In another embodiment, the dosage is in the range of 0.1-5 mg/day. In another embodiment, the dosage is in the range of 0.5-5 mg/day. In another embodiment, the dosage is in the range of 0.5-50 mg/day. In another embodiment, the dosage is in the range of 5-80 mg/day. In another embodiment, the dosage is in the range of 35-65 mg/day. In another embodiment, the dosage is in the range of 35-65 mg/day. In another embodiment, the dosage is in the range of 20-60 mg/day. In another embodiment, the dosage is in the range of 40-60 mg/day. In another embodiment, the dosage is in a range of 45-60 mg/day. In another embodiment, the dosage is in the range of 40-60 mg/day. In another embodiment, the dosage is in a range of 60-120 mg/day. In another embodiment, the dosage is in the range of 120-240 mg/day. In another embodiment, the dosage is in the range of 40-60 mg/day. In another embodiment, the dosage is in a range of 240-400 mg/day. In another embodiment, the dosage is in a range of 45-60 mg/day. In another embodiment, the dosage is in the range of 15-25 mg/day. In another embodiment, the dosage is in the range of 5-10 mg/day. In another embodiment, the dosage is in the range of 55-65 mg/day.

In one embodiment, the dosage is 20 mg/day. In another embodiment, the dosage is 30 mg/day. In another embodiment, the dosage is 40 mg/day. In another embodiment, the dosage is 50 mg/day. In another embodiment, the dosage is 60 mg/day. In another embodiment, the dosage is 70 mg/day. In another embodiment, the dosage is 80 mg/day. In another embodiment, the dosage is 90 mg/day. In another embodiment, the dosage is 100 mg/day.

The dosage of the CTP-modified hGH polypeptides disclosed herein, in one embodiment, is in the range of 0.005-100 mg/week. In another embodiment, the dosage is in the range of 0.005-5 mg/week. In another embodiment, the dosage is in the range of 0.01-50 mg/week. In another embodiment, the dosage is in the range of 0.1-20 mg/week. In another embodiment, the dosage is in the range of 0.1-10 mg/week. In another embodiment, the dosage is in the range of 0.01-5 mg/week. In another embodiment, the dosage is in the range of 0.001-0.01 mg/week. In another embodiment, the dosage is in the range of 0.001-0.1 mg/week. In another embodiment, the dosage is in the range of 0.1-5 mg/week. In another embodiment, the dosage is in the range of 0.5-50 mg/week. In another embodiment, the dosage is in the range of 0.2-15 mg/week. In another embodiment, the dosage is in the range of 0.8-65 mg/week. In another embodiment, the dosage is in the range of 1-50 mg/week. In another embodiment, the dosage is in the range of 5-10 mg/week. In another embodiment, the dosage is in the range of 8-15 mg/week. In another embodiment, the dosage is in a range of 10-20 mg/week. In another embodiment, the dosage is in the range of 20-40 mg/week. In another embodiment, the dosage is in a range of 60-120 mg/week. In another embodiment, the dosage is in the range of 12-40 mg/week. In another embodiment, the dosage is in the range of 40-60 mg/week. In another embodiment, the dosage is in a range of 50-100 mg/week. In another embodiment, the dosage is in a range of 1-60 mg/week. In another embodiment, the dosage is in the range of 15-25 mg/week. In another embodiment, the dosage is in the range of 5-10 mg/week. In another embodiment, the dosage is in the range of 55-65 mg/week. In another embodiment, the dosage is in the range of 1-5 mg/week.

In another embodiment, the CTP-modified hGH polypeptides dosage given to a subject is 50% of the standard dosage given to a reference subject from the same population of subjects (e.g. children, elderly, men, women, GH deficient, specific nationality, etc.). In another embodiment, the dosage is 30% of the dosage given to a subject from a specific population of subjects. In another embodiment, the dosage is 45% of the dosage given to a subject from a specific population of subjects. In another embodiment, the dosage is 100% of the dosage given to a subject from a specific population of subjects.

In another embodiment, the dosage is 1-5 mg/week. In another embodiment, the dosage is 2 mg/week. In another embodiment, the dosage is 4 mg/week. In another embodiment, the dosage is 1.2 mg/week. In another embodiment, the dosage is 1.8 mg/week. In another embodiment, the dosage is approximately the dosages described herein.

In another embodiment, the dosage is 1-5 mg/administration. In another embodiment, the dosage is 2 mg/administration. In another embodiment, the dosage is 4 mg/administration. In another embodiment, the dosage is 1.2 mg/administration. In another embodiment, the dosage is 1.8 mg/administration. In one embodiment, the composition is administered once a week. In another embodiment, the composition is administered once biweekly. In another embodiment, the composition is administered monthly. In another embodiment, the composition is administered daily.

In another embodiment, the CTP-modified hGH polypeptide disclosed herein is formulated in an intranasal dosage form. In another embodiment, the CTP-modified hGH polypeptide is formulated in an injectable dosage form. In another embodiment, the CTP-modified hGH polypeptide is administered to a subject in a dose ranging from 0.0001 mg to 0.6 mg. In another embodiment, the CTP-modified hGH polypeptide is administered to a subject in a dose ranging from 0.001 mg to 0.005 mg. In another embodiment, the CTP-modified hGH polypeptide is administered to a subject in a dose ranging from 0.005 mg to 0.01 mg. In another embodiment, the CTP-modified hGH polypeptide is administered to a subject in a dose ranging from 0.01 mg to 0.3 mg. In another embodiment, the CTP-modified hGH polypeptide is administered to a subject in a dose in a dose ranging from 0.2 mg to 0.6 mg.

In another embodiment, the CTP-modified hGH polypeptide disclosed herein is administered to a subject in a dose ranging from 1-100 micrograms. In another embodiment, the CTP-modified hGH polypeptide is administered to a subject in a dose ranging from 10-80 micrograms. In another embodiment, the CTP-modified hGH polypeptide is administered to a subject in a dose ranging from 20-60 micrograms. In another embodiment, the CTP-modified hGH polypeptide is administered to a subject in a dose ranging from 10-50 micrograms. In another embodiment, the CTP-modified hGH polypeptide is administered to a subject in a dose ranging from 40-80 micrograms. In another embodiment, the CTP-modified hGH polypeptide is administered to a subject in a dose ranging from 10-30 micrograms. In another embodiment, the CTP-modified hGH polypeptide is administered to a subject in a dose ranging from 30-60 micrograms.

In another embodiment, GH modified by CTPs is administered to a subject in a dose ranging from 0.2 mg to 2 mg. In another embodiment, the CTP-modified hGH polypeptide is administered to a subject in a dose ranging from 2 mg to 6 mg. In another embodiment, the CTP-modified hGH polypeptide is administered to a subject in a dose ranging from 4 mg to 10 mg. In another embodiment, the CTP-modified hGH polypeptide is administered to a subject in a dose ranging from 5 mg and 15 mg.

In another embodiment, the CTP-modified hGH polypeptide disclosed herein is injected into the muscle (intramuscular injection). In another embodiment, the CTP-modified hGH polypeptide is injected below the skin (subcutaneous injection). In another embodiment, the CTP-modified hGH polypeptide is injected into the muscle. In another embodiment, the CTP-modified hGH polypeptide is injected below the skin.

In another embodiment, the methods disclosed herein include increasing the compliance in the use of GH therapy, comprising providing to a subject in need thereof, a CTP-modified hGH polypeptide as disclosed herein, thereby increasing compliance in the use of GH therapy.

In another embodiment, protein drugs of molecular weight lower than 50,000 daltons, such as CTP-modified hGH polypeptides disclosed herein are in general short-lived species in vivo, having short circulatory half-lives of several hours. In another embodiment, the subcutaneous route of administration in general provides slower release into the circulation. In another embodiment, the CTP modified polypeptide disclosed herein prolongs the half-live of protein drugs of molecular weight lower than 50,000 daltons, such as GH.

In another embodiment, the immunogenicity of a CTP modified hGH is equal to an isolated GH. In another embodiment, the immunogenicity of a CTP modified hGH is comparable to an isolated GH. In another embodiment, modifying a GH as described herein with CTP peptides reduces the immunogenicity of the GH. In another embodiment, the CTP modified hGH is as active as an isolated GH protein. In another embodiment, the CTP modified hGH polypeptide is more active than an isolated GH. In another embodiment, the CTP modified hGH maximizes the GH's protective ability against degradation while minimizing reductions in bioactivity.

In another embodiment, the methods disclosed herein include increasing the compliance of subjects afflicted with chronic illnesses that are in need of a GH therapy. In another embodiment, the methods disclosed herein enable reduction in the dosing frequency of a GH by modifying the GH with CTPs as described hereinabove. In another embodiment, the term compliance comprises adherence. In another embodiment, the methods disclosed herein include increasing the compliance of patients in need of a GH therapy by reducing the frequency of administration of the GH. In another embodiment, reduction in the frequency of administration of the GH is achieved due to the CTP modifications which render the CTP-modified GH more stable. In another embodiment, reduction in the frequency of administration of the GH is achieved as a result of increasing T½ of the GH. In another embodiment, reduction in the frequency of administration of the GH is achieved as a result of increasing the clearance time of the GH. In another embodiment, reduction in the frequency of administration of the GH is achieved as a result of increasing the AUC measure of the GH.

In another embodiment, the CTP-modified hGH polypeptide disclosed herein is administered to a subject once a day. In another embodiment, the CTP-modified hGH polypeptide is administered to a subject once every two days. In another embodiment, the CTP-modified hGH polypeptide is administered to a subject once every three days. In another embodiment, the CTP-modified hGH polypeptide is administered to a subject once every four days. In another embodiment, the CTP-modified hGH polypeptide is administered to a subject once every five days. In another embodiment, the CTP-modified hGH polypeptide is administered to a subject once every six days. In another embodiment, the CTP-modified hGH polypeptide is administered to a subject once every week. In another embodiment, the CTP-modified hGH polypeptide is administered to a subject once every 7-14 days. In another embodiment, the CTP-modified hGH polypeptide is administered to a subject once every 10-20 days. In another embodiment, the CTP-modified hGH polypeptide is administered to a subject once every 5-15 days. In another embodiment, the CTP-modified hGH polypeptide is administered to a subject once every 15-30 days.

In another embodiment, the dosage is in a range of 50-500 mg/day. In another embodiment, the dosage is in a range of 50-150 mg/day. In another embodiment, the dosage is in a range of 100-200 mg/day. In another embodiment, the dosage is in a range of 150-250 mg/day. In another embodiment, the dosage is in a range of 200-300 mg/day. In another embodiment, the dosage is in a range of 250-400 mg/day. In another embodiment, the dosage is in a range of 300-500 mg/day. In another embodiment, the dosage is in a range of 350-500 mg/day.

In one embodiment, the dosage is 20 mg/day. In one embodiment, the dosage is 30 mg/day. In one embodiment, the dosage is 40 mg/day. In one embodiment, the dosage is 50 mg/day. In one embodiment, the dosage is 0.01 mg/day. In another embodiment, the dosage is 0.1 mg/day. In another embodiment, the dosage is 1 mg/day. In another embodiment, the dosage is 0.530 mg/day. In another embodiment, the dosage is 0.05 mg/day. In another embodiment, the dosage is 50 mg/day. In another embodiment, the dosage is 10 mg/day. In another embodiment, the dosage is 20-70 mg/day. In another embodiment, the dosage is 5 mg/day.

In another embodiment, the dosage is 1-90 mg/day. In another embodiment, the dosage is 1-90 mg/2 days. In another embodiment, the dosage is 1-90 mg/3 days. In another embodiment, the dosage is 1-90 mg/4 days. In another embodiment, the dosage is 1-90 mg/5 days. In another embodiment, the dosage is 1-90 mg/6 days. In another embodiment, the dosage is 1-90 mg/week. In another embodiment, the dosage is 1-90 mg/9 days. In another embodiment, the dosage is 1-90 mg/11 days. In another embodiment, the dosage is 1-90 mg/1 4 days.

In another embodiment, the CTP-modified hGH dosage is 10-50 mg/day. In another embodiment, the dosage is 10-50 mg/2 days. In another embodiment, the dosage is 10-50 mg/3 days. In another embodiment, the dosage is 10-50 mg/4 days. In another embodiment, the dosage is 10-50 micrograms mg/5 days. In another embodiment, the dosage is 10-50 mg/6 days. In another embodiment, the dosage is 10-50 mg/week. In another embodiment, the dosage is 10-50 mg/9 days. In another embodiment, the dosage is 10-50 mg/i 1 days. In another embodiment, the dosage is 10-50 mg/14 days.

Oral administration, in one embodiment, comprises a unit dosage form comprising tablets, capsules, lozenges, chewable tablets, suspensions, emulsions and the like. Such unit dosage forms comprise a safe and effective amount of the desired compound, or compounds, each of which is in one embodiment, from about 0.7 or 3.5 mg to about 280 mg/70 kg, or in another embodiment, about 0.5 or 10 mg to about 210 mg/70 kg. The pharmaceutically-acceptable carriers suitable for the preparation of unit dosage forms for peroral administration are well-known in the art. In some embodiments, tablets typically comprise conventional pharmaceutically-compatible adjuvants as inert diluents, such as calcium carbonate, sodium carbonate, mannitol, lactose and cellulose; binders such as starch, gelatin and sucrose; disintegrants such as starch, alginic acid and croscarmelose; lubricants such as magnesium stearate, stearic acid and talc. In one embodiment, glidants such as silicon dioxide can be used to improve flow characteristics of the powder-mixture. In one embodiment, coloring agents, such as the FD&C dyes, can be added for appearance. Sweeteners and flavoring agents, such as aspartame, saccharin, menthol, peppermint, and fruit flavors, are useful adjuvants for chewable tablets. Capsules typically comprise one or more solid diluents disclosed above. In some embodiments, the selection of carrier components depends on secondary considerations like taste, cost, and shelf stability, which are not critical for the purposes disclosed herein, and can be readily made by a person skilled in the art.

In one embodiment, the oral dosage form comprises predefined release profile. In one embodiment, the oral dosage form disclosed herein comprises an extended release tablets, capsules, lozenges or chewable tablets. In one embodiment, the oral dosage form disclosed herein comprises a slow release tablets, capsules, lozenges or chewable tablets. In one embodiment, the oral dosage form disclosed herein comprises an immediate release tablets, capsules, lozenges or chewable tablets. In one embodiment, the oral dosage form is formulated according to the desired release profile of the pharmaceutical active ingredient as known to one skilled in the art.

Peroral compositions, in some embodiments, comprise liquid solutions, emulsions, suspensions, and the like. In some embodiments, pharmaceutically-acceptable carriers suitable for preparation of such compositions are well known in the art. In some embodiments, liquid oral compositions comprise from about 0.012% to about 0.933% of the desired compound or compounds, or in another embodiment, from about 0.033% to about 0.7%.

In some embodiments, compositions for use in the methods disclosed herein comprise solutions or emulsions, which in some embodiments are aqueous solutions or emulsions comprising a safe and effective amount of the compounds disclosed herein and optionally, other compounds, intended for topical intranasal administration. In some embodiments, h compositions comprise from about 0.01% to about 10.0% w/v of a subject compound, more preferably from about 0.1% to about 2.0, which is used for systemic delivery of the compounds by the intranasal route.

In another embodiment, the pharmaceutical compositions are administered by intravenous, intra-arterial, or intramuscular injection of a liquid preparation. In some embodiments, liquid formulations include solutions, suspensions, dispersions, emulsions, oils and the like. In one embodiment, the pharmaceutical compositions are administered intravenously, and are thus formulated in a form suitable for intravenous administration. In another embodiment, the pharmaceutical compositions are administered intra-arterially, and are thus formulated in a form suitable for intra-arterial administration. In another embodiment, the pharmaceutical compositions are administered intramuscularly, and are thus formulated in a form suitable for intramuscular administration.

In another embodiment, the pharmaceutical compositions are administered topically to body surfaces, and are thus formulated in a form suitable for topical administration. Suitable topical formulations include gels, ointments, creams, lotions, drops and the like. For topical administration, the compounds disclosed herein are combined with an additional appropriate therapeutic agent or agents, prepared and applied as solutions, suspensions, or emulsions in a physiologically acceptable diluent with or without a pharmaceutical carrier.

In one embodiment, pharmaceutical compositions disclosed herein are manufactured by processes well known in the art, e.g., by means of conventional mixing, dissolving, granulating, dragee-making, levigating, emulsifying, encapsulating, entrapping or lyophilizing processes.

In one embodiment, pharmaceutical compositions for use in accordance with the disclosure herein, is formulated in conventional manner using one or more physiologically acceptable carriers comprising excipients and auxiliaries, which facilitate processing of the active ingredients into preparations which, can be used pharmaceutically. In one embodiment, formulation is dependent upon the route of administration chosen.

In one embodiment, injectables, disclosed herein are formulated in aqueous solutions. In one embodiment, injectables, disclosed herein are formulated in physiologically compatible buffers such as Hank's solution, Ringer's solution, or physiological salt buffer. In some embodiments, for transmucosal administration, penetrants appropriate to the barrier to be permeated are used in the formulation. Such penetrants are generally known in the art.

In one embodiment, the preparations described herein are formulated for parenteral administration, e.g., by bolus injection or continuous infusion. In some embodiments, formulations for injection are presented in unit dosage form, e.g., in ampoules or in multidose containers with optionally, an added preservative. In some embodiments, compositions are suspensions, solutions or emulsions in oily or aqueous vehicles, and contain formulatory agents such as suspending, stabilizing and/or dispersing agents.

The compositions also comprise, in some embodiments, preservatives, such as benzalkonium chloride and thimerosal and the like; chelating agents, such as edetate sodium and others; buffers such as phosphate, citrate and acetate; tonicity agents such as sodium chloride, potassium chloride, glycerin, mannitol and others; antioxidants such as ascorbic acid, acetylcystine, sodium metabisulfote and others; aromatic agents; viscosity adjustors, such as polymers, including cellulose and derivatives thereof; and polyvinyl alcohol and acid and bases to adjust the pH of these aqueous compositions as needed. The compositions also comprise, in some embodiments, local anesthetics or other actives. The compositions can be used as sprays, mists, drops, and the like.

In some embodiments, pharmaceutical compositions for parenteral administration include aqueous solutions of the active preparation in water-soluble form. Additionally, suspensions of the active ingredients, in some embodiments, are prepared as appropriate oily or water based injection suspensions. Suitable lipophilic solvents or vehicles include, in some embodiments, fatty oils such as sesame oil, or synthetic fatty acid esters such as ethyl oleate, triglycerides or liposomes. Aqueous injection suspensions contain, in some embodiments, substances, which increase the viscosity of the suspension, such as sodium carboxymethyl cellulose, sorbitol or dextran. In another embodiment, the suspension also contains suitable stabilizers or agents which increase the solubility of the active ingredients to allow for the preparation of highly concentrated solutions.

In another embodiment, the active compound can be delivered in a vesicle, in particular a liposome (see Langer, *Science* 249:1527-1533 (1990); Treat et al., in Liposomes in the Therapy of Infectious Disease and Cancer, Lopez-Berestein and Fidler (eds.), Liss, New York, pp. 353-365 (1989); Lopez-Berestein, ibid., pp. 317-327; see generally ibid).

In another embodiment, the pharmaceutical composition delivered in a controlled release system is formulated for intravenous infusion, implantable osmotic pump, transdermal patch, liposomes, or other modes of administration. In one embodiment, a pump is used (see Langer, supra; Sefton, CRC Crit. Ref. *Biomed. Eng.* 14:201 (1987); Buchwald et al., Surgery 88:507 (1980); Saudek et al., *N. Engl. J. Med.* 321:574 (1989). In another embodiment, polymeric materials can be used. In yet another embodiment, a controlled release system can be placed in proximity to the therapeutic target, i.e., the brain, thus requiring only a fraction of the systemic dose (see, e.g., Goodson, in *Medical Applications of Controlled Release, supra, vol.* 2, pp. 115-138 (1984). Other controlled release systems are discussed in the review by Langer (*Science* 249:1527-1533 (1990).

In some embodiments, the active ingredient is in powder form for constitution with a suitable vehicle, e.g., sterile, pyrogen-free water based solution, before use. Compositions are formulated, in some embodiments, for atomization and inhalation administration. In another embodiment, compositions are contained in a container with attached atomizing means.

In one embodiment, the preparation disclosed herein is formulated in rectal compositions such as suppositories or retention enemas, using, e.g., conventional suppository bases such as cocoa butter or other glycerides.

In some embodiments, pharmaceutical compositions suitable for use in context disclosed herein include compositions wherein the active ingredients are contained in an amount effective to achieve the intended purpose. In some embodiments, a therapeutically effective amount means an amount of active ingredients effective to prevent, alleviate or ameliorate symptoms of disease or prolong the survival of the subject being treated.

In one embodiment, determination of a therapeutically effective amount is well within the capability of those skilled in the art.

The compositions also comprise preservatives, such as benzalkonium chloride and thimerosal and the like; chelating agents, such as edetate sodium and others; buffers such as phosphate, citrate and acetate; tonicity agents such as sodium chloride, potassium chloride, glycerin, mannitol and others; antioxidants such as ascorbic acid, acetylcystine, sodium metabisulfote and others; aromatic agents; viscosity adjustors, such as polymers, including cellulose and derivatives thereof; and polyvinyl alcohol and acid and bases to adjust the pH of these aqueous compositions as needed. The compositions also comprise local anesthetics or other actives. The compositions can be used as sprays, mists, drops, and the like.

Some examples of substances which can serve as pharmaceutically-acceptable carriers or components thereof are sugars, such as lactose, glucose and sucrose; starches, such as corn starch and potato starch; cellulose and its derivatives, such as sodium carboxymethyl cellulose, ethyl cellulose, and methyl cellulose; powdered tragacanth; malt; gelatin; talc; solid lubricants, such as stearic acid and magnesium stearate; calcium sulfate; vegetable oils, such as peanut oil, cottonseed oil, sesame oil, olive oil, corn oil and oil of theobroma; polyols such as propylene glycol, glycerine, sorbitol, mannitol, and polyethylene glycol; alginic acid; emulsifiers, such as the Tween™ brand emulsifiers; wetting agents, such sodium lauryl sulfate; coloring agents; flavoring agents; tableting agents, stabilizers; antioxidants; preservatives; pyrogen-free water; isotonic saline; and phosphate buffer solutions. The choice of a pharmaceutically-acceptable carrier to be used in conjunction with the compound is basically determined by the way the compound is to be administered. If the subject compound is to be injected, in one embodiment, the pharmaceutically-acceptable carrier is sterile, physiological saline, with a blood-compatible suspending agent, the pH of which has been adjusted to about 7.4.

In addition, the compositions further comprise binders (e.g. acacia, cornstarch, gelatin, carbomer, ethyl cellulose, guar gum, hydroxypropyl cellulose, hydroxypropyl methyl cellulose, povidone), disintegrating agents (e.g. cornstarch, potato starch, alginic acid, silicon dioxide, croscarmelose sodium, crospovidone, guar gum, sodium starch glycolate), buffers (e.g., Tris-HCl·, acetate, phosphate) of various pH and ionic strength, additives such as albumin or gelatin to prevent absorption to surfaces, detergents (e.g., Tween 20, Tween 80, Pluronic F68, bile acid salts), protease inhibitors, surfactants (e.g. sodium lauryl sulfate), permeation enhancers, solubilizing agents (e.g., glycerol, polyethylene glycerol), anti-oxidants (e.g., ascorbic acid, sodium metabisulfite, butylated hydroxyanisole), stabilizers (e.g. hydroxypropyl cellulose, hyroxypropylmethyl cellulose), viscosity increasing agents(e.g. carbomer, colloidal silicon dioxide, ethyl cellulose, guar gum), sweeteners (e.g. aspartame, citric acid), preservatives (e.g., Thimerosal, benzyl alcohol, parabens), lubricants (e.g. stearic acid, magnesium stearate, polyethylene glycol, sodium lauryl sulfate), flow-aids (e.g. colloidal silicon dioxide), plasticizers (e.g. diethyl phthalate, triethyl citrate), emulsifiers (e.g. carbomer, hydroxypropyl cellulose, sodium lauryl sulfate), polymer coatings (e.g., poloxamers or poloxamines), coating and film forming agents (e.g. ethyl cellulose, acrylates, polymethacrylates) and/or adjuvants.

Typical components of carriers for syrups, elixirs, emulsions and suspensions include ethanol, glycerol, propylene glycol, polyethylene glycol, liquid sucrose, sorbitol and water. For a suspension, typical suspending agents include methyl cellulose, sodium carboxymethyl cellulose, cellulose (e.g. Avicel™, RC-591), tragacanth and sodium alginate; typical wetting agents include lecithin and polyethylene oxide sorbitan (e.g. polysorbate 80). Typical preservatives include methyl paraben and sodium benzoate. In another embodiment, peroral liquid compositions also contain one or more components such as sweeteners, flavoring agents and colorants disclosed above.

The compositions also include incorporation of the active material into or onto particulate preparations of polymeric compounds such as polylactic acid, polglycolic acid, hydrogels, etc., or onto liposomes, microemulsions, micelles, unilamellar or multilamellar vesicles, erythrocyte ghosts, or spheroplasts. Such compositions will influence the physical state, solubility, stability, rate of in vivo release, and rate of in vivo clearance.

In another embodiment, compositions comprise particulate compositions coated with polymers (e.g. poloxamers or poloxamines) and the compound coupled to antibodies directed against tissue-specific receptors, ligands or antigens or coupled to ligands of tissue-specific receptors.

In some embodiments, compounds modified by the covalent attachment of water-soluble polymers such as polyethylene glycol, copolymers of polyethylene glycol and polypropylene glycol, carboxymethyl cellulose, dextran, polyvinyl alcohol, polyvinylpyrrolidone or polyproline. In another embodiment, the modified compounds exhibit substantially longer half-lives in blood following intravenous injection than do the corresponding unmodified compounds. In one embodiment, modifications also increase the compound's solubility in aqueous solution, eliminate aggregation, enhance the physical and chemical stability of the compound, and greatly reduce the immunogenicity and reactivity of the compound. In another embodiment, the desired in vivo biological activity is achieved by the administration of such polymer-compound abducts less frequently or in lower doses than with the unmodified compound.

In some embodiments, preparation of an effective amount or dose can be estimated initially from in vitro assays. In one embodiment, a dose can be formulated in animal models and such information can be used to more accurately determine useful doses in humans.

In one embodiment, toxicity and therapeutic efficacy of the active ingredients described herein can be determined by standard pharmaceutical procedures in vitro, in cell cultures or experimental animals. In one embodiment, the data obtained from these in vitro and cell culture assays and animal studies can be used in formulating a range of dosage for use in human. In one embodiment, the dosages vary depending upon the dosage form employed and the route of administration utilized. In one embodiment, the exact formulation, route of administration and dosage can be chosen by the individual physician in view of the patient's condition. [See e.g., Fingl, et al., (1975) "The Pharmacological Basis of Therapeutics", Ch. 1 p.1].

In one embodiment, depending on the severity and responsiveness of the condition to be treated, dosing can be of a single or a plurality of administrations, with course of treatment lasting from several days to several weeks or until cure is effected or diminution of the disease state is achieved.

In one embodiment, the amount of a composition to be administered will, of course, be dependent on the subject being treated, the severity of the affliction, the manner of administration, the judgment of the prescribing physician, etc.

In one embodiment, compositions including the preparation disclosed herein formulated in a compatible pharmaceutical carrier are also be prepared, placed in an appropriate container, and labeled for treatment of an indicated condition.

In another embodiment, the CTP-modified hGH polypeptide is administered via systemic administration. In another embodiment, a CTP-modified hGH described herein is administered by intravenous, intramuscular or subcutaneous injection. In another embodiment, the CTP-modified hGH polypeptide is lyophilized (i.e., freeze-dried) preparation in combination with complex organic excipients and stabilizers such as nonionic surface active agents (i.e., surfactants), various sugars, organic polyols and/or human serum albumin. In another embodiment, a pharmaceutical composition comprises a lyophilized GH modified by CTPs as described in sterile water for injection. In another embodiment, a pharmaceutical composition comprises a lyophilized CTP-modified hGH described herein in sterile PBS for injection. In another embodiment, a pharmaceutical composition comprises a lyophilized CTP-modified hGH described herein in sterile 0.9% NaCl for injection.

In another embodiment, the pharmaceutical composition comprising a GH modified by CTPs as described herein and complex carriers such as human serum albumin, polyols, sugars, and anionic surface active stabilizing agents. See, for example, WO 89/10756 (Hara et al.—containing polyol and p-hydroxybenzoate). In another embodiment, the pharmaceutical composition comprises a CTP-modified hGH as described herein and lactobionic acid and an acetate/glycine buffer. In another embodiment, the pharmaceutical composition comprises a lyophilized GH modified by CTPs as described herein and glycine or human serum albumin (HSA), a buffer (e g. acetate) and an isotonic agent (e.g NaCl). In another embodiment, the pharmaceutical composition comprises a lyophilized GH modified by CTPs as described herein and phosphate buffer, glycine and HSA.

In another embodiment, the pharmaceutical composition comprising a GH modified by CTPs as described herein is stabilized when placed in buffered solutions having a pH between about 4 and 7.2. In another embodiment, the pharmaceutical composition comprising a GH modified by CTPs as described herein is stabilized with an amino acid as a stabilizing agent and in some cases a salt (if the amino acid does not contain a charged side chain).

In another embodiment, the pharmaceutical composition comprising a GH modified by CTPs as described herein is a liquid composition comprising a stabilizing agent at between about 0.3% and 5% by weight which is an amino acid.

In another embodiment, the pharmaceutical composition comprising a GH modified by CTPs as described herein provides dosing accuracy and product safety. In another embodiment, the pharmaceutical composition comprising a GH modified by CTPs as described herein provides a biologically active, stable liquid formulation for use in injectable applications. In one embodiment, a composition disclosed herein comprises a non-viscous liquid formulation. In another embodiment, the pharmaceutical composition comprises a non-lyophilized GH modified by CTPs as described herein. #

In another embodiment, the pharmaceutical composition comprising a GH modified by CTPs as described herein provides a liquid formulation permitting storage for a long period of time in a liquid state facilitating storage and shipping prior to administration. #

In another embodiment, the pharmaceutical composition comprising a GH modified by CTPs as described herein comprises solid lipids as matrix material. In another embodiment, the injectable pharmaceutical composition comprising a GH modified by CTPs as described herein comprises solid lipids as matrix material. In another embodiment, the production of lipid microparticles by spray congealing was described by Speiser (Speiser and al., Pharm. Res. 8 (1991) 47-54) followed by lipid nanopellets for peroral administration (Speiser EP 0167825 (1990)). In another embodiment, lipids, which are used, are well tolerated by the body (e. g. glycerides composed of fatty acids which are present in the emulsions for parenteral nutrition).

In another embodiment, the pharmaceutical composition comprising a GH modified by CTPs as described herein is in the form of liposomes (J. E. Diederichs and al., Pharm./nd. 56 (1994) 267-275). #

In another embodiment, the pharmaceutical composition comprising a GH modified by CTPs as described herein comprises polymeric microparticles. In another embodiment, the injectable pharmaceutical composition comprising a GH modified by CTPs as described herein comprises polymeric microparticles. In another embodiment, the pharmaceutical composition comprising a GH modified by CTPs as described herein comprises nanoparticles. In another embodiment, the pharmaceutical composition comprising a GH modified by CTPs as described herein comprises liposomes. In another embodiment, the pharmaceutical composition comprising a GH modified by CTPs as described herein comprises lipid emulsion. In another embodiment, the pharmaceutical composition comprising a GH modified by CTPs as described herein comprises microspheres. In another embodiment, the pharmaceutical composition comprising a GH modified by CTPs as described herein comprises lipid nanoparticles. In another embodiment, the pharmaceutical composition comprising a GH modified by CTPs as described herein comprises lipid nanoparticles comprising amphiphilic lipids. In another embodiment, the pharmaceutical composition comprising a GH modified by CTPs as described herein comprises lipid nanoparticles comprising a drug, a lipid matrix and a surfactant. In another embodiment, the lipid matrix has a monoglyceride content which is at least 50% w/w. #

In one embodiment, compositions disclosed herein are presented in a pack or dispenser device, such as an FDA approved kit, which contain one or more unit dosage forms containing the active ingredient. In one embodiment, the pack, for example, comprise metal or plastic foil, such as a blister pack. In one embodiment, the pack or dispenser device is accompanied by instructions for administration. In one embodiment, the pack or dispenser is accommodated by a notice associated with the container in a form prescribed by a governmental agency regulating the manufacture, use or sale of pharmaceuticals, which notice is reflective of approval by the agency of the form of the compositions or human or veterinary administration. Such notice, in one embodiment, is labeling approved by the U.S. Food and Drug Administration for prescription drugs or of an approved product insert. #

In one embodiment, it will be appreciated that the GH modified by CTPs disclosed herein can be provided to the individual with additional active agents to achieve an improved therapeutic effect as compared to treatment with each agent by itself. In another embodiment, measures (e.g., dosing and selection of the complementary agent) are taken to minimize adverse side effects which are associated with combination therapies.

In another embodiment, disclosed herein a kit comprising the compositions, cells, plasmids, etc. disclosed herein, and an applicator, and instructional material that describes use of the methods disclosed herein. Although model kits are described below, the contents of other useful kits will be apparent to the skilled artisan in light of the present disclosure. Each of these kits represents a separate embodiment disclosed herein.

Additional objects, advantages, and novel features disclosed herein will become apparent to one ordinarily skilled in the art upon examination of the following examples, which are not intended to be limiting. Additionally, each of the various embodiments and aspects disclosed herein as delineated hereinabove and as claimed in the claims section below finds experimental support in the following examples.

EXAMPLES

Example 1

Production of hGH Constructs

Expression of MOD-4023 (CTP-hGH-CTP-CTP)

Cell transfection (nucleofection): Stable expression was achieved by integration of the MOD-4023 gene into the target cell's chromosome: Initially the gene was introduced into the cell, subsequently into the nucleus and finally it was integrated into chromosomal DNA. After gene transfer, cells were cultivated in medium containing a selection marker such as dihydrofolate reductase (DHFR). Briefly:

The murine dihydrofolate reductase (dhfr) gene from pSV2-dhfr plasmid was subcloned into the neomycin site on pCI-neo plasmid. To create a modified expression vector, pCI-dhfr (FIG. 2). Accordingly, the MOD-4023 expression vector contains a cytomegalovirus (CMV) IE (immediate-early) enhancer/promoter and the dhfr gene for cell selection. The MOD-4023 gene includes one copy of the coding sequence for C-terminal peptide (CTP) preceding the 5' end of the hGH gene, and two copies of the CTP coding sequence immediately following the 3' end of the hGH gene. The MOD-4023 gene was subcloned into the open reading frame of pCI-dhfr (FIG. 2). Therefore, the MOD-4023 expression cassette is composed of the CMV promoter, the CTP-hGH-CTP-CTP gene sequence, and the SV40 polyadenylation sequence.

Clone Selection—Limiting Dilution of single cell by plating in 96-well plates. The selection was applied to the single cell culture and may be repeated several times to obtain 100% clonal purity. Highest producing clone, based on growth curve, clone characterization, specific productivity and protein profile, were propagated in 1 L Shake flask prior to inoculation in bioreactor. Briefly:

The MOD-4023 protein-producing cell line was manufactured by recombinant DNA technology. Animal component-free media was used throughout the derivation of the Master and Working Cell Banks (MCB; WCB). Transfection of dhfr-negative CD DG44 cells (CHO cells), which were adapted to protein-free medium and suspension growth, was carried out using FuGENE-6 (Roche Applied Science). Stable clones were isolated by limiting dilution steps in cell culture. The highest producing clones were amplified with increasing concentrations of methotrexate (MTX). Based on clone population doubling level (PDL), MOD-4023 productivity (picogram per cell per day, PCD), and maximum attained cell density in the selected medium, the highest producing clones were isolated and used to prepare the R&D banks followed by manufacturing of a qualified Master Cell Bank (MCB) and Working Cell Bank (WCB).

Upstream Process

The upstream process of MOD-4023 consisted of 2 types of medium formulations; growth medium (Medium 1) and production medium (Medium 2). Medium 1 included methotrexate (MTX) and Medium 2 was identical to Medium 1 excluding MTX. Medium 1 was used for the cell culture propagation (Step 1-4 of FIG. 3) prior to seeding in 200 Liter bioreactor and Medium 2 was used in N-2 steps (two propagations prior to the final product. N refers to the final product), a 200 Liter bioreactor (Steps 5-6 of FIG. 3) and production bioreactor 1000 Liter (Step 7 of FIG. 3).

Manufacturing Process: MOD-4023

Clone #28 was manufactured at a 1000-Liter (L) scale in serum-free culture medium. The culture of the CHO cell line was expanded in several steps from a single vial of the working cell bank (WCB) to the final production culture volume. The production cell culture supernatant was tested for bioburden, bacterial endotoxin, productivity and adventitious virus. The process was performed using a 50 Liter and 200 Liter seeding bioreactors and a 1000-L bioreactor for scaling up. All product contact surfaces are disposable, while non-disposable product contact equipment are product dedicated. These pieces of equipment were cleaned and sanitized between batches. The culture is expanded to 50-L and 200-L seeding bioreactors prior to inoculation in a 1000-L bioreactor for upscaling. Final scale-up and fed-batch bioreactor production was performed in disposable bioreactors 1000 L. Removal of the cells was accomplished using a disposable filter system (Millipore depth filter).

One or two vials of the WCB were thawed at 37° C. The cells were centrifuged at and the cell pellet was resuspended to a target concentration with 10 mL fresh Media low volume shake flask and incubated at 37±0.5° C., 5±1% $CO_2$. After the 2nd subcultivation the cell culture with the higher viability was further expanded; the other cell culture was discarded. Four sub-cultivation steps in shake flask with increasing volumes were conducted with pre-defined step parameters such as seeding concentration and working volume. Volumes followed by two seeding bioreactor steps for a typical 1000 L bioreactor run.

The 50 Liter and 200 Liter seed bioreactors were used as seeding bioreactor. Prior to inoculation the 200 L bioreactor was filled with approx. 50 L PowerCHO 2CD Medium 2 (w/o MTX). The process control was set to the parameters as follows: pH 7, Temperature 37-C, DO 50%. These parameters apply to the medium pre-conditioning and to the seed train cultivation process.

When the process parameters were controlled within their pre-defined ranges the inoculum transfer was started. During cell mass expansion in the 50 L and 200 L seed bioreactor no feed addition was applied to the process. The expected cultivation time in the seed bioreactor was 3 to 4 days before cells are transferred into the 1000 L production bioreactor. Samples for in process control (IPC) were taken on a daily basis.

Figure 3:
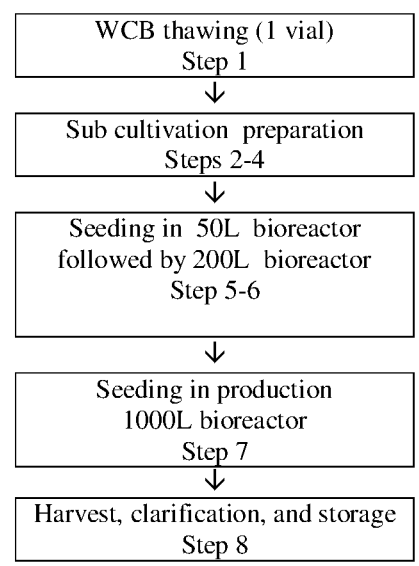
FIG. 3. Shows upstream process flow production chart of CTP-modified polypeptides, for example MOD-4023.

Cell Propagation in Production 1000 L Bioreactor (Step 7 of FIG. 3)

The culture is incubated in the bioreactor for 11 days (dependent on the viability of the cells) at 37° C., 20% dissolved oxygen (DO) and pH 7.2. On Day 3 the pH is shifted to 6.9 until the harvest. On day 4, Feed (Power Feed A without Lipids) is added. Feed volume is equal to 33% of the final bioreactor volume. On day 6, DMSO is added to the bioreactor. Glucose feed solution was added to the culture in order to maintain a desired concentration and a bolus of 1M of Sodium Bicarbonate was added in order to maintain a desired culture concentration ($HCO_3$). The harvest was performed using predefined criteria. During the first four days, the cell culture was sampled daily for cell count, viability and metabolic analysis. From day 5, the culture was sampled twice-daily for cell count, viability and metabolic analysis and from Day 9 also for specific productivity by Reverse-Phase HPLC. Productivity of MOD-4023 was at least 500 gr/L with the high glycosylated form consist of at least 70% of the total hGH-CTP protein in the harvest.

The example presented herein shows manufacturing using a fedbatch mode but one skilled in the art could develop a perfusion mode using in general, similar purification scheme. Alternatively, one skilled in the art could develop a perfusion method wherein duration of incubation could be even up to 7-120 days.

Cell Harvest and Storage (Step 8 of FIG. 3)

The harvest was performed using a disposable filtration process train. To clarify the harvest a depth filtration and 0.2 µm filtration was performed. The clarification was followed by a 0.45/0.2 µm filtration. The depth filters were flushed and the residual liquid was blown out of the system with air. Filtration process was run with a pump speed of ≤15 L/min and a maximal defined pressure. Afterwards the filters were washed with Tris-HCl buffer and blown out with pressurized air to increase the product recovery.

The clarified harvest was tested for bioburden, bacterial endotoxin, specific protein content by RP-HPLC, SDS-PAGE, Western Blot, HPC Elisa assay, residual DNA, In vitro virus assay, Virus-like particles, S+L- and *Mycoplasma*.

Purification Process

Figure 4:
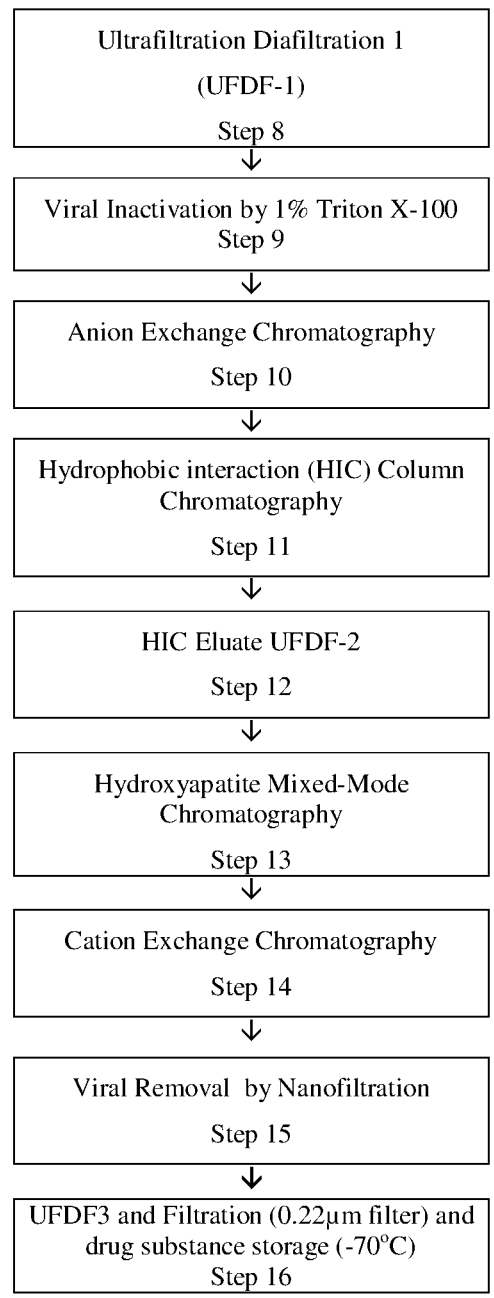
FIG. 4. Presents a flow chart of the purification process of CTP modified polypeptides, for example MOD-4023.

Purification scheme is described in FIG. 4.

Ultrafiltration and Diafiltration 1—UFDF1 (Step 8)

The Clarified Harvest was concentrated and diafiltered using a hollow fiber cartridge, or equivalent TFF based UFDF step. The cartridge nominal molecular weight cutoff size was 10,000 kDa. The concentrated and diafiltered harvest was tested for specific protein content by RP-HPLC and HCP Elisa.

Viral Inactivation by Incubation with 1% Triton-X100 (Step 9)

The material was filtered through a Millipore 1.55 m2 filter followed by a sterile Sartopore 2 XLG 10" filter into a sterile mixing bag (depth filtration step). Next, Tris/10% Triton solution was added to the final filtrate volume bringing the Triton concentration to 1% (w/w). After incubation, before loading on DEAE column, the product solution was filtered with a 0.2 µm filter unit.

DEAE-Sepharose Fast Flow Chromatography (Step 10)

A DEAE column packed with DEAE Sepharose resin was used for this step. The column was packed in a pre-defined bed height. The specific protein in the load was determined prior to the addition of Triton due to the interference caused by the Triton in the assay. The DEAE column was equilibrated and loaded with the viral inactivated pool and then washed with. A second wash was conducted with and the material was eluted with 20 mM Tris-HCl/150 mM NaCl pH 8.2 and then stored at ambient temperature (18-26° C.) for processing the next day or at 2-8° C. for longer time. All chromatography steps were conducted in down flow mode. Alternatively, steps could have been run in an upflow mode. The eluate was tested for specific protein by RP-HPLC (Target: main peak elutes as single peak), HCP Elisa, SDS-PAGE, Western Blot and residual DNA.

Phenyl Hydrophobic Interaction Chromatography (HIC) Column Chromatography (Step 11)

A HIC Phenyl Resin was used for this step. The column is packed column in a pre-defined bed height. The HIC chromatography was performed in 1-5 cycles depending on product quantity. Alternatively, up to 10 cycles could have been run. The HIC load was prepared by adjusting the DEAE eluate with Ammonium Sulfate. The column was equilibrated and loaded with the adjusted and 0.2 µm filtered DEAE eluate and then washed with 10 mM Sodium Phosphate/600 mM Ammonium Sulfate containing Propylene Glycol, pH 7.3. The material was eluted with reduced concentration of Ammonium Sulfate and increased concentration of Propylene Glycol, pH 7.3 and then stored at 2-8° C. until further processing.

HIC Eluate Ultrafiltration and Diafiltration 2 (Step 12)

The HIC eluate was concentrated and diafiltered into 10 mM Sodium Phosphate pH 6.8 buffer to reduce the volume and prepare the material for the CHT Column Step. The cartridge equilibrated with 10 mM Sodium Phosphate pH 6.8. The HIC eluate was concentrated and then diafiltered against Sodium Phosphate buffer to achieve a pH of 6.8±0.1 and a conductivity that was within 10% of the conductivity of the diafiltration buffer. Once the pH and conductivity were determined to be in range, the system was drained and 0.45/0.2 µm filtered to a sterile bag. The final volume of concentrated, diafiltered HIC eluate was stored at ambient room temperature (18-26° C.) overnight. The retentate was tested for bioburden, bacterial endotoxin and specific protein by $A_{280}$.

Ceramic Hydroxyapatite (CHT) Mixed-Mode Chromatography (Step 13)

A CHT column packed with Hydroxyapatite resin was used for this step. The column was packed column in a pre-defined bed height. The column was equilibrated with Sodium Phosphate, pH 6.8 and loaded with the concentrated and diafiltrated HIC eluate and washed with 4 column volumes (CV) of Sodium Phosphate, pH 6.8. The flow-through and wash material are collected and held overnight at ambient temperature (18-26° C.) until further processing.

SP-Sepharose Chromatography (Step 14)

A column packed with SP Sepharose Resin was used for this step. The column was packed column in a pre-defined bed height. The SP load was prepared by adjusting the CHT Flow through fraction to pH 5.0-6.0 with Citric Acid. Following the pH adjustment the solution was loaded onto the column followed by a wash step. The flow-through was collected for further processing. The pH was adjusted to pH 6.0-6.5 with 0.1M Sodium Hydroxide and the material was filtered through a 0.45/0.2 µm filter. The material was stored at ambient temperature (18-26° C.) overnight or at 2-8° C. for up to 24 hours. All chromatography steps were done in downflow mode.

Viral Inactivation by Nanofiltration (Step 15)

The Viral Filtration was performed using an Asahi Planova 20N Virus filter. A Sartopore 2 filter with a 0.45/0.2 µm or 0.1 µm membrane was used as prefilter of the nanofilter. The Virus filter was pre-equilibrated and primed with the final formulation made with WFI. The adjusted SP-Flow-Through was passed through the filter train at a continuous pressure and collected in a sterile bioprocess bag. The filter train was flushed with formulation buffer to maximize product recovery. The filter was integrity tested pre and post use per the manufacturer's recommended procedures. The Post use test includes a gold-particle test, also per the manufacturer's procedure.

UFDF3 and Filtration and Storage of the Drug Substance (Step 16)

The Viral Filtrate was concentrated to a target final DS concentration (which can vary from 5-100 mg/ml) in preparation for the Bulk Filtration and Fill. A single used or reusable cassette was used for this step with a cut-off of 3-30 KDa. The product was concentrated in a first step to 5-25 mg/ml and diafiltrated to 10 mM Citrate, 147 mM NaCl pH 6.4 (≥7 DF volumes). Alternatively, the product was concentrated in a first step to 5-25 mg/ml and diafiltrated to 10 mM Citrate histidine buffer including preservatives to support repeated dosing by a device, specifically 0.3% m-cresol, also P-188 was added at 0.2% to reduce aggregates and sub visible particles. A final product concentration was adjusted and filtered with a Millipak 100 filter. The filtrated product solutions were aliquoted and frozen at a temperature of −70±5° C.

MOD-4023 Drug Product Manufacturing

Figure 5:
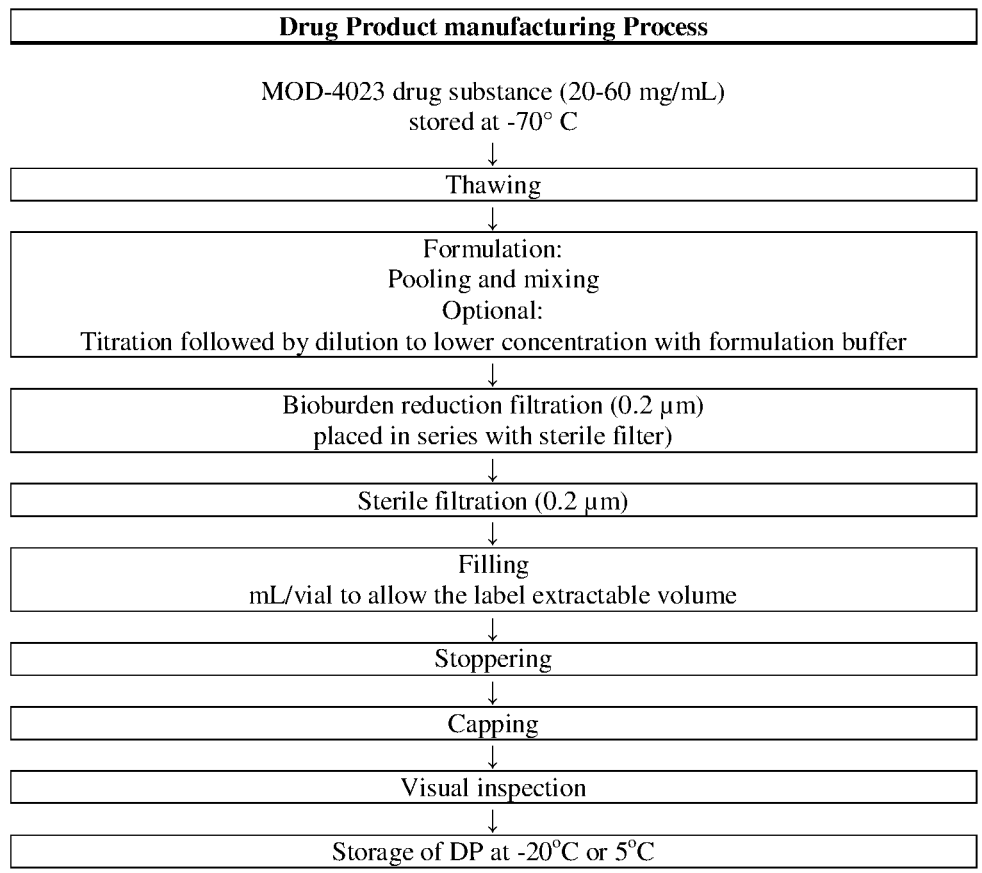
FIG. 5. Presents a flow chart overview of the MOD-4023 drug product (DP) manufacturing process.

The formulation of the drug product (DP) process starts with the thawing of MOD-4023 DS. Drug Product was achieved by dilution of the Drug Substance (DS) to the required concentration using the formulation buffer, aseptic filtration and filling in standard 2R vials or other primary packaging such as cartridges or pre-filled syringes. Description of the specific process is depicted in FIG. 5.

Characterization of MOD-4023

Figure 6:
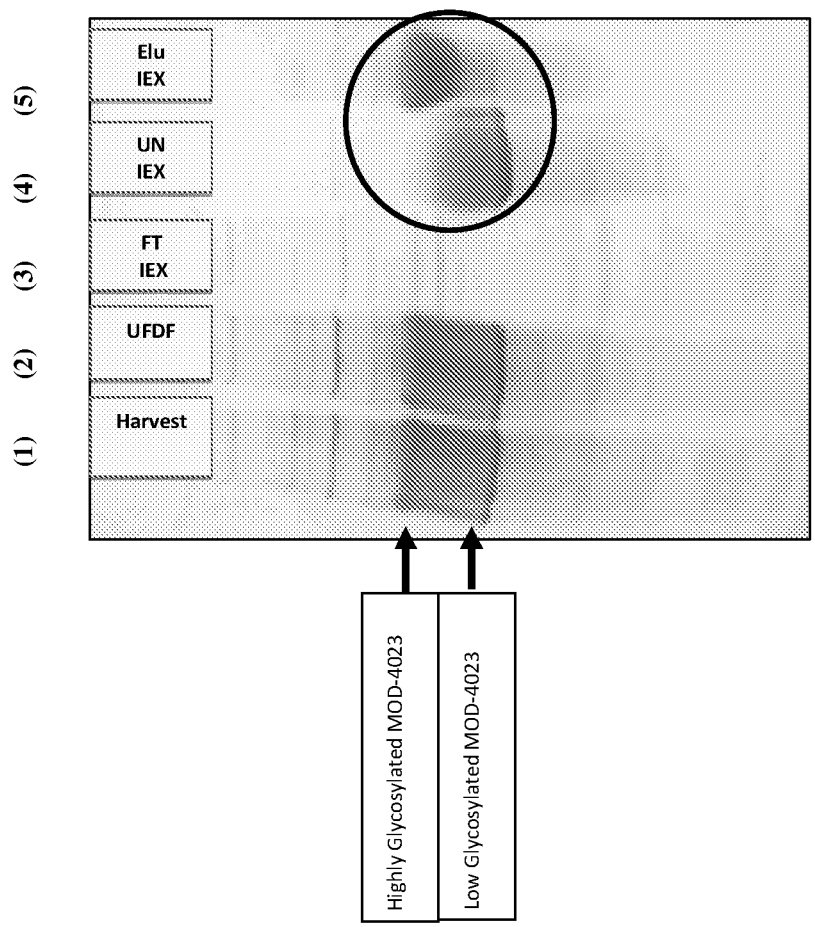
FIG. 6. Presents a Coomassie stained SDS-PAGE showing purification of MOD-4023 high glycosylated forms by the first ion exchange chromatography (IEX) column. Lane (1) Harvest total protein, step 8 of FIG. 3; Lane (2) Ultra-filtration/Diafiltration, step 1 of FIG. 4 (UFDF1) concentrated and diafiltered total protein; Lane (3) IEX flow through, step 3 of FIG. 4; Lane (4) IEX wash material, step 3 of FIG. 4; and Lane (5) IEX Elution, step 3 of FIG. 4.

MOD-4023 content in the harvest and the percentage of the high glycosylated forms were determined by a specific RP-HPLC method. Total protein in the harvest was determined by Bradford analysis. The specific MOD-4023 protein percentage in the harvest produced by Clone #28 was above 70% relative to the total protein in the harvest. This unique high level of specific protein can also be observed by the strong intensity of the high and low glycosylated MOD-4023 bands as compared to the intensity of the additional host cell proteins bands in the harvest and UFDF samples analyzed by SDS-PAGE Coomassie stain (FIG. 6). In addition, the MOD-4023 manufacturing upstream process was developed to enable high percentage of the highly glycosylated MOD-4023 protein compared to the low glycosylated form. The highly glycosylated form is the target MOD-4023 form, as it results longer extension of the GH half-life.

O-Glycan Content

Glycoprofiling was performed by releasing MOD-4023 glycans followed glycan labeling with 2-aminobenzamide (2AB), cleaned up and analyzed by NP-HPLC. Briefly O-glycan content assay was conducted to calculate the number of O-glycans mol per mol of MOD-4023 protein. The terminal galactose units of the O-glycans were enzymatically cleaved from the protein by β-galactosidase. These free galactose units were separated on a CarboPac PA20-column and detected with pulsed amperometry. Galactose (Gal) was quantified using external calibration with a galactose reference standard. The content of galactose can be directly related to the content of O-glycan structure, Gal-GalNAc. Sialic acid (SA) content is measured in the drug substance (DS) and should not be different from the SA content of the final drug product (DP). Both the DS and the DP may be used to show levels of SA and O-glycan occupancy of the CTP-modified hGH. Analysis of 5 different MOD-4023 drug substance and drug product batches depict in FIG. 7 demonstrate a robust batch to batch consistency. This unexpected robust glycosylation content is significant, showing that the number of O-glycans per CTP in CTP-hGH-CTP-CTP was improved over that known in the art. The CTP-hGH-CTP-CTP manufactured herein had 4-6 O-glycans per CTP, in comparison with levels known in the art, wherein hCG has only 4 O-glycans.

Intact Molecular Weight Analysis of MOD-4023 Samples

Molecular weight analysis of 4 different MOD-4023 DS batches was performed with the aim to obtain information on the number of O-linked glycosylation sites. (See detailed results in Example 3.) Intact MOD-4023 samples, as well as, de-sialylated MOD-4023 samples using Neuramnidase, and de-O-glycosylated samples using O-glycosidase, were analyzed by on-line LC/ES-MS. Data obtained from intact mass measurement of the de-sialylated samples suggested the protein being modified with 12-18 glycosylation sites of GalNac-Gal, with the protein modified with 15 glycosylation sites being the most intense. This result showing a high % of serine occupancy was unexpected in comparison with levels known in the art (only 4 serines glycosylated compared with up to 6 in the CTP-modified hGH manufactured herein.

O-Linked Glycosylation Site Occupancy of MOD-4023 Protein Samples

Figure 8:
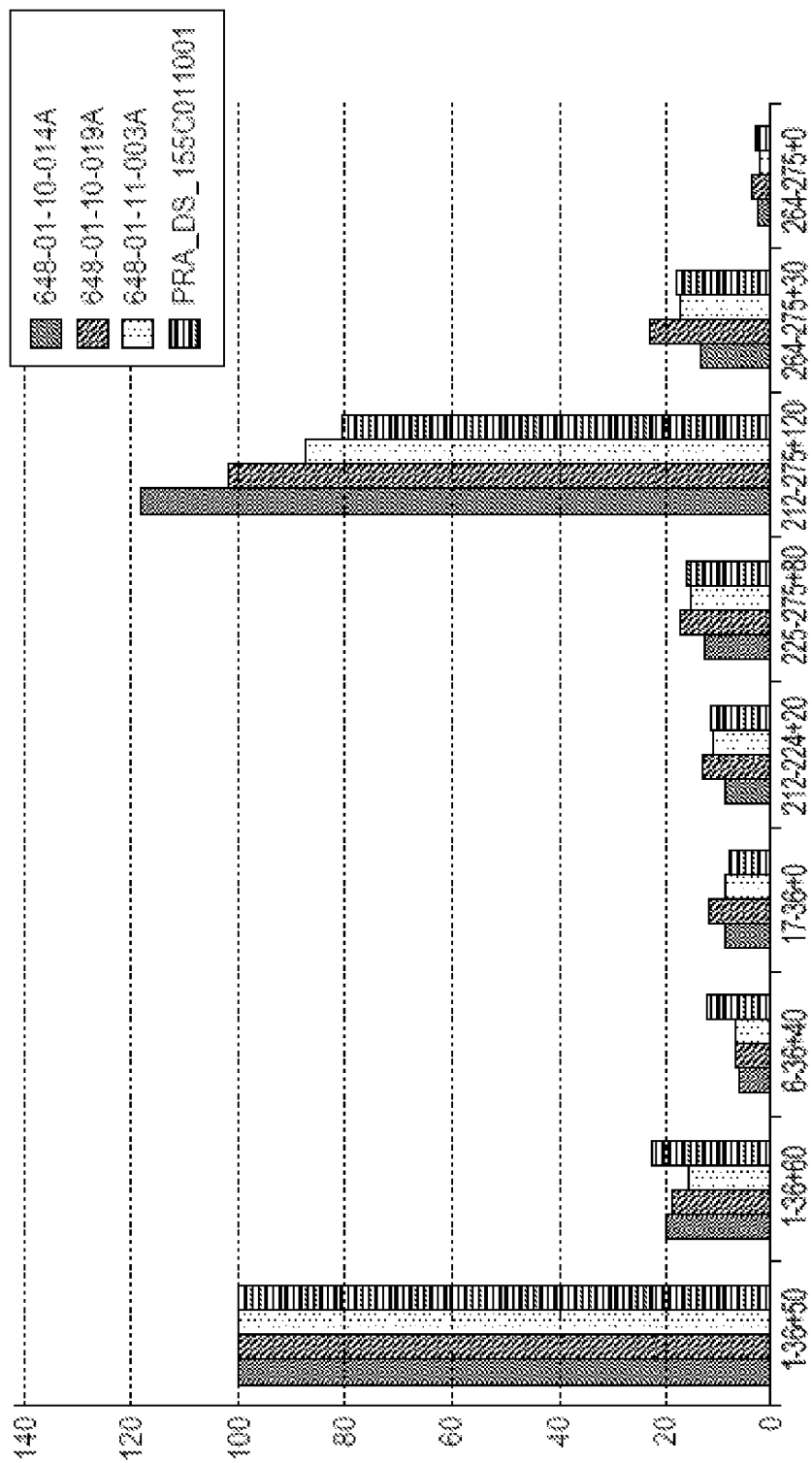
FIG. 8. Presents a batch to batch comparison between individual O-glycosylated peptides based on mass spectrometry (MS) response. Column annotations are amino acid sequences with "O" as an abbreviation for O-linked glycan. The MS response of the first peptide was used for data normalization and set to 100%.

O-glycosylation site occupancy of 4 different MOD-4023 DS batches was performed at M-scan with the aim to obtain information on the number of O-linked glycosylation sites per MOD-4023 molecule. MOD-4023 samples were de-sialylated using Neuramnidase followed by tryptic digestion of reduced/carboxymethylaed MOD-4023 samples. Finally an on line LC/ES-MS was carried out for the treated samples and interpretation of the MS data was conducted using a designated software. Evaluation of the data obtained from analysis of the tryptic digest mixtures led to signals allowing 100% of the protein sequence being mapped. O-glycosylation takes place on both the N-terminal and C-terminal CTP region. Sites of occupancy were identified as serine residues following proline as well as two of the four serines in the regions of serine repeats. A total of up to 18 serine residues may serve as attachment sites for O-glycans. No significant differences between the batches were detected as presented in FIG. 8.

O-linked glycosylation site occupancy of MOD-4023 protein samples MOD-4023 (SEQ ID NO: 7) contains one CTP at the N-terminus and two CTP in tandem at the C-terminus. O-linked glycosylation analysis showed that each CTP contained 4-6 O-linked glycans—all linked to Serine (S) residues. Overall, there were 12-18 O-linked sugar chains per MOD-4023 with the most abundant form containing 15 O-glycans per MOD-4023. (See results and conclusions of Examples 2 and 3 below) No sugar chains were present on the GH sequence.

Using SEQ ID NO: 7 amino acid sequence as a guide, results of site occupancy analysis showed that O-glycosylation took place on each CTP at serine residues at positions 10, 13, 15, 21 of the CTP unit, which corresponds to positions 229, 232, 234, 240 on the second CTP sequence and 257, 260,262 and 268 for the third CTP sequence. Two additional sites of O-glycosylation occupancy were identified, occurring on serine residues Ser1 to Ser 4 of the N-terminal CTP (corresponding to positions 220-223 on the second CTP sequence and 248-251 for the third CTP sequence). However it could not be determined via mass spectrometry which two of the four Serine residues were modified. Details of O-glycan occupancy and structure are provided in Example 2 below.

O-Glycan Structures #

Figure 15A:
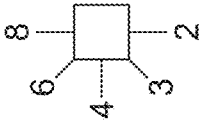

The major O glycan peak corresponded to mono-sialylated core 1 (Neu5Acα2-3Galβ1-3GalNAc). Also, small amounts of neutral core 1 (Galβ1-3GalNAc), mono-sialylated core 1 (Neu5Acα2-6(Galβ1-3)GalNAc) and di-sialylated core 1 (Neu5Acα2-3Galβ1-3(Neu5Acα2-6)GalNAc) were observed. The major sialic acid in the sample was Neu5Ac (NANA). The structures of the O-linked glycans and sialic acid type are presented in FIGS. 15A and 15B, respectively.

MOD-4023 Purity

Figure 9:
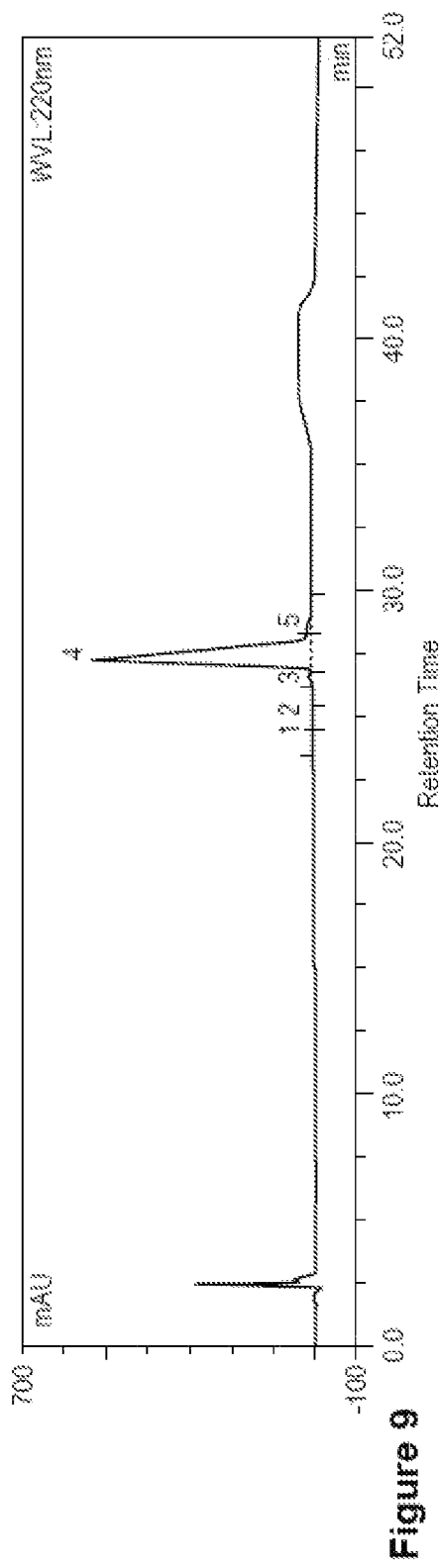
FIG. 9. Presents the reverse-phase high performance liquid chromatography (RP-HPLC) profile of MOD-4023. Peak 4 corresponds to the MOD-4023 main peak. Four minor related forms are also present (peaks 1, 2, 3 and 5).

RP-HPLC separates molecules according to their polarity. A mobile phase gradient from a more polar to a less polar solvent was used to elute molecules with a strong polarity earlier than less polar molecules. RP-HPLC separates MOD-4023 Drug Substance into a main peak, observed at 21.0 to 25.0 minutes, and minor peaks, representing product-related variants (FIG. 9). The related forms are separated from the native protein using UV detection at 220 nm. The relative peak areas (area %) of the related forms and the main peak can be calculated by integrating the corresponding peak areas. The main peak of MOD-4023 Drug Substance and Drug Product consists of more than 97% peak area, indicating a highly purified product and an effective purification process (see FIG. 21).

Figure 10:
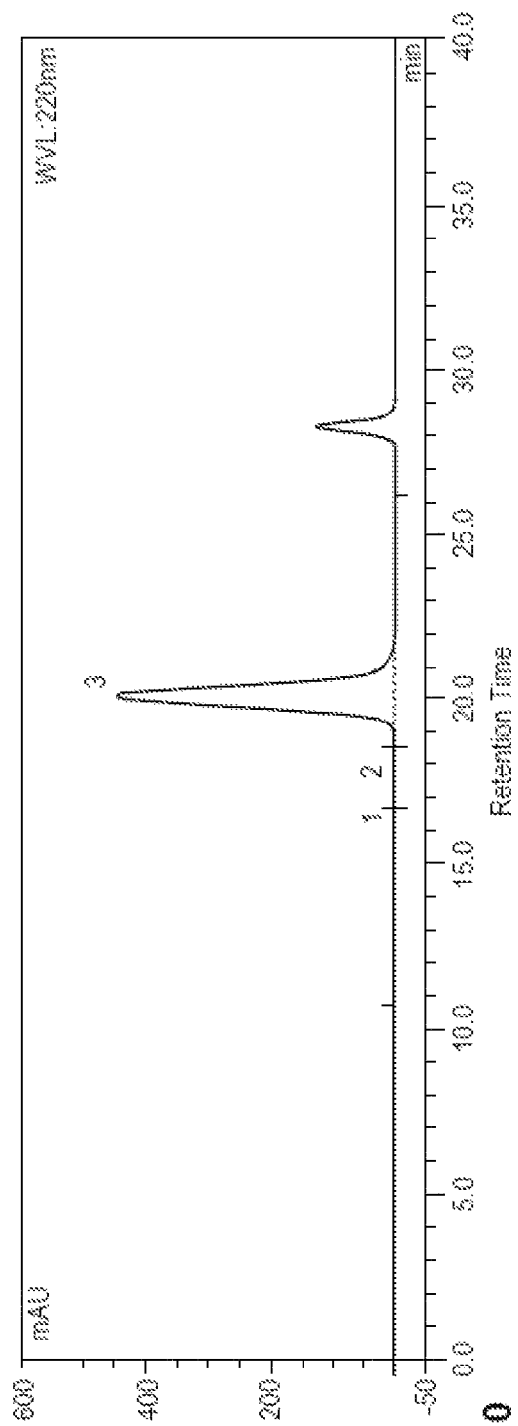
FIG. 10. Presents the size-exclusion high performance liquid chromatography (SEC-HPLC) profile of MOD-4023. Peak 3 corresponds to MOD-4023 monomers. Peaks 1 and 2 correspond to MOD-4023 dimers and polymers, respectively.

Size Exclusion HPLC is a chromatographic technique that separates molecules according to size. Within the fractionation range chosen, larger molecules elute earlier than smaller molecules. The separation mechanism is non-adsorptive and molecules are eluted under isocratic conditions. SEC enables monomers to be separated from higher molecular weight forms (such as dimers and polymers) of the target molecule. The SEC method was developed to analyze the content of MOD-4023 dimers and polymers in Drug Substance and Drug Product (FIG. 10). MOD-4023 monomer consists of more than 98% peak area, indicating a highly purified product and an effective purification process (see FIG. 22).

RP-HPLC Content Method

This method is being used for the MOD-4023 content determination of MOD-4023 intermediate samples and the determination of %-unglycosylated MOD-4023 in intermediate samples by reversed phase chromatography. The reversed phase-HPLC separates molecules due to their polarity. Relatively non-polar molecules, such as MOD-4023 ligate to the column material while charged and polar molecules are eluted without accomplishing an interaction with the column.

The ligated molecules were eluted with the aid of a gradient from a polar to a less polar solution. Molecules of the strongest polarity eluted first followed by the less polar molecules. The detection was carried out via absorption at 214 nm.

Figure 11:
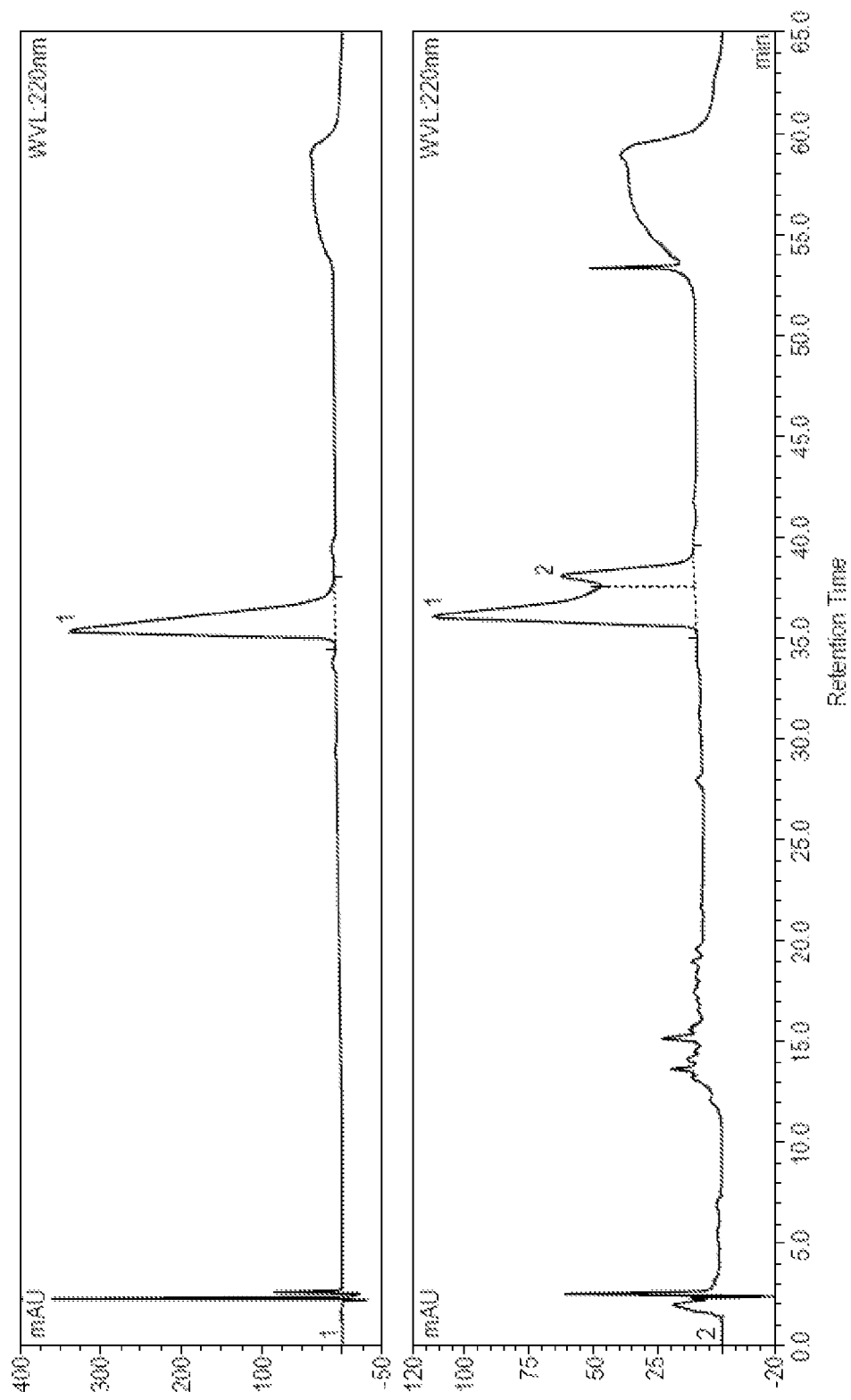
FIG. 11. Presents a comparison of a MOD-4023 reference standard SR-929SI.1 (upper profile) with MOD-4023 I15-PP (UFDF1 sample) (lower profile), as analyzed by RP-HPLC at 220 nm. Peak 1 corresponds to MOD-4023 glycosylated form and peak 2 corresponds to non-glycosylated form.
Figure 12:
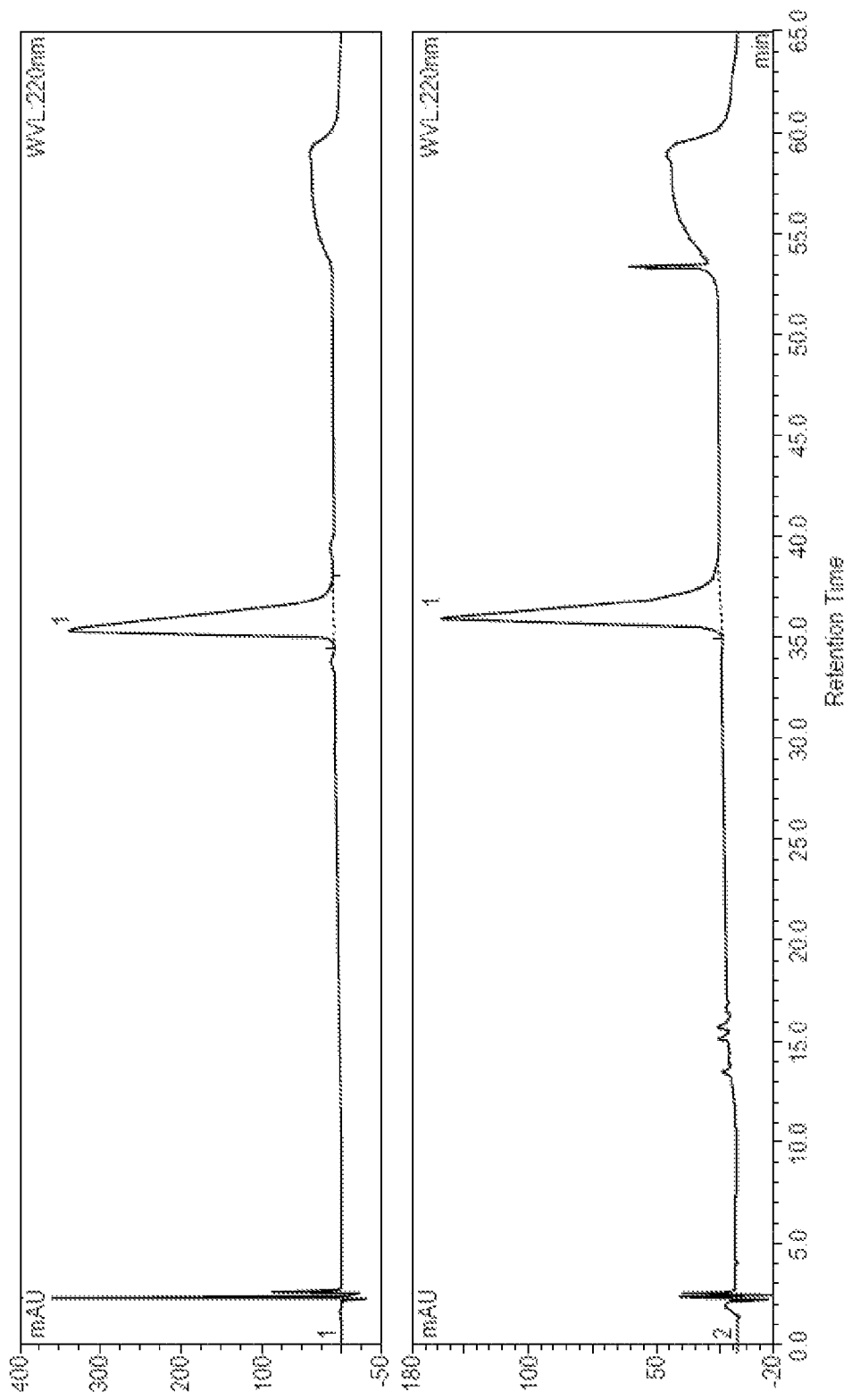
FIG. 12. Presents a comparison of a MOD-4023 reference standard SR-929SI.1 (upper profile) with MOD-4023 C10-PP (Elution DEAE Sepharose), as analyzed by RP-HPLC at 220 nm. At this point in the production process, only the glycosylated peak is observed in the MOD-4023 sample.

In the early stages of purification (UFDF1 sample) two peaks were observed. Peak 1 is the highly-glycosylated form of MOD-4023 and peak 2 is the low-glycosylated form (FIG. 11). The relative peak areas (area %) of the two peaks can be calculated by integrating the corresponding peak areas. The relative area of peak I is 75%. In the first step of purification, column DEAE Sepharose separates between these peaks and the elution fraction contains only MOD-4023 glycosylated form (100%), (FIG. 12).

MOD-4023 Potency

Figure 13:
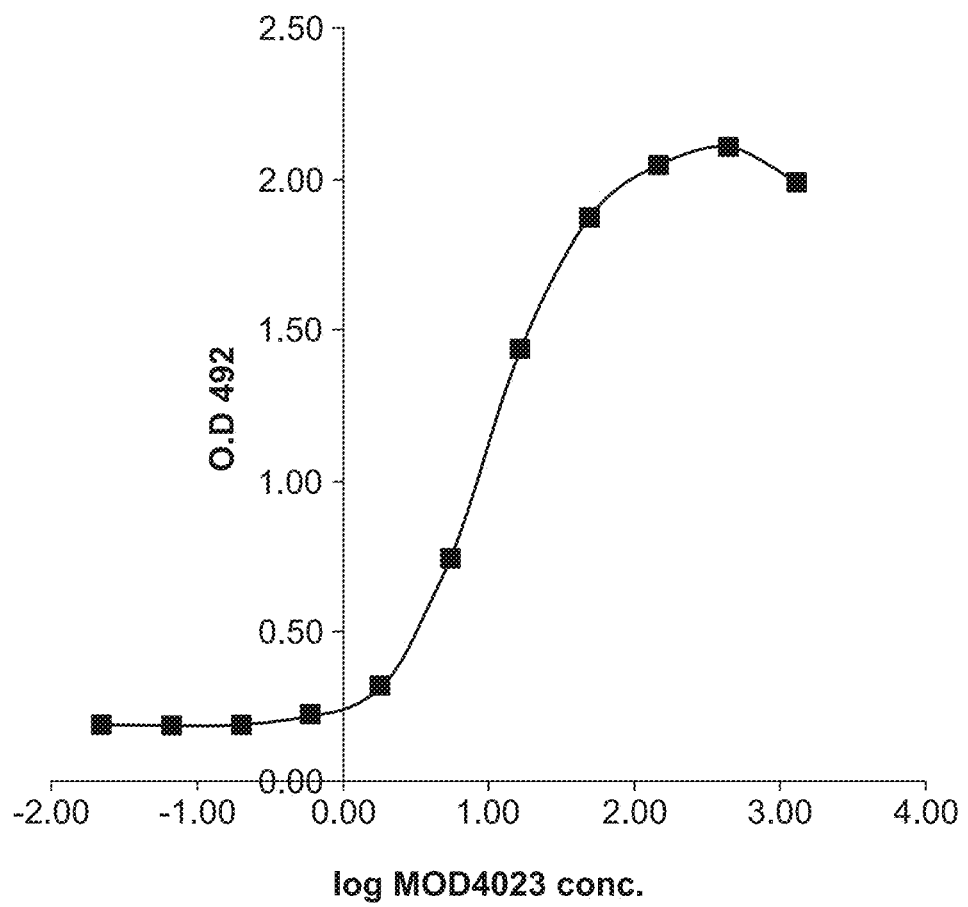
FIG. 13. Shows activation of hGH receptor by MOD-4023 in stably transfected cells. Typical dose response activation curve by MOD-4023. MOD-4023 activation of hGH receptors on Baf cells stably expressing the hGH receptor on their cell surface.

The activation of human growth receptor by MOD-4023 was characterized using Baf cells stably expressing hGH receptor. Cells underwent starvation in GH free media followed by washing step and re-suspended in assay buffer and transfered into 96-well plates (100 µl/well). During the cell incubation time at 37° C. for 30 min, MOD-4023 was added at increasing concentrations and cells were incubated overnight at 37° C. with 5% $CO_2$. The assay was terminated by adding 30 µl of CellTiter 96 Aqueous One Solution Reagent (MTS) to the culture wells. Three hours post MTS addition, the optical density (OD) of the culture wells was measured at 492 nm. The 492 nm absorbance is directly proportional to the number of living cells in the culture. MOD-4023 demonstrated a specific binding to the Baf-hGH cells in a typical dose-dependence curve (FIG. 13 and FIG. 23).

In addition, a Bio-identity test was performed in hypophysectomized rats in which MOD-4023 activity in all batches was not less than 2 United States Pharmacopeia (USP) Somatropin units per mg (FIG. 23).

Viral Clearance

The ability of the manufacturing process to address and mitigate contamination of final drug product with endogenous and adventitious virus has been the subject of a preliminary evaluation. A GLP-compliant study has been conducted according to applicable guidance for investigational products using three model viruses spiked into scaled down segments of the manufacturing process to quantify the ability of these steps to inactivate or clear the spiked virus population. With the amounts of virus expressed as log 10 Adjusted Titre, the log 10 clearance factor is determined simply by subtracting the value for output from the value for input. As log 10 numbers the clearance factors are additive to derive an overall clearance factor for all evaluated steps. The individual step clearance factors are calculated in FIG. 14. Viral safety evaluation studies were performed with Abelson Murine Leukemia Virus (A-MuLV), Minute Virus of Mice (MVM), Reovirus type 3 (Reo-3) and Pseudorabies Virus (PrV). Theoretical virus loads per dose were calculated on a maximum dose of 15 mg/dose. A-MuLV is considered to be a model virus representing possible presence of CHO retroviruses, the measures taken to inactivate and remove contaminating A-MuLV virus achieved clearance factor of at least antilog10, 22.74, suggesting that the overall MOD-4023 process has an exceptional capacity for viral removal.

Impurities

The results of analyses for a range of impurities present in the purified MOD-4023 protein are presented in FIG. 24. Less than or equal to 100 ng/mg (ppm) of host cell proteins (HCP) were found. The presence of DNA was less than or equal to 10 pg/mg (ppb). While residual methotrexate (MTX) levels was less than 50 ng/mL. Residual propylene glycol (PG) was less than or equal to 60 g/ml. Less than or equal to 2.5 pg/mL Triton was found. As well, less than or equal to 115 µg/mL insulin was present in the final purified MOD-4023 protein. Finally, less than 250 µg/mL DMSO was present in the purified MOD-4023 protein product. The results of a Bioburden analysis are also presented in FIG. 24 and show less than or equal to 10 cfu/10 mL present in the purified drug product.

Example 2

Glycosylation Site Occupancy of MOD-4023 Protein

Objective

The aim of the study was to provide information on glycosylation site occupancy of MOD-4023 protein (a glycoprotein with around 12 O-linked glycosylation sites).

Methods

De-Sialylation of MOD-4023 Using Neuraminidase

Mod-4023 samples were used having a concentration of approximately 21 mg/ml. Approximately 200 ug of sample were buffer exchanged into water and freeze dried. The dry sample we re-suspended in Neuraminidase and incubated at 37° C.

Tryptic Digestion of Reduced/Carboxymethylated MOD-4023 Protein

Following de-sialylation, approximately 200 µg of MOD-4023 were buffer exchanged into Tris/Guanidine hydrochloride buffer, reduced with dithiothreitol and carboxymethylated using iodoacetic acid. Samples were then buffer exchanged into ammonium bicarbonate buffer and digested with trypsin at 37° C.

On-Line Liquid Chromatography/Electrospray-Mass Spectrometry LC/ES-MS

On-line liquid chromatography/electrospray-mass spectrometry (LC/ES-MS) was carried out on an aliquot of the digested samples as received using a Jupiter Phenomenex column (C18, 5µ, 250×2.1 mm; Room Temp; wavelength of 214 nm; a flow-rate of 0.2 ml/minute). Solvent A was 0.05 mL formic acid in 1 L $H_2O$. Solvent B was 0.05 mL formic acid in 100 ml $H_2O$ plus 900 mL acetonitrile. The gradient presented below in Table I was used for the intact and reduced product.

TABLE 1

| Column Gradient | |
| --- | --- |
| Time (min) | % B |
| 0 | 2 |
| 10 | 10 |
| 50 | 60 |
| 60 | 90 |
| 70 | 90 |
| 70.1 | 2 |
| 80 | 2 |

Ionization was enhanced by the use of a nitrogen drying gas and raised source temperature. Slightly increased cone voltage was applied to facilitate in source fragmentation. The mass range scan was m/z 200 to m/z 2000.

Data Interpretation

Interpretation of the mass spectrometry data was aided by the use of General Protein/Mass Analysis for Windows (GPMAW) software (Lighthouse data) in conjunction with the protein sequence of CTP-modified hGH (SEQ ID NO: 7), wherein the sequences expected to be O-glycosylated are those present in the CTP units.

Results

Evaluation of the data led to complete mapping of the sequence of MOD-4023 protein between amino acids 37 and 224 of SEQ ID NO: 7, though the complete sequence of SEQ ID NO: 7 was analyzed.

LC-ES-MS of a Tryptic Digest Mixture of De-Sialylated, Reduced and Carboxymethylated MOD-4023

Figure 16:
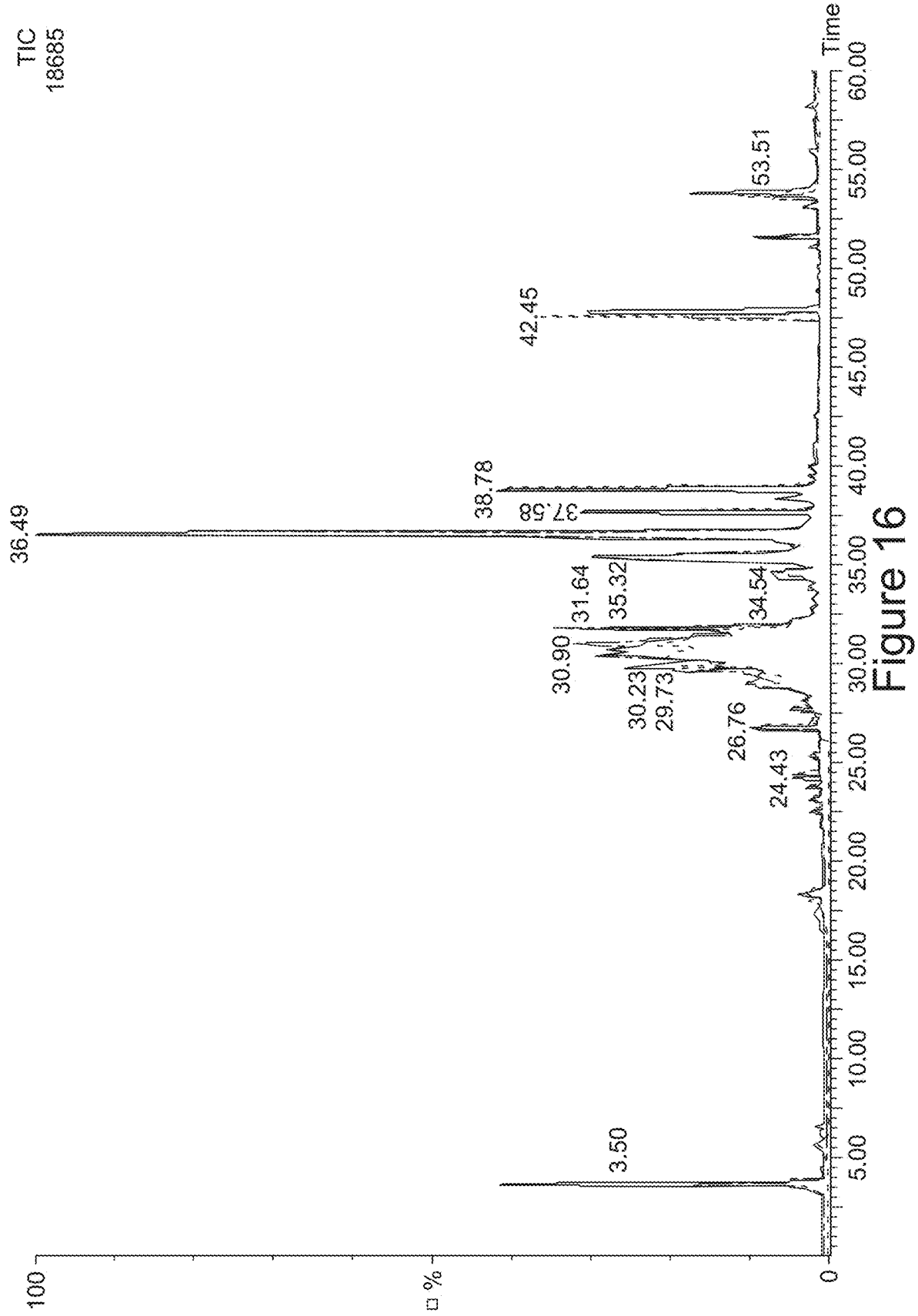
FIG. 16. Shows an overlay of three Total Ion Current chromatograms obtained from on-line liquid chromatograph/electrospray mass spectroscopy (LC/ES-MS) analyses of the tryptic digestion products of three MOD-4023 batches.

Online LC/ES-MS was performed on a tryptic digest of de-sialylated, reduced and carboxymethylated MOD-4023. For batch-to-batch comparison, FIG. 16 shows an overlay of three Total Ion Current (TIC) chromatograms. The data obtained for the three batches were highly comparable both in peptides detected as well as in intensity.

FIG. 17 presents an evaluation of signal obtained from on-line LC/ES-MS analysis of a tryptic digest of de-sialylated reduced and carboxymethylated MOD-4023 protein batches with a focus on signal modified by at least one HexNAc-Hex residue. The results presented in FIG. 17 suggest O-linked glycosylation site occupancy in the N-terminal region as shown in FIG. 18. FIG. 18 presents amino acid sequence 1-30 of MOD-4023 SEQ ID NO: 7, wherein O-glycosylation takes place on serine (S) residues at positions 10, 13, 15, and 21 (shown in red). Those serines (S) all follow proline (P) residues in the sequence. At least two of the S residues in positions one to four (1-4) are occupied by O-glycosylation sites (shown in purple).

Further signals of the complete CTP unit were observed consistent with the expected mass of amino acids 1-36 of SEQ ID NO: 7 with up to six O-glycosylation sites. The occurrence of such larger tryptic peptides containing missed cleavage sites is in agreement to the presence of O-glycosylation as the glycan residues in proximity to arginine or lysine residues hamper tryptic cleavage as a result of steric and electrostatic interference.

The data presented in FIG. 17 also show comparability with the previous data (not shown) i.e. for the C-terminal CTP-CTP region of MOD-4023. As a result it can be said that O-glycosylation takes place on serine residues following proline residues (shown in red) in FIG. 18 and FIG. 19. Additionally, in the regions of serine repeats at least two of the four serines were occupied by O-glycosylation.

From the results obtained, the following conclusions were drawn regarding the N-terminal CTP-unit. O-glycosylation took place on the serine residues at positions 10, 13, 15, and 21 (Amino acids 10, 13, 15 and 21 of SEQ ID NO: 7). Those serines all followed proline residues in the sequence. From the four serine residues on positions one to four from the protein N-terminus (Amino acids 1-4 of SEQ ID NO: 7), at least two are occupied by O-glycosylation sites. In the C-terminal CTP-CTP units: Amino acids 229, 232, 234, 240, 257, 260, 262, and 268 of SEQ ID NO: 7). Additionally, in the regions of serine repeated at least two of the four serines were occupied by O-glycosylation sites (Amino acids 1-4 of SEQ ID NO: 7 the N-terminal CTP unit, and Amino acids 220-223 and 248-251 of SEQ IDNO: 7 of the C-terminal CTP-CTP units).

It is understood that peptides with a high number of O-glycosylation sites could have escaped mass spectrometric detection as a result of poor ionization. For this reason, the identical sample was injected at higher amount and modified ionization conditions that are favored on high-mass tryptic peptides.

Conclusions

During the course of this study evidence was gathered supporting the following statements. Evaluation of the data obtained from analyses of the tryptic digest mixtures led to signals allowing 100% of the protein sequence being mapped. O-glycosylation takes place on both the N-terminal and C-terminal CTP- and -CTP-CTP regions, respectively. Sites of occupancy were serine residues following proline residues as well as two of the four serines in the regions of serine repeats. In this way a total of up to 18 serine residues may serve as attachment sites for O-glycans. Thus, surprisingly and unexpectedly, using the methods of manufacturing disclosed herein, the O-glycan occupancy was up to 6 O-glycans per CTP unit of each MOD-4023 (CTP-hGH-CTP-CTP polypeptide). Molecular weight analyses of MOD-4023 protein after de-sialylation suggested that the protein was modified with 12-18 glycosylation sites of structure HexNAc-Hex (see Example 3).

Example 3

Intact Molecular Weight Analysis of MOD-4023

Objective

The aim of the study was to provide accurate intact molecular weight information of three batches of MOD-4023 protein (a glycoprotein with around 12 O-linked glycosylation sites)

Methods

Molecular Weight Analysis of the Samples as Received and after Treatment

Samples analyzed was at a concentration of 21 mg/ml and 41 mg/ml. On-line LC/ES-MS was carried using the following conditions:
 HPLC: GE AKTAmicro Liquid Chromatography system comprising
 P-905 Pump, UV-900 Triple Wavelength Absorbance, Conductivity Detector and A-905 Autosampler, Fraction Collector Frac-950
 MS: Micromass/Waters Q-TOF micro Quadrupole-Time of Flight Mass
 Spectrometer
 Wavelength: 280 nm
 Column: Phenomenex Jupiter 3p C18 300A 150×2.0 mm (SGS M-Scan GmbH column #74)
  Col. Temp 40° C.
  Flow rate: 0.2 mL/minute
  Solvent A: 1.0 mL FA in 1 L H20
  Solvent B: 1.0 mL FA in 100 mL H20 plus 800 mL acetonitrile and 100 mL tetrahydrofuran The gradient described below was used for analysis of the de-sialylated product. It should be noted, that the retention time during data evaluation has been adjusted to the beginning of the gradient (tRo=at 10 min):

TABLE 2

| Column Gradient | |
|---|---|
| Time (min) | % B |
| 0 | 20 |
| 10 | 20 |
| 40 | 70 |
| 41 | 90 |
| 50 | 90 |
| 50.1 | 20 |
| 60 | 20 |

Ionization was enhanced by the use of a nitrogen drying gas and raised source temperature. The mass range scanned was m/z 350 to m/z 3500. Glu-Fibrinopeptide fragment ions in MS/MS mode were used to calibrate the instrument.

De-Sialylation Using Neuraminidase

Approximately 100 µg of sample were buffer exchanged into water and freeze dried. The dry sample was re-suspended in Neuraminidase and incubated at 37° C. Approximately 10 pg thereof were analyzed as described in above.

Data Interpretation

Interpretation of the mass spectrometry data was aided by the use of GPMAW software (Lighthouse data) in conjunction with the MOD-4023 protein sequences (SEQ ID NO: 7).

Results

Intact Molecular Weight Analysis of the Samples as Received

Figure 20:
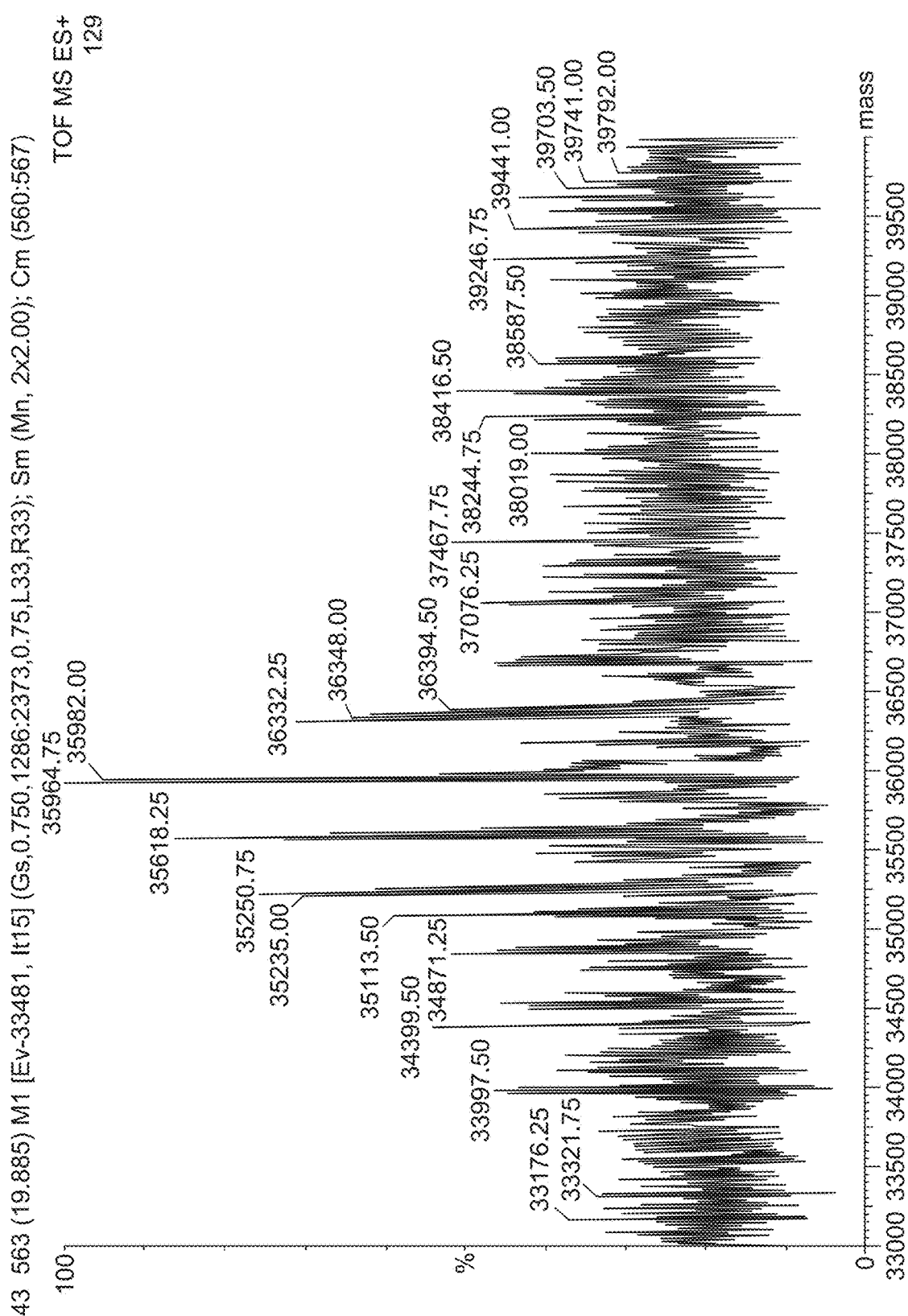
FIG. 20. Shows deconvoluted mass spectrum acquired during elution of the UV absorbing component at tR 19.8 min obtained from on-line LC/ES-MS analysis of MOD4023 Lot 648-01-10-014A sample after de-sialylation.

In FIG. 20 is shown the deconvoluted mass spectrum acquired during elution of the UV absorbing component at tR 19.8 min obtained from on-line LC/ES-MS analysis of MOD4023 Lot 648-01-10-014A sample after de-sialylation.

Table 3 presents a summary of the results obtained from mass spectrometric detection acquired during on-line LC/ES-MS analysis of MOD4023 Lot 648-01-10-014A after de-sialylation.

TABLE 3

| Sample | UV peak at $t_R$ (min) | Major signals observed (Da) | Possible assignment | Calculated average chemical mass (Da) |
|---|---|---|---|---|
| MOD4023 Lot 648-01-10-014A after de-sialylation (SGS No 2307) | 18.5 | 35232.8 | MOD4023 + 13 HexNAc-Hex + 1 Oxygen | 35230.4 |
| | | 35597.3 | MOD4023 + 14 HexNAc-Hex + 1 Oxygen | 35595.7 |
| | | 35962.5 | MOD4023 + 15 HexNAc-Hex + 1 Oxygen | 35961.0 |
| | | 36328.3 | MOD4023 + 16 HexNAc-Hex + 1 Oxygen | 36326.0 |
| | 19.0 | 34851.0 | MOD4023 + 12 HexNAc-Hex | 34849.0 |
| | | 35217.0 | MOD4023 + 13 HexNAc-Hex | 35214.3 |
| | | 35582.3 | MOD4023 + 14 HexNAc-Hex | 35579.7 |
| | | 35947.5 | MOD4023 + 15 HexNAc-Hex | 35945.0 |
| | | 36312.8 | MOD4023 + 16 HexNAc-Hax | 36310.3 |
| | | 36678.0 | MOD4023 + 17 HexNAc-Hex | 36675.7 |
| | | 37042.9 | MOD4023 + 18 HexNAc-Hex | 37041.0 |
| | 19.8 | 35600.3 | MOD4023 + 14 HexNAc-Hex + 18 Da | . . . |
| | | 35964.8 | MOD4023 + 15 HexNAc-Hex + 18 Da | . . . |

Conclusions

Molecular weight analyses of three bathes of MOD4023 protein was performed on the samples after de-sialylation with the aim to obtain information on the number of O-linked glycosylation sites. Consistently for all three batches, data obtained from intact mass measurement of the desialylated samples led to signals consistent with the average chemical mass of the MOD4023 protein with 12-18 glycosylation sites of HexNAc-Hex structure (within the experimental error of the instrument). For all three batches the protein being modified with 15 glycosylation sites was the most intense.

The corresponding mass spectra signals each were characterized by the presence of satellite signals at approximately +16.5 Da. This mass shift might have been the result of addition of oxygen residues or of $NH_3$ residues. The letter might originate from $NH_4^+$ protonation instead of H+ protonation yielding in a net to addition of $NH_3$ (+17 Da). As an oxidation possibly would result in a shift of elution time (as observed by the presence of UV signals at 18.5 min, consistent with the mass of the main peak+1 Oxygen), the data suggested the latter explanation as favourable (the satellites being the result of $NH_4^+$ protonation). However, form intact mass measurement alone this could not finally unraveled.

The findings drawn from this study were consistent to previous analyses of the MOD4023 protein (data not shown) where a maximum of 18 O-glycosylated residues was also found, with the protein modified with 15 glycosylation sites being the most intense.

While certain features disclosed herein have been illustrated and described herein, many modifications, substitutions, changes, and equivalents will now occur to those of ordinary skill in the art. It is, therefore, to be understood that the appended claims are intended to cover all such modifications and changes as fall within the true spirit disclosed herein.

---

What is claimed is:

1. A purified pharmaceutical composition comprising a highly glycosylated polypeptide and a pharmaceutically acceptable carrier, the polypeptide comprising an amino terminal chorionic gonadotropin carboxy terminal peptide (CTP), a human growth hormone (hGH) polypeptide, and two carboxy terminal chorionic gonadotropin CTPs arranged in tandem (CTP-modified hGH polypeptide), wherein the CTP-modified hGH polypeptide comprises the amino acid sequence set forth in SEQ ID NO: 7, wherein at least 60% of the CTP-modified hGH polypeptides present in the purified pharmaceutical composition are highly glycosylated and comprise 13 to 18 O-linked glycans per molecule, and wherein the purified pharmaceutical composition is manufactured by a method comprising the steps of:
   (a) stably transfecting a predetermined number of cells with an expression vector comprising a coding portion encoding the CTP-modified hGH polypeptide, wherein the transfected cells express and secrete the CTP-modified hGH polypeptide;
   (b) obtaining cell clones that overexpress the CTP-modified hGH polypeptide;
   (c) expanding the clones in solution to a predetermined scale by culturing at a dissolved oxygen (DO) content of 20-30%, wherein the pH of the solution is shifted from 7.2 to 6.9 during the expansion;
   (d) harvesting the solution containing the clones;
   (e) filtering the solution containing the clones to obtain a clarified harvest solution; and
   (f) purifying the clarified harvest solution to obtain a desired concentration of the CTP-modified hGH polypeptide.

2. The purified pharmaceutical composition according to claim 1, wherein the O-linked glycans are located on the CTPs of the CTP-modified hGH polypeptides.

3. The purified pharmaceutical composition according to claim 1, wherein the CTP-modified hGH polypeptides present in the purified pharmaceutical composition that are highly glycosylated comprise at least 15 O-linked glycans per molecule.

4. The purified pharmaceutical composition according to claim 1, wherein two of the CTPs of the CTP-modified hGH polypeptides present in the purified pharmaceutical composition that are highly glycosylated each comprises 4, 5, or 6 O-linked glycans per molecule, and wherein one of the CTPs of the CTP-modified hGH polypeptides present in the purified pharmaceutical composition that are highly glycosylated comprises 5 or 6 O-linked glycans per molecule.

5. The purified pharmaceutical composition according to claim 1, wherein each of the CTP-modified hGH polypeptides comprises O-linked glycans at least at residues 10, 13, 15, 21, 229, 232, 234, 240, 257, 260, 262, and 268 of SEQ ID NO: 7.

6. The purified pharmaceutical composition according to claim 5, wherein the CTP-modified hGH polypeptides present in the purified pharmaceutical composition that are highly glycosylated further comprise O-linked glycans at least at two residues selected from amino acid residues 1 to 4 of SEQ ID NO: 7, at least at two residues selected from amino acid residues 220 to 223 of SEQ ID NO: 7, at least at two residues selected from amino acid residues of 248 to 251 of SEQ ID NO: 7, or any combination thereof.

7. The purified pharmaceutical composition according to claim 1, wherein the O-linked glycans comprise sialylated core structures.

8. The purified pharmaceutical composition according to claim 1, wherein each of the O-linked glycans comprises an O-glycan core structure selected from the group consisting of a mono-sialylated core 1 (Neu5Acα2-3Galβ1-3GalNAc), a neutral core 1 (Galβ1-3GalNAc), a mono-sialylated core 1 (Neu5Acα2-6(Galβ1-3)GalNAc), and a di-sialylated core 1 (Neu5Acα2-3Galβ1-3(Neu5Acα2-6)GalNAc).

9. The purified pharmaceutical composition according to claim 8, wherein the most abundant O-linked glycan core structure in the purified pharmaceutical composition is a mono-sialylated core 1 (Neu5Acα2-3Galβ1-3GalNAc).

10. The purified pharmaceutical composition according to claim 1, wherein at least 70% of the CTP-modified hGH polypeptides present in the purified pharmaceutical composition are highly glycosylated and comprise 13 to 18 O-linked glycans.

11. The purified pharmaceutical composition according to claim 1, wherein the most abundant form of the CTP-modified hGH polypeptides present in the purified pharmaceutical composition comprises 15 to 16 O-linked glycans.

12. The purified pharmaceutical composition according to claim 1, wherein at least 60% of the CTP-modified hGH polypeptides present in the purified pharmaceutical composition are sialylated.

13. The purified pharmaceutical composition according to claim 12, wherein the most abundant sialic acid in the purified pharmaceutical composition is Neu5Ac.

14. The purified pharmaceutical composition according to claim 1, wherein the CTP-modified hGH polypeptides present in the purified pharmaceutical composition that are highly glycosylated comprise an O-linked glycan core structure of a mono-sialylated core 1 (Neu5Acα2-3Galβ1-3GalNAc).

15. The purified pharmaceutical composition according to claim 1, comprising one or more of the following characteristics:
   less than or equal 100 nanograms per milligram (ng/mg) of host cell proteins;
   less than or equal to 10 picograms per milligram (pg/mg) DNA;
   less than or equal to 50 ng/mL of methotrexate;
   less than or equal 60 micrograms per milliliter (pg/ml) propylene glycol;
   less than or equal 2.5 µg/mL Triton;
   less than or equal 115 picograms per milliliter (pg/mL) insulin;
   less than 250 µg/mL dimethyl sulfoxide (DMSO); or less than or equal 10 colony forming units (cfu)/10 mL in a Bioburden assay.

16. The purified pharmaceutical composition according to claim 1, wherein the CTP-modified hGH polypeptides present in the pharmaceutical composition comprise two disulfide bridges.

17. The purified pharmaceutical composition according to claim 16, wherein the first of the two disulfide bridges is between cysteine residue 81 and cysteine residue 193 of SEQ ID NO: 7, and the second of the two disulfide bridges is between cysteine residue 210 and cysteine residue 217 of SEQ ID NO: 7.

18. The purified pharmaceutical composition according to claim 1, wherein the purified pharmaceutical composition is a maximally purified clarified harvest solution comprising the human CTP-modified hGH polypeptide.

19. The purified pharmaceutical composition according to claim 1, wherein at least 75% of the CTP-modified hGH polypeptides present in the purified pharmaceutical composition are highly glycosylated and comprise 13 to 18 O-linked glycans per molecule.

20. The purified pharmaceutical composition according to claim 1, wherein at least 80% of the CTP-modified hGH polypeptides present in the purified pharmaceutical composition are highly glycosylated and comprise-13 to 18 O-linked glycans per molecule.

21. The purified pharmaceutical composition according to claim 1, wherein the purified pharmaceutical composition further comprises 0.2% poloxamer 188.

22. The purified pharmaceutical composition according to claim 1, wherein the purified pharmaceutical composition is a sterile aqueous composition for subcutaneous (SC) injection.

23. The purified pharmaceutical composition according to claim 1, wherein the purified pharmaceutical composition further comprises 0.3% m-cresol.

24. The purified pharmaceutical composition according to claim 1, wherein step (c) comprises expanding clones obtained from a working cell bank (WCB) or master cell bank (MCB) that optimally expresses and secretes the CTP-modified hGH polypeptide.

25. The purified pharmaceutical composition according to claim 1, wherein at step (c) the clones express and secrete the CTP-modified hGH polypeptide at a level of at least 600 milligrams per liter (mg/L).

26. The purified pharmaceutical composition according to claim 1, wherein at step (c) the clones are expanded in solution through a series of sub-cultivating steps up to production bioreactor level.

27. The purified pharmaceutical composition according to claim 26, wherein the bioreactor comprises a disposable bioreactor or a stainless steel bioreactor, and wherein the bioreactor is run as a fed-batch bioreactor.

28. The purified pharmaceutical composition according to claim 1, wherein step (f) comprises sequentially performing a set of steps comprising:
   i. concentrating and diafiltering the clarified harvest solution;
   ii. obtaining the clarified harvest solution obtained following step i and inactivating viruses present in the clarified harvest solution by incubating in a solution toxic to the viruses;
   iii. obtaining the clarified harvest solution from step ii and purifying the clarified harvest solution, wherein
      the purifying is accomplished by sequentially passing the clarified harvest solution through an anion exchange column and a hydrophobic interaction column followed by a concentrating and diafiltering step, and
      the purifying is followed by sequentially passing the clarified harvest solution through a Hydroxyapatite Mixed-Mode column and a cation exchange column;
   iv. obtaining the clarified harvest solution following step iii and physically removing the clarified harvest solution from viruses by nanofiltration; and
   v. obtaining the clarified harvest solution following step iv and concentrating and diafiltering the clarified harvest solution to arrive at a maximally purified clarified harvest solution containing the CTP-modified hGH polypeptide.

29. The purified pharmaceutical composition according to claim 28, wherein:
   the anion exchange column is a DEAE-Sepharose column;
   the hydrophobic column is a Phenyl Hydrophobic Interaction Chromatography (HIC) column;
   the solution toxic to the viruses is a 1% Triton-X 100 solution;
   the cation exchange column is a SP-Sepharose column; or
   the viral clearance shows a viral log reduction factor (LRF) of about 22.

30. The purified pharmaceutical composition according to claim 1, wherein the method achieves at least a 20% recovery rate of the CTP-modified hGH polypeptide.

31. The purified pharmaceutical composition according to claim 1, wherein the method is an animal-derived free process.

* * * * *

UNITED STATES PATENT AND TRADEMARK OFFICE
CERTIFICATE OF CORRECTION

| | | |
|---|---|---|
| PATENT NO. | : 12,459,982 B2 | Page 1 of 1 |
| APPLICATION NO. | : 15/533910 | |
| DATED | : November 4, 2025 | |
| INVENTOR(S) | : Oren Hershkovitz and Laura Moschcovich | |

It is certified that error appears in the above-identified patent and that said Letters Patent is hereby corrected as shown below:

On the Title Page

Change Item (73) the Assignee from "OPKO BIOLOGISTICS LTD., Kiryat Gat (IL)" to -- OPKO BIOLOGICS LTD., Kiryat Gat (IL) --.

In the Claims

In Claim 15, at Column 80, Line 62: Change "micrograms per milliliter (pg/ml)" to -- micrograms per milliliter (μg/ml) --.

Signed and Sealed this
Second Day of December, 2025

John A. Squires
*Director of the United States Patent and Trademark Office*

SEQUENCE LISTING

<160> NUMBER OF SEQ ID NOS: 17

<210> SEQ ID NO 1
<211> LENGTH: 33
<212> TYPE: PRT
<213> ORGANISM: Artificial Sequence
<220> FEATURE:
<223> OTHER INFORMATION: Human origin - amino acid

<400> SEQUENCE: 1

Asp Pro Arg Phe Gln Asp Ser Ser Ser Lys Ala Pro Pro Ser
1               5                   10                  15

Leu Pro Ser Pro Ser Arg Leu Pro Gly Pro Ser Asp Thr Pro Ile Leu
            20                  25                  30

Gln

<210> SEQ ID NO 2
<211> LENGTH: 28
<212> TYPE: PRT
<213> ORGANISM: Artificial Sequence
<220> FEATURE:
<223> OTHER INFORMATION: Human origin - amino acid

<400> SEQUENCE: 2

Ser Ser Ser Ser Lys Ala Pro Pro Pro Ser Leu Pro Ser Pro Ser Arg
1               5                   10                  15

Leu Pro Gly Pro Ser Asp Thr Pro Ile Leu Pro Gln
            20                  25

<210> SEQ ID NO 3
<211> LENGTH: 12
<212> TYPE: PRT
<213> ORGANISM: Artificial Sequence
<220> FEATURE:
<223> OTHER INFORMATION: Human origin - amino acid

<400> SEQUENCE: 3

Ser Ser Ser Ser Lys Ala Pro Pro Pro Ser Leu Pro
1               5                   10

<210> SEQ ID NO 4
<211> LENGTH: 301
<212> TYPE: PRT
<213> ORGANISM: Artificial Sequence
<220> FEATURE:
<223> OTHER INFORMATION: Human origin - amino acid

<400> SEQUENCE: 4

Met Ala Thr Gly Ser Arg Thr Ser Leu Leu Leu Ala Phe Gly Leu Leu
1               5                   10                  15

Cys Leu Pro Trp Leu Gln Glu Gly Ser Ala Ser Ser Ser Lys Ala
            20                  25                  30

```
Pro Pro Pro Ser Leu Pro Ser Pro Ser Arg Leu Pro Gly Pro Ser Asp
            35                  40                  45

Thr Pro Ile Leu Pro Gln Phe Pro Thr Ile Pro Leu Ser Arg Leu Phe
 50                  55                  60

Asp Asn Ala Met Leu Arg Ala His Arg Leu His Gln Leu Ala Phe Asp
 65                  70                  75                  80

Thr Tyr Gln Glu Phe Glu Glu Ala Tyr Ile Pro Lys Glu Gln Lys Tyr
                 85                  90                  95

Ser Phe Leu Gln Asn Pro Gln Thr Ser Leu Cys Phe Ser Glu Ser Ile
                100                 105                 110

Pro Thr Pro Ser Asn Arg Glu Glu Thr Gln Gln Lys Ser Asn Leu Glu
            115                 120                 125

Leu Leu Arg Ile Ser Leu Leu Leu Ile Gln Ser Trp Leu Glu Pro Val
130                 135                 140

Gln Phe Leu Arg Ser Val Phe Ala Asn Ser Leu Val Tyr Gly Ala Ser
145                 150                 155                 160

Asp Ser Asn Val Tyr Asp Leu Leu Lys Asp Leu Glu Glu Gly Ile Gln
                165                 170                 175

Thr Leu Met Gly Arg Leu Glu Asp Gly Ser Pro Arg Thr Gly Gln Ile
            180                 185                 190

Phe Lys Gln Thr Tyr Ser Lys Phe Asp Thr Asn Ser His Asn Asp Asp
        195                 200                 205

Ala Leu Leu Lys Asn Tyr Gly Leu Leu Tyr Cys Phe Arg Lys Asp Met
210                 215                 220

Asp Lys Val Glu Thr Phe Leu Arg Ile Val Gln Cys Arg Ser Val Glu
225                 230                 235                 240

Gly Ser Cys Gly Phe Ser Ser Ser Lys Ala Pro Pro Ser Leu
                245                 250                 255

Pro Ser Pro Ser Arg Leu Pro Gly Pro Ser Asp Thr Pro Ile Leu Pro
            260                 265                 270

Gln Ser Ser Ser Lys Ala Pro Pro Ser Leu Pro Ser Pro Ser
        275                 280                 285

Arg Leu Pro Gly Pro Ser Asp Thr Pro Ile Leu Pro Gln
    290                 295                 300

<210> SEQ ID NO 5
<211> LENGTH: 217
<212> TYPE: PRT
<213> ORGANISM: Homo sapiens

<400> SEQUENCE: 5

Met Ala Thr Gly Ser Arg Thr Ser Leu Leu Leu Ala Phe Gly Leu Leu
 1                   5                  10                  15

Cys Leu Pro Trp Leu Gln Glu Gly Ser Ala Phe Pro Thr Ile Pro Leu
                20                  25                  30

Ser Arg Leu Phe Asp Asn Ala Met Leu Arg Ala His Arg Leu His Gln
            35                  40                  45

Leu Ala Phe Asp Thr Tyr Gln Glu Phe Glu Glu Ala Tyr Ile Pro Lys
 50                  55                  60

Glu Gln Lys Tyr Ser Phe Leu Gln Asn Pro Gln Thr Ser Leu Cys Phe
 65                  70                  75                  80

Ser Glu Ser Ile Pro Thr Pro Ser Asn Arg Glu Glu Thr Gln Gln Lys
                 85                  90                  95

Ser Asn Leu Glu Leu Leu Arg Ile Ser Leu Leu Leu Ile Gln Ser Trp
                100                 105                 110
```

```
Leu Glu Pro Val Gln Phe Leu Arg Ser Val Phe Ala Asn Ser Leu Val
            115                 120                 125

Tyr Gly Ala Ser Asp Ser Asn Val Tyr Asp Leu Leu Lys Asp Leu Glu
        130                 135                 140

Glu Gly Ile Gln Thr Leu Met Gly Arg Leu Glu Asp Gly Ser Pro Arg
145                 150                 155                 160

Thr Gly Gln Ile Phe Lys Gln Thr Tyr Ser Lys Phe Asp Thr Asn Ser
                165                 170                 175

His Asn Asp Asp Ala Leu Leu Lys Asn Tyr Gly Leu Leu Tyr Cys Phe
            180                 185                 190

Arg Lys Asp Met Asp Lys Val Glu Thr Phe Leu Arg Ile Val Gln Cys
        195                 200                 205

Arg Ser Val Glu Gly Ser Cys Gly Phe
    210                 215
```

<210> SEQ ID NO 6
<211> LENGTH: 26
<212> TYPE: PRT
<213> ORGANISM: Artificial Sequence
<220> FEATURE:
<223> OTHER INFORMATION: Human origin - amino acid

<400> SEQUENCE: 6

```
Met Ala Thr Gly Ser Arg Thr Ser Leu Leu Leu Ala Phe Gly Leu Leu
1               5                   10                  15

Cys Leu Pro Trp Leu Gln Glu Gly Ser Ala
            20                  25
```

<210> SEQ ID NO 7
<211> LENGTH: 275
<212> TYPE: PRT
<213> ORGANISM: Artificial Sequence
<220> FEATURE:
<223> OTHER INFORMATION: Human origin - amino acid

<400> SEQUENCE: 7

```
Ser Ser Ser Ser Lys Ala Pro Pro Ser Leu Pro Ser Pro Ser Arg
1               5                   10                  15

Leu Pro Gly Pro Ser Asp Thr Pro Ile Leu Pro Gln Phe Pro Thr Ile
            20                  25                  30

Pro Leu Ser Arg Leu Phe Asp Asn Ala Met Leu Arg Ala His Arg Leu
        35                  40                  45

His Gln Leu Ala Phe Asp Thr Tyr Gln Glu Phe Glu Glu Ala Tyr Ile
    50                  55                  60

Pro Lys Glu Gln Lys Tyr Ser Phe Leu Gln Asn Pro Gln Thr Ser Leu
65                  70                  75                  80

Cys Phe Ser Glu Ser Ile Pro Thr Pro Ser Asn Arg Glu Glu Thr Gln
                85                  90                  95

Gln Lys Ser Asn Leu Glu Leu Leu Arg Ile Ser Leu Leu Leu Ile Gln
            100                 105                 110

Ser Trp Leu Glu Pro Val Gln Phe Leu Arg Ser Val Phe Ala Asn Ser
        115                 120                 125

Leu Val Tyr Gly Ala Ser Asp Ser Asn Val Tyr Asp Leu Leu Lys Asp
    130                 135                 140

Leu Glu Glu Gly Ile Gln Thr Leu Met Gly Arg Leu Glu Asp Gly Ser
145                 150                 155                 160

Pro Arg Thr Gly Gln Ile Phe Lys Gln Thr Tyr Ser Lys Phe Asp Thr
```

165                 170                 175
Asn Ser His Asn Asp Asp Ala Leu Leu Lys Asn Tyr Gly Leu Leu Tyr
            180                 185                 190

Cys Phe Arg Lys Asp Met Asp Lys Val Glu Thr Phe Leu Arg Ile Val
            195                 200                 205

Gln Cys Arg Ser Val Glu Gly Ser Cys Gly Phe Ser Ser Ser Ser Lys
            210                 215                 220

Ala Pro Pro Pro Ser Leu Pro Ser Pro Ser Arg Leu Pro Gly Pro Ser
225                 230                 235                 240

Asp Thr Pro Ile Leu Pro Gln Ser Ser Ser Lys Ala Pro Pro Pro Pro
                245                 250                 255

Ser Leu Pro Ser Pro Ser Arg Leu Pro Gly Pro Ser Asp Thr Pro Ile
                260                 265                 270

Leu Pro Gln
        275

<210> SEQ ID NO 8
<211> LENGTH: 191
<212> TYPE: PRT
<213> ORGANISM: Homo sapiens

<400> SEQUENCE: 8

Phe Pro Thr Ile Pro Leu Ser Arg Leu Phe Asp Asn Ala Met Leu Arg
1               5                   10                  15

Ala His Arg Leu His Gln Leu Ala Phe Asp Thr Tyr Gln Glu Phe Glu
            20                  25                  30

Glu Ala Tyr Ile Pro Lys Glu Gln Lys Tyr Ser Phe Leu Gln Asn Pro
        35                  40                  45

Gln Thr Ser Leu Cys Phe Ser Glu Ser Ile Pro Thr Pro Ser Asn Arg
    50                  55                  60

Glu Glu Thr Gln Gln Lys Ser Asn Leu Glu Leu Leu Arg Ile Ser Leu
65                  70                  75                  80

Leu Leu Ile Gln Ser Trp Leu Glu Pro Val Gln Phe Leu Arg Ser Val
                85                  90                  95

Phe Ala Asn Ser Leu Val Tyr Gly Ala Ser Asp Ser Asn Val Tyr Asp
            100                 105                 110

Leu Leu Lys Asp Leu Glu Glu Gly Ile Gln Thr Leu Met Gly Arg Leu
        115                 120                 125

Glu Asp Gly Ser Pro Arg Thr Gly Gln Ile Phe Lys Gln Thr Tyr Ser
    130                 135                 140

Lys Phe Asp Thr Asn Ser His Asn Asp Asp Ala Leu Leu Lys Asn Tyr
145                 150                 155                 160

Gly Leu Leu Tyr Cys Phe Arg Lys Asp Met Asp Lys Val Glu Thr Phe
                165                 170                 175

Leu Arg Ile Val Gln Cys Arg Ser Val Glu Gly Ser Cys Gly Phe
            180                 185                 190

<210> SEQ ID NO 9
<211> LENGTH: 903
<212> TYPE: DNA
<213> ORGANISM: Artificial Sequence
<220> FEATURE:
<223> OTHER INFORMATION: Human origin - nucleic acid

<400> SEQUENCE: 9
atggccaccg gcagcaggac cagcctgctg ctggccttcg gcctgctgtg cctgccatgg    60

```
ctgcaggagg gcagcgccag ctcttcttct aaggctccac ccccatctct gcccagcccc    120
agcagactgc cgggcccag cgacacaccc attctgcccc agttcccac catcccctg       180 agcaggctgt tcgacaacgc catgctgagg gctcacaggc tgcaccagct ggcctttgac    240
acctaccagg agttcgagga agcctacatc cccaaggagc agaagtacag cttcctgcag    300 aaccccaga cctccctgtg cttcagcgag agcatcccca ccccagcaa cagagaggag      360 acccagcaga agagcaacct ggagctgctg aggatctccc tgctgctgat ccagagctgg    420
ctggagcccg tgcagttcct gagaagcgtg ttcgccaaca gcctggtgta cggcgccagc    480
gacagcaacg tgtacgacct gctgaaggac ctggaggagg gcatccagac cctgatgggc    540
cggctggagg acggcagccc caggaccggc cagatcttca gcagaccta cagcaagttc     600 gacaccaaca gccacaacga cgacgccctg ctgaagaact acgggctgct gtactgcttc    660
agaaaggaca tggacaaggt ggagacccttc ctgaggatcg tgcagtgcag aagcgtggag   720
ggcagctgcg gcttcagctc cagcagcaag gcccctcccc cgagcctgcc ctccccaagc    780
aggctgcctg ggccctccga cacaccaatc ctgccacaga gcagctcctc taaggcccct    840
cctccatccc tgccatcccc ctcccggctg cctggcccct ctgacacccc tatcctgcct    900
cag                                                                  903
```

```
<210> SEQ ID NO 10
<211> LENGTH: 20
<212> TYPE: PRT
<213> ORGANISM: Artificial Sequence
<220> FEATURE:
<223> OTHER INFORMATION: Human origin - amino acid

<400> SEQUENCE: 10

Leu Pro Gly Pro Ser Asp Thr Pro Ile Leu Pro Gln Phe Pro Thr Ile
1               5                   10                  15

Pro Leu Ser Arg
            20

<210> SEQ ID NO 11
<211> LENGTH: 31
<212> TYPE: PRT
<213> ORGANISM: Artificial Sequence
<220> FEATURE:
<223> OTHER INFORMATION: Human origin - amino acid

<400> SEQUENCE: 11

Ala Pro Pro Pro Ser Leu Pro Ser Pro Ser Arg Leu Pro Gly Pro Ser
1               5                   10                  15

Asp Thr Pro Ile Leu Pro Gln Phe Pro Thr Ile Pro Leu Ser Arg
            20                  25                  30

<210> SEQ ID NO 12
<211> LENGTH: 12
<212> TYPE: PRT
<213> ORGANISM: Artificial Sequence
<220> FEATURE:
<223> OTHER INFORMATION: Human origin - amino acid

<400> SEQUENCE: 12

Leu Pro Gly Pro Ser Asp Thr Pro Ile Leu Pro Gln
1               5                   10

<210> SEQ ID NO 13
<211> LENGTH: 13
<212> TYPE: PRT
```

```
<213> ORGANISM: Artificial Sequence
<220> FEATURE:
<223> OTHER INFORMATION: Human origin - amino acid

<400> SEQUENCE: 13

Ser Val Glu Gly Ser Cys Gly Phe Ser Ser Ser Ser Lys
1               5                   10

<210> SEQ ID NO 14
<211> LENGTH: 51
<212> TYPE: PRT
<213> ORGANISM: Artificial Sequence
<220> FEATURE:
<223> OTHER INFORMATION: Human origin - amino acid

<400> SEQUENCE: 14

Ala Pro Pro Pro Ser Leu Pro Ser Pro Ser Arg Leu Pro Gly Pro Ser
1               5                   10                  15

Asp Thr Pro Ile Leu Pro Gln Ser Ser Ser Lys Ala Pro Pro Pro
                20                  25                  30

Ser Leu Pro Ser Pro Ser Arg Leu Pro Gly Pro Ser Asp Thr Pro Ile
            35                  40                  45

Leu Pro Gln
    50

<210> SEQ ID NO 15
<211> LENGTH: 36
<212> TYPE: PRT
<213> ORGANISM: Artificial Sequence
<220> FEATURE:
<223> OTHER INFORMATION: Human origin - amino acid

<400> SEQUENCE: 15

Ser Ser Ser Ser Lys Ala Pro Pro Pro Ser Leu Pro Ser Pro Ser Arg
1               5                   10                  15

Leu Pro Gly Pro Ser Asp Thr Pro Ile Leu Pro Gln Phe Pro Thr Ile
            20                  25                  30

Pro Leu Ser Arg
        35

<210> SEQ ID NO 16
<211> LENGTH: 23
<212> TYPE: PRT
<213> ORGANISM: Artificial Sequence
<220> FEATURE:
<223> OTHER INFORMATION: Human origin - amino acid

<400> SEQUENCE: 16

Ala Pro Pro Pro Ser Leu Pro Ser Pro Ser Arg Leu Pro Gly Pro Ser
1               5                   10                  15

Asp Thr Pro Ile Leu Pro Gln
                20

<210> SEQ ID NO 17
<211> LENGTH: 64
<212> TYPE: PRT
<213> ORGANISM: Artificial Sequence
<220> FEATURE:
<223> OTHER INFORMATION: Human origin - amino acid

<400> SEQUENCE: 17

Ser Val Glu Gly Ser Cys Gly Phe Ser Ser Ser Ser Lys Ala Pro Pro
1               5                   10                  15
```

```
Pro Ser Leu Pro Ser Pro Ser Arg Leu Pro Gly Pro Ser Asp Thr Pro
            20              25                  30

Ile Leu Pro Gln Ser Ser Ser Lys Ala Pro Pro Pro Ser Leu Pro
        35              40                  45

Ser Pro Ser Arg Leu Pro Gly Pro Ser Asp Thr Pro Ile Leu Pro Gln
    50                  55                  60
```